United States Patent
Codony I Gisbert et al.

(10) Patent No.: US 12,486,222 B2
(45) Date of Patent: *Dec. 2, 2025

(54) COMPOUNDS AS SOLUBLE EPOXIDE HYDROLASE INHIBITORS

(71) Applicant: UNIVERSITAT DE BARCELONA, Barcelona (ES)

(72) Inventors: Sandra Codony I Gisbert, Barcelona (ES); Cristian Gaspar Griñan Ferre, Barcelona (ES); Mercè Pallàs Lliberia, Barcelona (ES); Santiago Vázquez Cruz, Barcelona (ES); Yumin Oh, Gaithersburg, MD (US)

(73) Assignee: UNIVERSITAT DE BARCELONA, Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,070

(22) Filed: Oct. 14, 2024

(65) Prior Publication Data
US 2025/0115548 A1 Apr. 10, 2025

Related U.S. Application Data

(63) Continuation of application No. 18/552,146, filed as application No. PCT/EP2022/056557 on Mar. 14, 2022.

(30) Foreign Application Priority Data

Mar. 24, 2021 (EP) .................................... 21382237

(51) Int. Cl.
| | | |
|---|---|---|
| C07C 275/26 | (2006.01) |
| A61K 31/17 | (2006.01) |
| A61K 31/445 | (2006.01) |
| A61K 31/453 | (2006.01) |
| A61P 1/18 | (2006.01) |
| A61P 25/08 | (2006.01) |
| A61P 25/28 | (2006.01) |
| C07D 211/58 | (2006.01) |
| C07D 211/60 | (2006.01) |
| C07D 405/06 | (2006.01) |

(52) U.S. Cl.
CPC ............ *C07C 275/26* (2013.01); *A61K 31/17* (2013.01); *A61K 31/445* (2013.01); *A61K 31/453* (2013.01); *A61P 1/18* (2018.01); *A61P 25/08* (2018.01); *A61P 25/28* (2018.01); *C07D 211/58* (2013.01); *C07D 211/60* (2013.01); *C07D 405/06* (2013.01)

(58) Field of Classification Search
CPC .................................................. C07C 275/26
See application file for complete search history.

(56) References Cited

U.S. PATENT DOCUMENTS

2021/0261564 A1  8/2021  Codony I Gisbert et al.

FOREIGN PATENT DOCUMENTS

| AU | 2016301027 A1 | 3/2018 |
| CN | 101679258 A | 3/2010 |
| CN | 104093708 A | 10/2014 |
| DE | 2210799 A1 | 9/1973 |
| DE | 2261637 A1 | 6/1974 |
| JP | 2009530287 A | 8/2009 |
| WO | WO 0023060 A2 | 4/2000 |
| WO | WO 03002555 A1 | 1/2003 |
| WO | WO 2007009001 A1 | 1/2007 |
| WO | WO 2007016496 A2 | 2/2007 |
| WO | WO 2015148954 A1 | 10/2015 |
| WO | WO 2016133788 A1 | 8/2016 |
| WO | WO 2017120012 A1 | 7/2017 |
| WO | WO 2019243414 A1 | 12/2019 |
| WO | WO 2020146770 A1 | 7/2020 |

OTHER PUBLICATIONS

Amini et al., "The Intramolecular Cyclization of Unsaturated Benzo Derivatives of Bicyclo[3.3.2]decane," *Aust. J. Chem.* 36:2465-2472, 1983. (8 pages).
Barniol-Xicota et al., "Antibacterial activity of novel benzopolycyclic amines," *Bioorganic & Medicinal Chemistry* 23:290-296, 2015 [Published online Dec. 3, 2014]. (7 pages).
Bartolini et al., "Aniracetam Restores Object Recognition Impaired by Age, Scopolamine, and Nucleus Basalis Lesions," *Pharmacology Biochemistry and Behavior* 53(2):277-283, Feb. 1996. (7 pages).
Bengoetxea et al., "Object recognition test for studying cognitive impairments in animal models of Alzheimer's disease," *Frontiers in Bioscience*, Scholar 7:10-29, Jun. 1, 2015. (20 pages).
Bettaieb et al., "Soluble Epoxide Hydrolase Pharmacological Inhibition Ameliorates Experimental Acute Pancreatitis in Mice," *Mol Pharmacol* 88:281-290, Aug. 2015. (10 pages).
Bishop et al., "Ritter Reactions. II. Reductive Deamidation of N-Bridgehead Amides.," *Tetrahedron Letters* 28(14):1585-1588, 1987. (4 pages).

(Continued)

*Primary Examiner* — Yong S. Chong
(74) *Attorney, Agent, or Firm* — Seed Intellectual Property Law Group LLP

(57) ABSTRACT

The present invention relates to soluble epoxide hydrolase (sEH) inhibitors of formula (I)

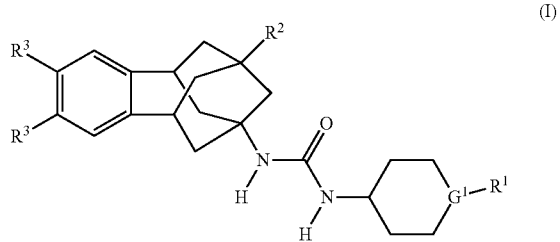

to processes for their obtention and to their therapeutic indications.

2 Claims, 9 Drawing Sheets

Specification includes a Sequence Listing.

(56) References Cited

OTHER PUBLICATIONS

Camps et al., "Synthesis of Bridgehead Polycyclic 1,2-Diamines and 2-Amino Alcohol Derivatives as Rigid Acetylcholine Analogs," *Liebigs Ann.* 1995:523-535, Feb. 23, 1995. (13 pages).
Carmo et al., "Inhibition of soluble epoxide hydrolase reduces food intake and increases metabolic rate in obese mice," *Nutrition, Metabolism & Cardiovascular Diseases* 22(598e604):598-604, Jul. 2012. (7 pages).
Christian Griñán-Ferré et al., "Pharmacological inhibition of soluble epoxide hydrolase as a new therapy for Alzheimer's Disease," BioRxiv, URL= https://doi.org/10.1101/605055, Apr. 10, 2019. (41 pages).
Chung "Lipoxins and Epoxyeicosatrienoic Acids Potential for Inhibitors of Soluble Epoxide Hydrolase in Severe Asthma?," *American Journal of Respiratory and Critical Care Medicine* 190(8):848-850, Oct. 15, 2014. (3 pages).
D'Souza et al., "Aneurysmal Subarachnoid Hemorrhage," *J Neurosurg Anesthesiol* 27(3):222-240, Jul. 2015. (19 pages).
Deng et al., "Inhibition of soluble epoxide hydrolase lowers portal hypertension in cirrhotic rats by ameliorating endothelial dysfunction and liver fibrosis," *Prostaglandins and Other Lipid Mediators* 131:67-74, 2017 [Published online Aug. 16, 2017]. (8 pages).
Division of Medicinal Chemistry Scientific Abstracts for the 241st National ACS Meeting and Exposition, Anaheim, CA, Mar. 27-31, 2011. (2 pages).
Dong et al., "Soluble epoxide hydrolase inhibitor AUDA decreases bleomycin-induced pulmonary toxicity in mice by inhibiting the p38/Smad3 pathways," *Toxicology* 389:31-41, 2017 [Published online Jul. 8, 2017]. (11 pages).
Duque et al., "New oxapolycyclic cage amines with NMDA receptor antagonist and trypanocidal activities," *Bioorganic & Medicinal Chemistry* 18:46-57, 2010 [Published online Nov. 14, 2009]. (12 pages).
Fang et al., "Soluble Epoxide Hydrolase: A Novel Target for the Treatment of Hypertension," *Recent Patents on Cardiovascular Drug Discovery* 1:67-72, Jan. 2006. (6 pages).
Föhlisch et al., "Michael-Addition von 3-Oxoglutarsaureestern an 7-0x0-7Hbenzocyclohepten-6,8-dicarbonsaureester : Synthese von benzanellierten Oxa—homoadamantanenl," *Liebigs Ann. Chem.* 1973:1839-1850, Dec. 13, 1973. (12 pages).
Gleeson et al., "Probing the links between in vitro potency, ADMET and physicochemical parameters," *Nat Rev Drug Discov.* 10(3):197-208, Mar. 2011 [Europe PMC Funders Group Author Manuscript, available in PMC Jan. 3, 2019]. (25 pages).
Goswami et al., "Anti-Ulcer Efficacy of Soluble Epoxide Hydrolase Inhibitor TPPU on Diclofenac-Induced Intestinal Ulcerss," *J Pharmacol Exp Ther* 357:529-536, Jun. 2016. (8 pages).
Goswami et al., "Erectogenic and Aphrodisiac Property of Moringa oleifera: Involvement of Soluble Epoxide Hydrolase Enzyme," *Phytother. Res.* 30(7), Jul. 2016. (9 pages).
Griñán-Ferré et al., "Pharmacological Inhibition of Soluble Epoxide Hydrolase as a New Therapy for Alzheimer's Disease," *Neurotherapeutics* 17:1825-1835, Jun. 2, 2020. (11 pages).
Guan et al., "Epoxyeicosanoids suppress osteoclastogenesis and prevent ovariectomy-induced bone loss," *The FASEB Journal* 29:1092-1101, Mar. 2015. (10 pages).
Guedes et al., "Pharmacokinetics and antinociceptive effects of the soluble epoxide hydrolase inhibitor t-TUCB in horses with experimentally induced radiocarpal synovitis," *J vet Pharmacol Therap.* 41:230-238, Oct. 25, 2017. (9 pages).
Guedes et al., "Soluble epoxide hydrolase activity and pharmacologic inhibition in horses with chronic severe laminitis," *Equine Veterinary Journal* 49:345-351, May 2017. (7 pages).
Harris et al. "Inhibition of soluble epoxide hydrolase attenuates hepatic fibrosis and endoplasmic reticulum stress induced by carbon tetrachloride in mice," *Toxicology and Applied Pharmacology* 286:102-111, 2015 [Published online Mar. 28, 2015]. (10 pages).
Hu et al., "Inhibition of soluble epoxide hydrolase prevents diabetic retinopathy," *Nature* 552:248-269, Dec. 14, 2017. (22 pages).
Hung et al., "Deletion or inhibition of soluble epoxide hydrolase protects against brain damage and reduces microglia-mediated neuroinflammation in traumatic brain injury," *Oncotarget* 8(61):103236-103260, Sep. 21, 2017. (25 pages).
Hwang et al., "Orally Bioavailable Potent Soluble Epoxide Hydrolase Inhibitors," *J Med Chem* 50(16)3825-3840, Aug. 9, 2007 (NIH Public Access Author Manuscript, available in PMC Dec. 4, 2008). (40 pages).
Inceoglu et al., "Endoplasmic reticulum stress in the peripheral nervous system is a significant driver of neuropathic pain," *PNAS* 112(29):9082-9087, Jul. 21, 2015. (6 pages).
Inceoglu et al., "Epoxy Fatty Acids and Inhibition of the Soluble Epoxide Hydrolase Selectively Modulate GABA Mediated Neurotransmission to Delay Onset of Seizures," *PLOS One* 8(12), Dec. 2013. (10 pages).
Iyer et al., "Pharmacological Inhibition of Soluble Epoxide Hydrolase Ameliorates Diet-Induced Metabolic Syndrome in Rats," *Experimental Diabetes Research* 2012(758614), 2012 [Published online Oct. 10, 2011]. (12 pages).
Jonnalagadda et al., "A Soluble Epoxide Hydrolase Inhibitor, 1-trifluoromethoxyphenyl-3-(1-propionylpiperidin-4-yl) Urea, Ameliorates Experimental Autoimmune Encephalomyelitis," *J. Mol. Sci.* 22(4650), Apr. 28, 2021. (12 pages).
Kang et al., "Stem cell-secreted 14,15-epoxyeicosatrienoic acid rescues cholesterol homeostasis and autophagic flux in Niemann—Pick-type C disease," *Experimental & Molecular Medicine* 50(149), Nov. 14, 2018. (14 pages).
Kato et al., "Discovery of 1-oxa-4,9-diazaspiro[5.5]undecane-based trisubstituted urea derivatives as highly potent soluble epoxide hydrolase inhibitors and orally active drug candidates for treating of chronic kidney diseases," *Bioorganic & Medicinal Chemistry Letters* 24:565-570, 2014 [Published online Dec. 10, 2013]. (6 pages).
Kim et al., "Inhibition of soluble epoxide hydrolase prevents renal interstitial fibrosis and inflammation," *Am J Physiol Renal Physiol* 307:F971-F980, Aug. 27, 2014. (10 pages).
Kim et al., "The arachidonic acid metabolite 11,12-epoxyeicosatrienoic acid alleviates pulmonary fibrosis," *Experimental & Molecular Medicine* 53:864-874, May 14, 2021. (11 pages).
Kodani et al., "The 2014 Bernard B. Brodie Award Lecture—Epoxide Hydrolases: Drug Metabolism to Therapeutics for Chronic Pain," *Drug Metab Dispos* 43:788-802, May 2015. (15 pages).
Liu "Inhibition of Soluble Epoxide Hydrolase for Renal Health," *Frontiers in Pharmacology* 9(1551), Jan. 10, 2019. (11 pages).
Luo et al., "Inhibition of soluble epoxide hydrolase attenuates a high-fat diet-mediated renal injury by activating PAX2 and AMPK," *PNAS* 116(11):5154-5159, Mar. 12, 2019. (6 pages).
Luria et al., "Soluble epoxide hydrolase deficiency alters pancreatic islet size and improves glucose homeostasis in a model of insulin resistance," *PNAS* 108(22):9038-9043, May 31, 2011. (6 pages).
Ma et al., "Key role of soluble epoxide hydrolase in the neurodevelopmental disorders of offspring after maternal immune activation," *PNAS* 116(14):7083-7088, Apr. 2, 2019. (6 pages).
Matsumoto et al., "Soluble Epoxide Hydrolase as an Anti-inflammatory Target of the Thrombolytic Stroke Drug SMTP-7," *The Journal of Biological Chemistry* 289(52):35826-35838, Dec. 26, 2014. (13 pages).
Minaz et al., "An inhibitor of soluble epoxide hydrolase ameliorates diabetes-induced learning and memory impairment in rats," *Prostaglandins and Other Lipid Mediators* 136:84-89, 2018, [Published online May 8, 2018]. (6 pages).
Minaz et al., "Impact of diabetes on male sexual function in streptozotocin-induced diabetic rats: Protective role of soluble epoxide hydrolase inhibitor," *Biomedicine & Pharmacotherapy* 115:108897, May 15, 2019. (6 pages).
Morisseau et al., "Measurement of Soluble Epoxide Hydrolase (sEH) Activity," *Current Protocols in Toxicology* 33:4.23.1-4.23.18, Aug. 2007. (18 pages).
Murillo, "Novel soluble epoxide hydrolase inhibitors with enhanced lipophilic ligand efficiency via scaffold-hopping approaches," XXXV Bienal RSEQ, University of Barcelona, Jul. 21, 2015. (9 pages).
Oakley et al., "Intraneuronal—Amyloid Aggregates, Neurodegeneration, and Neuron Loss in Transgenic Mice with Five Familial

(56) References Cited

OTHER PUBLICATIONS

Alzheimer's Disease Mutations: Potential Factors in Amyloid Plaque Formation," *The Journal of Neuroscience* 26(40):10129-10140, Oct. 4, 2006. (12 pages).
Panigraphy et al., "Inflammation resolution: a dual-pronged approach to averting cytokine storms in COVID-19?," *Cancer and Metastasis Reviews* 39:337-340, 2020 [Published online May 8, 2020]. (4 pages).
Park et al., "Soluble Epoxide Hydrolase Inhibition for Ocular Diseases: Vision for the future," *Frontiers in Pharmacology* 10(95), Feb. 7, 2019. (9 pages).
Pérez-Areales et al., "A novel class of multitarget anti-Alzheimer benzohomoadamantane-chlorotacrine hybrids modulating cholinesterases and glutamate NMDA receptors," *European Journal of Medicinal Chemistry* 180:613-626, 2019 [Published online Jul. 17, 2019]. (14 pages).
Pillarisetti et al., "A multimodal disease modifying approach to treat neuropathic pain—inhibition of soluble epoxide hydrolase (sEH)," *Drug Discovery Today* 20(11):1382-1390, Nov. 2015. (9 pages).
Pillarisetti et al., "Targeting Soluble Epoxide Hydrolase for Inflammation and Pain—An Overview of Pharmacology and the Inhibitors," *Inflammation & Allergy—Drug Targets* 11:143-158, Apr. 2012. (16 pages).
Poli et al., "Therapeutic activity of inhibition of the soluble epoxide hydrolase in a mouse model of scrapie," *Life Sciences* 92:1145-1150, Jun. 21, 2013. (6 pages).
Qin et al., "Soluble Epoxide Hydrolase Deficiency or Inhibition Attenuates MPTP-Induced Parkinsonism," *Mol Neurobiol* 52:187-195, Aug. 2015. (9 pages).
Qui et al., "Soluble Epoxide Hydrolase Inhibitors and Heart Failure," *Cardiovascular Therapeutics* 29:99-111, Apr. 2011. (13 pages).
Reisdorf et al., "EPHX2 inhibition and wound healing," BioRxiv, URL=https://doi.org/10.1101/571984, Mar. 13, 2019. (19 pages).
Reisdorf et al., "Preclinical evaluation of EPHX2 inhibition as a novel treatment for inflammatory bowel disease," *PLoS One* 14(4), Apr. 19, 2019. (23 pages).
Ren et al., "Gene deficiency and pharmacological inhibition of soluble epoxide hydrolase confers resilience to repeated social defeat stress," *PNAS* 113(13):E1944-E1952 [Published online Mar. 14, 2016]. (9 pages).
Ren et al., "Soluble epoxide hydrolase plays a key role in the pathogenesis of Parkinson's disease," *PNAS* 115(25):E5815-5823 [Published online May 7, 2018]. (9 pages).
Sander et al., "Soluble epoxide hydrolase disruption as therapeutic target for wound healing," *Journal of Surgical Research* 182:362-367, 2013 [Published online Oct. 30, 2012]. (6 pages).
Santos et al., "The role of soluble epoxide hydrolase in preeclampsia," *Medical Hypotheses* 108:81-85, Oct. 2017. (5 pages).
Scali et al., "Nerve growth factor increases extracellular acetylcholine levels in the parietal cortex and hippocampus of aged rats and restores object recognition," *Neurosci Lett*. 170:117-120, Mar. 28, 1994. (4 pages).
Schmelzer et al., "Soluble epoxide hydrolase is a therapeutic target for acute inflammation," *PNAS* 102(28):9772-9777, Jul. 12, 2005. (6 pages).
Schuck et al., "The Cytochrome P450 Epoxygenase Pathway Regulates the Hepatic Inflammatory Response in Fatty Liver Disease," *PLOS One* 9(10), Oct. 2014. (12 pages).
Shen "Soluble epoxide hydrolase inhibitors: a patent review," *Expert Opin. Ther. Patents* 20(7):941-956, Jul. 2010. (16 pages).
Shen et al., "Discovery of Inhibitors of Soluble Epoxide Hydrolase: A Target with Multiple Potential Therapeutic Indications," *J. Med. Chem*. 55:1789-1808, 2012. (20 pages).
Siler et al., "Soluble Epoxide Hydrolase in Hydrocephalus, Cerebral Edema, and Vascular Inflammation After Subarachnoid Hemorrhage," *Stroke* 46(7):1916-1922, Jul. 2015. (18 pages).
Sjödin et al., "Soluble epoxide hydrolase derived lipid mediators are elevated in bronchoalveolar lavage fluid from patients with sarcoidosis: a cross-sectional study," *Respiratory Research* 19(236), Dec. 3, 2018. (10 pages).
Sulaiman et al., "Chemical Proteomics Reveals Soluble Epoxide Hydrolase as a Therapeutic Target for Ocular Neovascularization," *ACS Chem. Biol*. 13:45-52, 2018. (8 pages).
Sun et al., "Discovery of Soluble Epoxide Hydrolase Inhibitors from Chemical Synthesis and Natural Products," *J. Med. Chem*. 64:184-215, 2021. (32 pages).
Sun et al., "Inhibition of Soluble Epoxide Hydrolase 2 Ameliorates Diabetic Keratopathy and Impaired Wound Healing in Mouse Corneas," *Diabetes* 67:1162-1172, Jun. 2018. (11 pages).
Torres et al., "Synthesis of benzopolycyclic cage amines: NMDA receptor antagonist, trypanocidal and antiviral activities," *Bioorganic & Medicinal Chemistry* 20:942-948, 2012 [Published online Dec. 2, 2011]. (7 pages).
Trindade-da-Silva et al., "Soluble Epoxide Hydrolase Pharmacological Inhibition Decreases Alveolar Bone Loss by Modulating Host Inflammatory Response, RANK-Related Signaling, Endoplasmic Reticulum Stress, and Apoptosis," *J Pharmacol Exp Ther* 361:408-416, Jun. 2017. (9 pages).
Tsai et al., "Pharmacokinetics of soluble epoxide hydrolase inhibitors in canine, rodent, feline, and primate species," *The FASEB Journal* 22(S1), Mar. 1, 2008 (Meeting Abstract Supplement). (2 pages).
Tu et al., "Soluble epoxide hydrolase inhibition decreases reperfusion injury after focal cerebral ischemia," *Scientific Reports* 8:5279, 2018 [Published online Mar. 27, 2018]. (11 pages).
Ulu et al., "Soluble Epoxide Hydrolase Inhibitors Reduce the Development of Atherosclerosis in Apolipoprotein E-Knockout Mouse Model," *J Cardiovasc. Pharmacol*. 52(4):314-323, Oct. 2008. (10 pages).
Valverde et al., "Searching for novel applications of the benzohomoadamantane scaffold in medicinal chemistry: Synthesis of novel 11β-HSD1 inhibitors," *Bioorganic & Medicinal Chemistry* 23:7607-7617, Nov. 5, 2015. (11 pages).
Valverde et al., "Novel benzopolycyclic amines with NMDA receptor antagonist activity," *Bioorganic & Medicinal Chemistry* 22:2678-2683, 2014 [Published online Mar. 24, 2014]. (6 pages).
Wagner et al., "Epoxygenated Fatty Acids and Soluble Epoxide Hydrolase Inhibition: Novel Mediators of Pain Reduction," *J. Agric. Food Chem*. 59:2816-2824, 2011. (9 pages).
Wagner et al., "Soluble epoxide hydrolase as a therapeutic target for pain, inflammatory and neurodegenerative diseases," *Pharmacology & Therapeutics* 180:62-76, 2017 [Published online Jun. 19, 2017]. (15 pages).
Wagner et al., "The role of long chain fatty acids and their epoxide metabolites in nociceptive signaling," *Prostaglandins & other Lipid Mediators* 113-115:2-12, 2014 [Published online Sep. 18, 2014]. (11 pages).
Wang et al., "Lipidomic profiling reveals soluble epoxide hydrolase as a therapeutic target of obesity-induced colonic inflammation," *PNAS* 115(20):5283-5288, May 15, 2018. (6 pages).
Wang et al., "Upregulation of soluble epoxide hydrolase in proximal tubular cells mediated proteinuria-induced renal damage," *Am J Physiol Renal Physiol* 304:F168-F176, Nov. 14, 2012. (9 pages).
Wang et al., "Use of a Soluble Epoxide Hydrolase Inhibitor in Smoke-Induced Chronic Obstructive Pulmonary Disease," *Am J Respir Cell Mol Biol* 46(5):614-622, May 2012. (9 pages).
Wolf et al., "Development of a high-throughput screen for soluble epoxide hydrolase inhibition," *Anal Biochem*. 355(1):71-80, Aug. 1, 2006. (18 pages).
Wu et al., "The Effects of sEH Inhibitor on Depression-like Behavior and Neurogenesis in Male Mice," *Journal of Neuroscience Research* 95(12), Dec. 2017. (10 pages).
Yang et al., "Metabolomic profiling of regulatory lipid mediators in sputum from adult cystic fibrosis patients," *Free Radical Biology and Medicine* 53:160-171, 2012 [Published online May 8, 2012]. (12 pages).
Yao et al., "Inhibition of soluble epoxide hydrolase ameliorates hyperhomocysteinemiainduced hepatic steatosis by enhancing β-oxidation of fatty acid in mice," *Am J Physiol Gastrointest Liver Physiol* 316:G527-G538, Feb. 21, 2019. (12 pages).
Zhang et al., "Soluble Epoxide Hydrolase Deficiency Inhibits Dextran Sulfate Sodium-induced Colitis and Carcinogenesis in Mice," *Anticancer Research* 33:5261-5272, Dec. 2013. (11 pages).

(56) References Cited

OTHER PUBLICATIONS

Zhang et al., "Soluble Epoxide Hydrolase Gene Deficiency or Inhibition Attenuates Chronic Active Inflammatory Bowel Disease in IL-10(2/2) Mice," *Dig Dis Sci* 57:2580-2591, 2012 [Published online May 16, 2012. (12 pages).

Zhang et al., "Soluble epoxide hydrolase inhibition with t-TUCB alleviates liver fibrosis and portal pressure in carbon tetrachloride-induced cirrhosis in rats," *Clinics and Research in Hepatology and Gastroenterology* 42:118-125, 2018 [Published online Oct. 12, 2017]. (8 pages).

Zhang et al., "Stabilized epoxygenated fatty acids regulate inflammation, pain, angiogenesis and cancer," *Progress in Lipid Research* 53:108-123, 2014 [Published online Dec. 15, 2013]. (16 pages).

Zhao et al., "Soluble epoxide hydrolase and ischemic cardiomyopathy," *International Journal of Cardiology* 155:181-187, 2012 [Jun. 24, 2011]. (7 pages).

Zhou et al., "Pharmacological Inhibition of Soluble Epoxide Hydrolase Ameliorates Chronic Ethanol-Induced Cardiac Fibrosis by Restoring Autophagic Flux," *Alcohol Clin Exp Re* 42(10): 1970-1978, Oct. 2018. (9 pages).

Zuloaga et al., "Mechanism of Protection by Soluble Epoxide Hydrolase Inhibition in Type 2 Diabetic Stroke," *PLOS One* 9(5), May 2014. (9 pages).

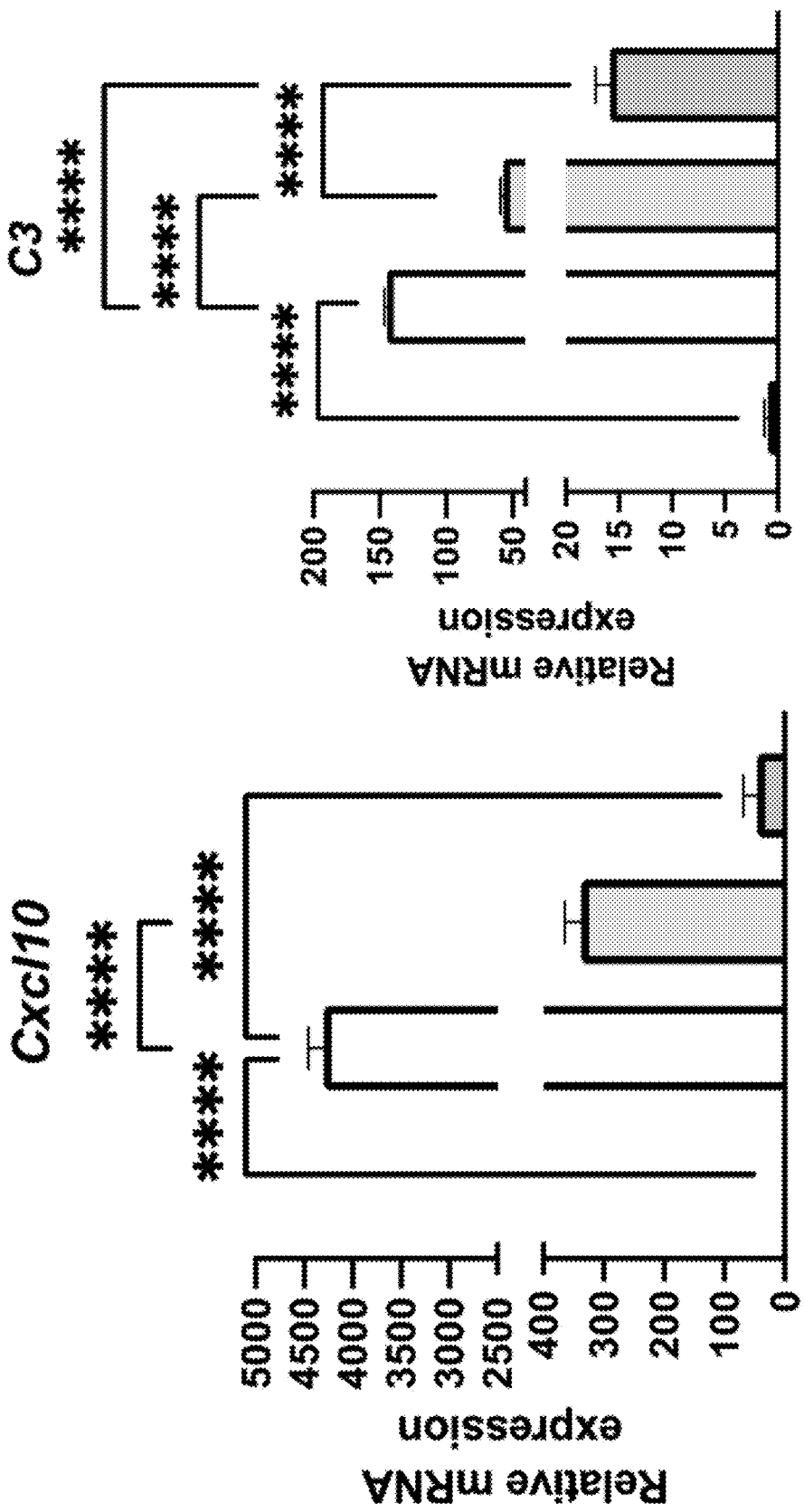

COMPOUNDS AS SOLUBLE EPOXIDE HYDROLASE INHIBITORS

REFERENCE TO AN ELECTRONIC SEQUENCE LISTING

The contents of the electronic sequence listing (920238_401C1_SeqListing.xml; Size: 18,733 bytes; and Date of Creation: Oct. 13, 2024) is herein incorporated by reference in its entirety.

The present invention relates to the field of pharmaceutical products for human and veterinary medicine, particularly to soluble epoxide hydrolase (sEH) inhibitors and their therapeutic indications.

BACKGROUND ART

A total of more than 100 patent publications have described multiple classes of sEH inhibitors, based on different chemical structures, such as amides, thioamides, ureas, thioureas, carbamates, acyl hydrazones and chalcone oxides (cf. e.g. H. C. Shen, "Soluble epoxide hydrolase inhibitors: a patent review", *Expert Opin Ther Patents* 2010, vol. 20, pp. 941-956, a review with 149 references; C.-P. Sun et al. "Discovery of soluble epoxide hydrolase inhibitors from chemical synthesis and natural products", *J Med Chem.* 2021, vol 64, pp 184-215, a review with 244 references).

sEH inhibition has been associated to various beneficial biological effects, that may be translated into various therapeutic treatments (cf. e.g. H. C. Shen and B. D. Hammock, "Discovery of inhibitors of soluble epoxide hydrolase: A target with multiple potential therapeutic indications", *J Med Chem.* 2012, vol. 55, pp. 1789-1808, a review with 117 references; K. M. Wagner et al. "Soluble epoxide hydrolase as a therapeutic target for pain, inflammatory and neurodegenerative diseases", *Pharmacol Ther.* 2017 December; 180: 62-76, a review with 186 references).

More specifically the documents cited below have described the usefulness of sEH inhibition in the treatment of the following diseases: hypertension (*Recent Pat Cardiovasc Drug Discov.* 2006 January; 1(1):67-72), atherosclerosis (*J Cardiovasc Pharmacol.* 2008 October; 52(4):314-23), pulmonary diseases such as chronic obstructive pulmonary disorder, asthma, sarcoidosis, and cystic fibrosis, (*Am J Respir Cell Mol Biol.* 2012 May; 46(5):614-22/*Am J Respir Crit Care Med.* 2014 Oct. 15; 190(8):848-50/*Resp. Res.,* 2018, 19:236/*Free Rad. Biol. Med.,* 2012, 53, 160), kidney diseases such as acute kidney injury, diabetic nephrology, chronic kidney diseases, hypertension-mediated kidney disorders and high fat diet-mediated renal injury (*Bioorg Med Chem Lett.* 2014 Jan. 15; 24(2):565-70/*Am J Physiol Renal Physiol.* 2013 Jan. 15; 304(2):F168-76/*Am J Physiol Renal Physiol.* 2014 Oct. 15; 307(8):F971-80/*Frontiers Pharmacol.* 2019, 9:1551/*Proc Natl Acad Sci USA.* 2019, 116:5154-5159), stroke (*J Biol Chem.* 2014 Dec. 26; 289(52):35826-38/*PLoS One.* 2014 May 13; 9(5):e97529), pain (*J Agric Food Chem.* 2011 Apr. 13; 59(7):2816-24/*Inflamm Allergy Drug Targets.* 2012 April; 11(2):143-58), neuropathic pain (*J Agric Food Chem.* 2011 Apr. 13; 59(7):2816-24/*Drug Discov Today* 2015 November; 20(11):1382-90/*Proc Natl Acad Sci USA.* 2015 Jul. 21; 112(29):9082-7), inflammation (*Inflamm Allergy Drug Targets.* 2012 April; 11(2):143-58/ *Proc Natl Acad Sci USA.* 2005 Jul. 12; 102(28):9772-7), pancreatitis in particular acute pancreatitis (*Mol Pharmacol.* 2015 August; 88(2):281-90), immunological disorders (WO 00/23060 A2), neurodevelopmental disorders such as schizophrenia and autism spectrum disorder (*Proc Natl Acad Sci USA,* 2019, 116:7083-7088), eye diseases (WO 2007/009001 A1/*Frontiers Pharmacol.* 2019, 10:95) in particular diabetic keratopathy (*Diabetes.* 2018 June; 67(6):1162-1172), wet age-related macular degeneration (*ACS Chem Biol.* 2018 Jan. 19; 13:45-52) and retinopathy (*Nature.* 2017 Dec. 14; 552(7684):248-252) such as premature retinopathy and diabetic retinopathy, cancer (*Prog Lipid Res.* 2014 January; 53:108-23), obesity (*Nutr Metab Cardiovasc Dis.* 2012 July; 22(7):598-604), including obesity-induced colonic inflammation (*Proc Natl Acad Sci USA.* 2018 May 15; 115(20):5283-5288), diabetes (*Proc Natl Acad Sci USA.* 2011 May 31; 108(22):9038-43), metabolic syndrome (*Exp Diabetes Res.* 2012; 2012:758614), preeclampsia (*Med. Hypotheses,* 2017 October; 108:81-5), anorexia nervosa ("Pharmacokinetic optimization of six soluble epoxide hydrolase inhibitors for the therapeutic use in a murine model of anorexia" Abstracts of Papers, 241st ACS National Meeting & Exposition, Anaheim, CA, United States, March 27-31, 2011 (2011), MEDI-92), depression (*J Neurosci Res.* 2017 December; 95(12):2483-2492), male sexual dysfunction (*Biomed. & Pharmacother.* 2019, 115: 108897) such as erectile dysfunction (*Phytother Res.* 2016 July; 30(7):1119-27), wound healing (*J Surg Res.* 2013 Jun. 15; 182(2):362-7/*BioRxiv.* 2019 March 8, doi:10.1101/571984), NSAID-induced ulcers (*J Pharmacol Exp Ther.* 2016 June; 357(3):529-36), emphysema (*Am J Respir Cell Mol Biol.* 2012 May; 46(5):614-22), scrapie (*Life Sci.* 2013 Jun. 21; 92(23):1145-50), Parkinson's disease (*Mol Neurobiol.* 2015 August; 52(1):187-95/*Proc Natl Acad Sci. USA,* 2018, 115: E5815-E5823), arthritis (*Drug Metab Dispos.* 2015 May; 43(5):788-802), arrhythmia (*Cardiovasc Ther.* 2011 April; 29(2):99-111), cardiac fibrosis (*Alcoholism.* 2018, 42, 1970), Alzheimer's disease (*Pharmacol Ther.* 2017 December; 180:62-76/*Neurotherapeutics* June; 2020, 17:1825-1835), Raynaud's syndrome (WO 2003/002555 A1), Niemann-Pick-type C disease (*Experimental Molecular Medicine.* 2018, 50:149), cardiomyopathy (*Int J Cardiol.* 2012 Mar. 8; 155(2):181-7), vascular cognitive impairment (*Prostaglandins Other Lipid Mediat.* 2014 October; 113-115:30-7), mild cognitive impairment (*Pharmacol Ther.* 2017 December; 180:62-76), inflammatory bowel diseases (*Dig Dis Sci.* 2012 October; 57(10):2580-91/*PLoS One.* 2019 April 19, 14(4): e0215033), cirrhosis (*Toxicol Appl Pharmacol.* 2015 Jul. 15; 286(2):102-11), non-alcoholic fatty liver disease (*PLoS One.* 2014 Oct 13, 9(10):e110162), non-alcoholic steatohepatitis (*Am J Physiol Gastrointest Liver Physiol.* 2019, 316, G527-G538), liver fibrosis (*Clinics Res Hepatol Gastroenterol* 2018, 42, 118-125), osteoporosis (*FASEB J.* 2015 March; 29(3):1092-101), chronic periodontitis (*J Pharmacol Exp Ther.* 2017 June; 361(3):408-416), sepsis (*FASEB J.* March 2008 22 (Meeting Abstract Supplement) 479.17), seizure disorders such as epilepsy (*PLoS One.* 2013 Dec. 11; 8(12): e80922), dementia (*Prostaglandins Other Lipid Mediat.* 2014 October; 113-115:30-7), edema such as cerebral edema (*Stroke.* 2015 July; 46(7):1916-22), attention-deficit hyperactivity disorder (WO 2017/120012 A1), schizophrenia (*Proc Natl Acad Sci USA.* 2016 Mar. 29; 113(13):E1944-52), drug dependency (WO 2017/120012 A1), social anxiety (WO 2017/120012 A1), colitis (*Anticancer Res.* 2013 December; 33(12):5261-5271), amyotrophic lateral sclerosis (WO 2016/133788 A1), chemotherapy induced side effects (*Toxicology.* 2017 Aug. 15; 389:31-41), laminitis (*Equine Vet J.* 2017 May; 49(3):345-351), inflammatory joint pain and synovitis (*J Vet Pharmacol Ther.* 2018 April; 41(2):230-238), endothelial dysfunction (*Prostaglandins Other Lipid Mediat.* 2017 July; 131:67-74), subarachnoid hemorrhage (*Stroke.* 2015 July; 46(7):1916-22), including aneurysmal subarachnoid hemorrhage (*J Neurosurg Anesthesiol.* 2015 July; 27(3):222-240), traumatic brain injury (*Oncotarget.* 2017 Sep. 21; 8(61):103236-60), cerebral ischemia (*Scientific Reports.* 2018, 8:5279), diabetes-induced learning and memory impairment (*Prostaglandins Other Lipid Mediat.* 2018 May; 136:84-89), cytokine storm (WO 2020/146770 A1/*Cancer Metastasis Rev* 2020, 39:337), multiple sclerosis (*Int J Mol Sci.*, 2021, 22(9):4650), and idiopathic pulmonary fibrosis (*Exp Mol Med.*, 2021, 53(5): 864-874).

International patent application number WO 2019/243414 A1 describes polycyclic compounds as soluble epoxide hydrolase inhibitors.

Despite the high inhibitory activity of many of the reported sEH inhibitory compounds, until now no sEH inhibitor has reached the market. It has been found that many of the sEH inhibitory compounds including those specifically described in WO 2019/243414 A1 lack sufficient metabolic stability (in particular stability against hepatic CYP-mediated metabolism) to be useful as a drug.

Also, inhibitors that can penetrate blood brain barrier (BBB) are important to treat neurological diseases.

Thus, there is a need to develop new sEH inhibitors having both a high inhibitory activity for soluble epoxide hydrolase and a high metabolic stability, in particular stability against hepatic CYP-mediated metabolism as determined by a microsomal stability assay in human microsomes.

It is also advantageous that compounds of the invention have a high metabolic stability when tested in rat or mouse microsomes because the selection of the compounds for its further testing in humans is made only for compounds which have good microsomal stability in rat or mouse. It is also advantageous that the compounds are able to cross the BBB.

DESCRIPTION OF THE FIGURES

As shown in FIG. 1, there is a heavy burden of plaques (white spots) in most of the brain areas illustrated in the 5XFAD-control group compared to the WT-control and 5XFAD-treated mice groups.

FIG. 5C provides data for II-1β. FIG. 5D provides data for II-6.

FIGS. 5E, 5F, 5G and 5H. mRNA levels of representative reactive astrocyte markers from the human cortex astrocyte treated with DMSO or the compound of example 2 using qPCR. GAPDH was used to normalize for the amounts of cDNA (n=4 per group). Data are shown as the mean±SEM, p values were determined by one-way ANOVA. *$p<0.05$, $p<0.01$, *$p<0.001$, ***$p<0.0001$ versus Control, T/I/C or the compound of example 2 treated. FIG. 5E provides data for Nos; FIG. 5F provides data for Cox2: FIG. 5G provides data for Cxcl10: FIG. 5H provides data for C3.

SUMMARY OF INVENTION

Figure 1:
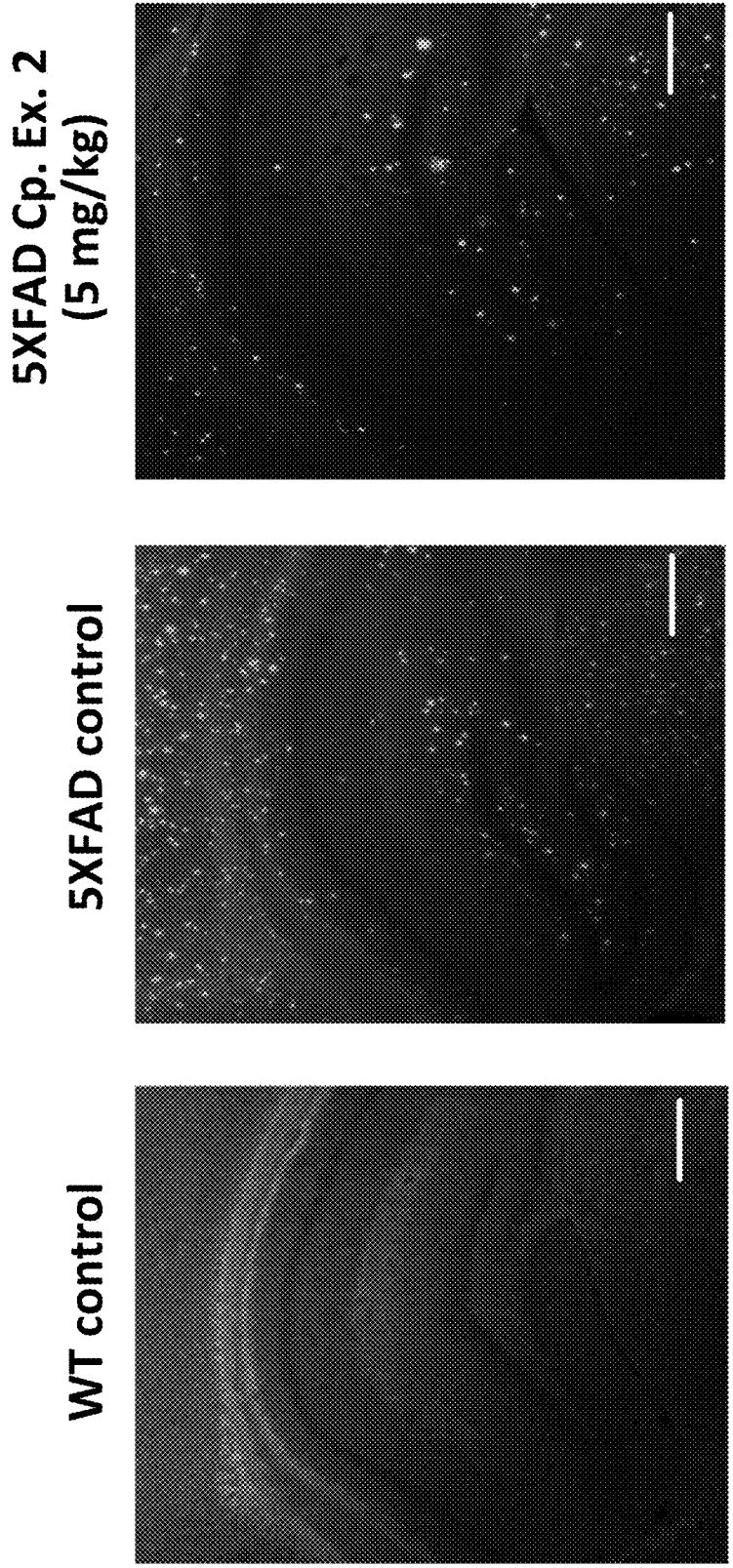
FIG. 1. Histological images of amyloid plaques stained with thioflavin-S of example 15 showing representative β-amyloid plaques distribution in the hippocampus in WT-control, 5XFAD-control and 5XFAD-treated group.

The inventors have found new sEH inhibitors having an unexpectedly a high inhibitory activity for soluble epoxide hydrolase, a high metabolic stability, in particular stability against hepatic CYP-mediated metabolism as determined by a microsomal stability assay in human microsomes, as well as significant efficacy in a seizure assay due to the ability of the compounds to cross the BBB, thereby readily penetrating the CNS and protecting the subject from seizure.

Thus, in a first aspect the present invention relates to compounds of formula (I)

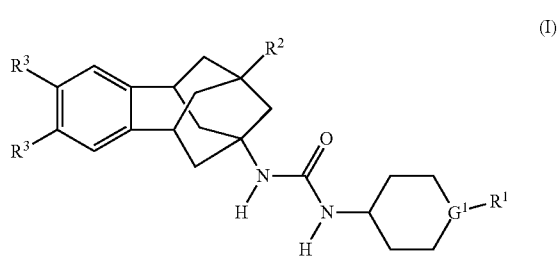

or a stereoisomer or a pharmaceutically acceptable salt thereof, wherein:

$G^1$ represents a nitrogen atom or a —CH— group;

when $G^1$ is nitrogen atom group, $R^1$ is selected from
a) carbonyl containing groups selected from the group consisting of a1) linear or branched $C_3$-$C_6$ acyl or $C_3$-$C_6$ cycloalkyl-C(=O), all of them optionally substituted by 1 substituent selected from the group consisting of halogen atoms, cyano (C≡N), trifluoromethoxy (OCF$_3$), and $C_1$-$C_6$ alkoxy, a2) trifluoroacetyl, 3,3,3-trifluoropropionyl, tetrahydropyrancarbonyl, oxetanecarbonyl or (tetrahydro-2H-thiopyran)carbonyl and a3) $C_6$-$C_{14}$-arylcarbonyl or $C_4$-$C_{14}$-heteroarylcarbonyl wherein the heteroaryl group has 5 to 14 members and 1 to 3 heteroatoms selected from the group consisting of N, O and S in the ring system, all of them optionally substituted by 1 to 4 substituents selected from the group consisting of halogen atoms, cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy and C$_1$-C$_6$ alkyl;
  b) phenyl which may be optionally substituted by 1 to 4 substituents selected from the group consisting of halogen atoms, C$_1$-C$_6$ acyl, cyano (C≡N), trifluoromethyl (CF$_3$), trifluoromethoxy (OCF$_3$), pentafluorosulfanyl (SF$_5$), sulfonyl (SO$_3$H), fluorosulfanyl (SO$_2$F), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy, C1-C$_6$ alkyl, C$_3$-C$_6$ cycloalkyl and C$_1$-C$_6$ alkoxycarbonylmethyl, and
  c) sulfonyl containing groups selected from the group consisting of linear or branched C$_1$-C$_6$ alkylsulfonyl, C$_3$-C$_6$ cycloalkylsulfonyl, and C$_6$-C$_{10}$ arylsulfonyl optionally substituted by 1 to 2 substituents selected from the group consisting of halogen atoms, nitro (NO$_2$), cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy, C$_1$-C$_6$ alkyl and C$_1$-C$_6$ alkoxycarbonylmethyl;
when G$^1$ is a —CH— group, R$^1$ is a phenoxy which may be unsubstituted or substituted by 1 to 4 groups selected from COOH, COOR$^4$, CONH$_2$, CN, fluor, chloro, trifluoromethyl, cyclopropyl and OH;
R$^2$ is an halogen atom;
R$^3$ is selected from the group consisting of hydrogen and methoxy;
R$^4$ is a radical selected from C$_1$-C$_6$ alkyl and C$_3$-C$_6$ cycloalkyl
and stereoisomers and pharmaceutically acceptable salts thereof.

In a second aspect of the present invention relates to pharmaceutical or veterinary compositions comprising therapeutically effective amounts of compounds of the first aspect of the invention and preferably adequate amounts of pharmaceutically acceptable excipients.

In a third aspect the present invention relates to the compounds of the first aspect of the invention and to the compositions of the second aspect of the invention for use as a medicament.

In a fourth aspect the present invention relates to the compounds of the first aspect of the invention and to the compositions of the second aspect of the invention for use in the treatment or prevention in an animal, including a human, of a disease or disorder susceptible of improvement by inhibition of soluble epoxide hydrolase.

In a fifth aspect the present invention relates to the use of the compounds of the first aspect of the invention for the manufacture of a medicament for the treatment or prevention in an animal, including a human, of a disease or disorder susceptible of improvement by inhibition of soluble epoxide hydrolase.

In a sixth aspect the present invention relates to a method of prevention or treatment of diseases or disorders susceptible of improvement by inhibition of soluble epoxide hydrolase by administration to a patient in need thereof of the compounds of the first aspect of the invention or of the compositions of the second aspect of the invention.

DETAILED DESCRIPTION OF INVENTION

In a first aspect the present invention relates to compounds of formula (I)

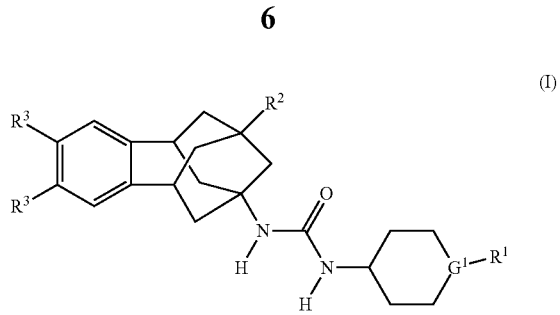

or a stereoisomer or a pharmaceutically acceptable salt thereof, wherein:
G$^1$ represents a nitrogen atom or a —CH— group;
when G$^1$ is nitrogen atom group, R$^1$ is selected from
  a) carbonyl containing groups selected from the group consisting of a1) linear or branched C$_3$-C$_6$ acyl or C$_3$-C$_6$ cycloalkyl-C(=O), all of them optionally substituted by 1 substituent selected from the group consisting of halogen atoms, cyano (C≡N), trifluoromethoxy (OCF$_3$), and C$_1$-C$_6$ alkoxy, a2) trifluoroacetyl, 3,3,3-trifluoropropionyl, tetrahydropyrancarbonyl, oxetanecarbonyl or (tetrahydro-2H-thiopyran)carbonyl and a3) C$_6$-C$_{14}$-arylcarbonyl or C$_4$-C$_{14}$-heteroarylcarbonyl wherein the heteroaryl group has 5 to 14 members and 1 to 3 heteroatoms selected from the group consisting of N, O and S in the ring system, all of them optionally substituted by 1 to 4 substituents selected from the group consisting of halogen atoms, cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy and C$_1$-C$_6$ alkyl;
  b) phenyl which may be optionally substituted by 1 to 4 substituents selected from the group consisting of halogen atoms, C$_1$-C$_6$ acyl, cyano (C≡N), trifluoromethyl (CF$_3$), trifluoromethoxy (OCF$_3$), pentafluorosulfanyl (SF$_5$), sulfonyl (SO$_3$H), fluorosulfanyl (SO$_2$F), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy, C1-C$_6$ alkyl, C$_3$-C$_6$ cycloalkyl and C$_1$-C$_6$ alkoxycarbonylmethyl, and
  c) sulfonyl containing groups selected from the group consisting of linear or branched C$_1$-C$_6$ alkylsulfonyl, C$_3$-C$_6$ cycloalkylsulfonyl, and C$_6$-C$_{10}$ arylsulfonyl optionally substituted by 1 to 2 substituents selected from the group consisting of halogen atoms, nitro (NO$_2$), cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-C$_1$-C$_6$ alkylamino, di-C$_1$-C$_6$ alkylamino, hydroxyl, C$_1$-C$_6$ alkoxy, C$_1$-C$_6$ alkyl and C$_1$-C$_6$ alkoxycarbonylmethyl;
when G$^1$ is a —CH— group, R$^1$ is a phenoxy which may be unsubstituted or substituted by 1 to 4 groups selected from COOH, COOR$^4$, CONH$_2$, CN, fluor, chlorine, trifluoromethyl, cyclopropyl and OH;
R$^2$ is an halogen atom;
R$^3$ is selected from the group consisting of hydrogen and methoxy;
R$^4$ is a radical selected from C$_1$-C$_6$ alkyl and C$_3$-C$_6$ cycloalkyl and stereoisomers and pharmaceutically acceptable salts thereof.

In an embodiment of the different aspects of the present invention $G^1$ is N.

In another embodiment of the different aspects of the present invention $G^1$ is N and $R^1$ is a carbonyl containing group selected from the group consisting of a1) linear or branched $C_3$-$C_6$ acyl or $C_3$-$C_6$ cycloalkyl-C(=O), all of them optionally substituted by 1 substituent selected from the group consisting of halogen atoms, cyano (C≡N), trifluoromethoxy (OCF$_3$), and C1-$C_6$ alkoxy, a2) trifluoroacetyl, 3,3,3-trifluoropropionyl, tetrahydropyrancarbonyl, oxetanecarbonyl, or (tetrahydro-2H-thiopyran)carbonyl and a3) $C_6$-$C_{14}$-arylcarbonyl or $C_4$-$C_{14}$-heteroarylcarbonyl wherein the heteroaryl group has 5 to 14 members and 1 to 3 heteroatoms selected from the group consisting of N, O and S in the ring system, all of them optionally substituted by 1 to 4 substituents selected from the group consisting of halogen atoms, cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-C1-$C_6$ alkylamino, di-$C_1$-$C_6$ alkylamino, hydroxyl, C1-$C_6$ alkoxy and C1-$C_6$ alkyl. In a particular embodiment the arylcarbonyl is a phenyl carbonyl and the heteroaryl carbonyl is a pyridincarbonyl or furancarbonyl.

In another embodiment of the different aspects of the present invention $G^1$ is N and $R^1$ is a carbonyl containing group selected from the group consisting of a1) linear or branched $C_3$-$C_6$ acyl or $C_3$-$C_6$ cycloalkyl-C(=O), all of them optionally substituted by 1 substituent selected from the group consisting of halogen atoms, cyano (C≡N), trifluoromethoxy (OCF$_3$), and C1-$C_6$ alkoxy, a2) trifluoroacetyl, 3,3,3-trifluoropropionyl, tetrahydropyrancarbonyl, oxetanecarbonyl, or (tetrahydro-2H-thiopyran)carbonyl and a3) $C_6$-$C_{14}$-arylcarbonyl or $C_4$-$C_{14}$-heteroarylcarbonyl wherein the heteroaryl group has 5 to 14 members and 1 to 3 heteroatoms selected from the group consisting of N, O and S in the ring system, all of them optionally substituted by 1 to 4 substituents selected from the group consisting of halogen atoms, cyano (C≡N), trifluoromethyl (CF$_3$), trifluoromethoxy (OCF$_3$), pentafluorosulfanyl (SF$_5$), sulfonyl (SO$_3$H), carboxylic group (COOH), amino (NH$_2$), mono-C1-$C_6$ alkylamino, di-$C_1$-$C_6$ alkylamino, hydroxyl, C1-$C_6$ alkoxy and C1-$C_6$ alkyl. In a particular embodiment the arylcarbonyl is a phenyl carbonyl and the heteroaryl carbonyl is a pyridincarbonyl or furancarbonyl.

In another embodiment of the different aspects of the present invention $G^1$ is N and $R^1$ is selected from the group consisting of linear or branched $C_3$-$C_6$ acyl, $C_3$-$C_6$ cycloalkyl-C(=O) optionally substituted with a F atom or a cyano group, trifluoroacetyl, 3,3,3-trifluoropropionyl, tetrahydropyrancarbonyl, oxetancarbonyl, (tetrahydro-2H-thiopyran)carbonyl, preferably 2-methylbutanoyl, cyclopropyl-C(=O) and tetrahydropyrancarbonyl.

In another embodiment of the different aspects of the present invention $G^1$ is N and $R^1$ is a phenyl which may be optionally substituted by 1 to 4 substituents selected from the group consisting of halogen atoms, $C_1$-$C_6$ acyl, cyano (C≡N), trifluoromethyl (CF$_3$), trifluoromethoxy (OCF$_3$), pentafluorosulfanyl (SF$_5$), sulfonyl (SO$_3$H), fluorosulfonyl (SO$_2$F), carboxylic group (COOH), ester group (COOR$^4$), amino (NH$_2$), mono-$C_1$-$C_6$ alkylamino, di-$C_1$-$C_6$ alkylamino, hydroxyl, $C_1$-$C_6$ alkoxy, $C_1$-$C_6$ alkyl, $C_3$-$C_6$ cycloalkyl and $C_1$-$C_6$ alkoxycarbonylmethyl.

In another embodiment of the different aspects of the present invention $G^1$ is N and $R^1$ is a phenyl which may be optionally substituted by 1 to 4 substituents selected from the group consisting of halogen atoms, $C_1$-$C_6$ acyl, cyano (C≡N), trifluoromethyl (CF$_3$), trifluoromethoxy (OCF$_3$), pentafluorosulfanyl (SF$_5$), sulfonyl (SO$_3$H), fluorosulfonyl (SO$_2$F), carboxylic group (COOH), amino (NH$_2$), mono-$C_1$-$C_6$ alkylamino, di-$C_1$-$C_6$ alkylamino, hydroxyl, $C_1$-$C_6$ alkoxy, $C_1$-$C_6$ alkyl, $C_3$-$C_6$ cycloalkyl and $C_1$-$C_6$ alkoxycarbonylmethyl.

In another embodiment of the different aspects of the present invention $G^1$ is N and $R^1$ is a sulfonyl containing group selected from the group consisting of linear or branched $C_1$-$C_6$ alkylsulfonyl, $C_3$-$C_6$ cycloalkylsulfonyl, and $C_6$-$C_{10}$ arylsulfonyl which may be optionally substituted by 1 to 2 substituents selected from the group consisting of halogen atoms, nitro (NO$_2$), cyano (C≡N), trifluoromethyl (CF$_3$), trifluoromethoxy (OCF$_3$), pentafluorosulfanyl (SF$_5$), sulfonyl (SO$_3$H), carboxylic group (COOH), ester group (COOR$^4$), amino (NH$_2$), mono-$C_1$-$C_6$ alkylamino, di-$C_1$-$C_6$ alkylamino, hydroxyl, $C_1$-$C_6$ alkoxy, $C_1$-$C_6$ alkyl and $C_1$-$C_6$ alkoxycarbonylmethyl, preferably $C_1$-$C_6$ alkylsulfonyl and $C_3$-$C_6$ cycloalkylsulfonyl.

In another embodiment of the different aspects of the present invention $G^1$ is N and $R^1$ is a sulfonyl containing group selected from the group consisting of linear or branched $C_1$-$C_6$ alkylsulfonyl, $C_3$-$C_6$ cycloalkylsulfonyl, and $C_6$-$C_{10}$ arylsulfonyl which may be optionally substituted by 1 to 2 substituents selected from the group consisting of halogen atoms, nitro (NO$_2$), cyano (C≡N), trifluoromethyl (CF$_3$), trifluoromethoxy (OCF$_3$), pentafluorosulfanyl (SF$_5$), sulfonyl (SO$_3$H), carboxylic group (COOH), amino (NH$_2$), mono-$C_1$-$C_6$ alkylamino, di-$C_1$-$C_6$ alkylamino, hydroxyl, $C_1$-$C_6$ alkoxy, $C_1$-$C_6$ alkyl and $C_1$-$C_6$ alkoxycarbonylmethyl, preferably $C_1$-$C_6$ alkylsulfonyl and $C_3$-$C_6$ cycloalkylsulfonyl.

In another embodiment of the different aspects of the present invention $G^1$ is a —CH— group and $R^1$ is a phenoxy which may be unsubstituted or substituted by 1 to 2 groups selected from COOH, COOR$^4$, CONH$_2$, CN, fluor, chlorine, trifluoromethyl, cyclopropyl and OH.

In another embodiment of the different aspects of the present invention $G^1$ is a —CH— group and $R^1$ is a phenoxy which may be unsubstituted or substituted by 1 to 2 groups selected from COOH, CONH$_2$, CN, fluor, chlorine, trifluoromethyl, cyclopropyl and OH.

When $G^1$ is a —CH— group and $R^1$ is an optionally substituted phenoxy group as defined above wherein $R^5$ is selected from the group consisting of COOH, COOR$^4$, CONH$_2$, CN, fluor, chlorine, trifluoromethyl, cyclopropyl and OH (preferably wherein $R^5$ is selected from the group consisting of COOH, CONH$_2$, CN, fluor, chlorine, trifluoromethyl, cyclopropyl and OH) and n has a value of 0 to 4, the compounds of formula (Ia) exist in cis and trans configurations as shown below and both are covered by the present invention. In a preferred embodiment, the compounds of formula (I) are in the trans configuration (Ia trans).

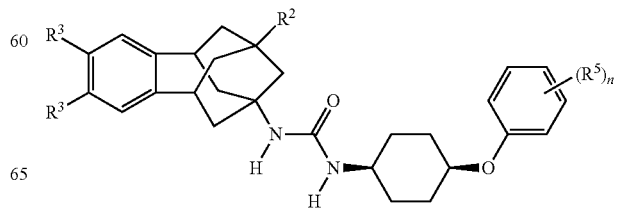

(Ia cis)

-continued (Ia trans)

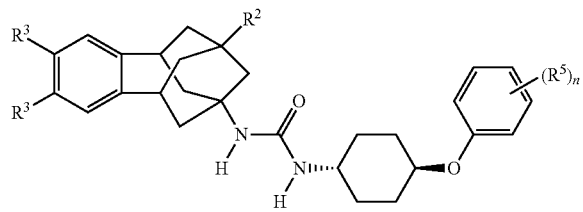

In an embodiment of the different aspects of the present invention $R^2$ is a chlorine or a fluorine atom, preferably it is a fluorine atom when $G^1$ is nitrogen and it is a chlorine atom when $G^1$ is CH.

In an embodiment of the different aspects of the present invention $R^3$ are both hydrogen atoms.

In a particular embodiment the different aspects of the present invention the compound is selected from the group consisting of:

i. 4-[((1r,4r)-4-(3-(9-fluoro-5,6,8,9,10,11-hexahydro-7H-5,9:7,11-dimethanobenzo[9]annulen-7-yl)ureido)cyclohexyl)oxy]benzoic acid,
ii. 4-[((1r,4r)-4-(3-(9-chloro-5,6,8,9,10,11-hexahydro-7H-5,9:7,11-dimethanobenzo[9]annulen-7-yl)ureido)cyclohexyl)oxy]benzoic acid,
iii. 1-(9-chloro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea,
iv. 1-(9-fluoro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea,
v. 1-(9-fluoro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea,
vi. 1-(9-chloro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea,
vii. 1-(9-fluoro-5,6,8,9,10,11-hexahydro-7H-5,9:7,11-dimethanobenzo[9]annulen-7-yl)-3-(1-(cyclopropanecarbonyl)piperidin-4-yl)urea,
viii. 1-(9-chloro-5,6,8,9,10,11-hexahydro-7H-5,9:7,11-dimethanobenzo[9]annulen-7-yl)-3-(1-(cyclopropanecarbonyl)piperidin-4-yl)urea,
ix. 1-(9-chloro-5,6,8,9,10,11-hexahydro-7H-5,9:7,11-dimethanobenzo[9]annulen-7-yl)-3-(1-(1-fluorocyclopropane-1-carbonyl)piperidin-4-yl)urea,
x. 1-(9-chloro-5,6,8,9,10,11-hexahydro-7H-5,9:7,11-dimethanobenzo[9]annulen-7-yl)-3-(1-(2,2,2-trifluoroacetyl)piperidin-4-yl)urea,
xi. 1-(9-chloro-5,6,8,9,10,11-hexahydro-7H-5,9:7,11-dimethanobenzo[9]annulen-7-yl)-3-(1-(isopropylsulfonyl)piperidin-4-yl)urea,
xii. 1-(9-chloro-5,6,8,9,10,11-hexahydro-7H-5,9:7,11-dimethanobenzo[9]annulen-7-yl)-3-(1-propionylpiperidin-4-yl)urea,
xiii. 4-(4-(3-(9-fluoro-5,6,8,9,10,11-hexahydro-7H-5,9:7,11-dimethanobenzo[9]annulen-7-yl)ureido)piperidin-1-yl)benzoic acid,
xiv. 4-(4-(3-(9-chloro-5,6,8,9,10,11-hexahydro-7H-5,9:7,11-dimethanobenzo[9]annulen-7-yl)ureido)piperidin-1-yl)benzoic acid,
xv. methyl 4-(4-(3-(9-chloro-5,6,8,9,10,11-hexahydro-7H-5,9:7,11-dimethanobenzo[9]annulen-7-yl)ureido)piperidine-1-carbonyl)benzoate, and
xvi. 4-(4-(3-(9-chloro-5,6,8,9,10,11-hexahydro-7H-5,9:7,11-dimethanobenzo[9]annulen-7-yl)ureido)piperidine-1-carbonyl)benzoic acid.

Some of the compounds of the invention are metabolized to distinct compounds also according to the invention, the latter having improved microsomal stability.

In particular embodiments of the third, fourth, fifth and sixth aspects of the present invention the disease or disorder susceptible of improvement by inhibition of soluble epoxide hydrolase is selected from the group consisting of hypertension, atherosclerosis, pulmonary diseases such as chronic obstructive pulmonary disorder, asthma, sarcoidosis and cystic fibrosis, kidney diseases such as acute kidney injury, diabetic nephrology, chronic kidney diseases, hypertension-mediated kidney disorders and high fat diet-mediated renal injury, stroke, pain, neuropathic pain, inflammation, pancreatitis in particular acute pancreatitis, immunological disorders, neurodevelopmental disorders such as schizophrenia and autism spectrum disorder, eye diseases in particular diabetic keratopathy, wet age-related macular degeneration and retinopathy such as premature retinopathy and diabetic retinopathy, cancer, obesity, including obesity-induced colonic inflammation, diabetes, metabolic syndrome, preeclampsia, anorexia nervosa, depression, male sexual dysfunction such as erectile dysfunction, wound healing, NSAID-induced ulcers, emphysema, scrapie, Parkinson's disease, arthritis, arrhythmia, cardiac fibrosis, Alzheimer's disease, Raynaud's syndrome, Niemann-Pick-type C disease, cardiomyopathy, vascular cognitive impairment, mild cognitive impairment, inflammatory bowel diseases, cirrhosis, non-alcoholic fatty liver disease, non-alcoholic steatohepatitis, liver fibrosis, osteoporosis, chronic periodontitis, sepsis, seizure disorders such as epilepsy, dementia, edema such as cerebral edema, attention-deficit hyperactivity disorder, schizophrenia, drug dependency, social anxiety, colitis, amyotrophic lateral sclerosis, chemotherapy induced side effects, laminitis, inflammatory joint pain and synovitis, endothelial dysfunction, subarachnoid hemorrhage, including aneurysmal subarachnoid hemorrhage, traumatic brain injury, cerebral ischemia, diabetes-induced learning and memory impairment, cytokine storm, multiple sclerosis, and idiopathic pulmonary fibrosis.

In another particular embodiment of the third, fourth, fifth and sixth aspects of the present invention the disease or disorder susceptible of improvement by inhibition of soluble epoxide hydrolase is selected from the group consisting of hypertension, atherosclerosis, pulmonary diseases such as chronic obstructive pulmonary disorder, asthma, sarcoidosis and cystic fibrosis, kidney diseases such as acute kidney injury, diabetic nephrology, chronic kidney diseases, hypertension-mediated kidney disorders and high fat diet-mediated renal injury, stroke, pain, neuropathic pain, inflammation, pancreatitis in particular acute pancreatitis, immunological disorders, neurodevelopmental disorders such as schizophrenia and autism spectrum disorder, eye diseases in particular diabetic keratopathy, wet age-related macular degeneration and retinopathy such as premature retinopathy and diabetic retinopathy, cancer, obesity, including obesity-induced colonic inflammation, diabetes, metabolic syndrome, preeclampsia, anorexia nervosa, depression, male sexual dysfunction such as erectile dysfunction, wound healing, NSAID-induced ulcers, emphysema, scrapie, Parkinson's disease, arthritis, arrhythmia, cardiac fibrosis, Alzheimer's disease, Raynaud's syndrome, Niemann-Pick-type C disease, cardiomyopathy, vascular cognitive impairment, mild cognitive impairment, inflammatory bowel diseases, cirrhosis, non-alcoholic fatty liver disease, non-alcoholic steatohepatitis, liver fibrosis, osteoporosis, chronic periodontitis, sepsis, seizure disorders such as epilepsy, dementia, edema such as cerebral edema, attention-deficit hyperactivity disorder, schizophrenia, drug dependency, social anxiety, colitis, amyotrophic lateral sclerosis, chemotherapy induced side effects, laminitis, inflammatory joint pain and synovitis, endothelial dysfunction, subarachnoid hemorrhage, including aneurysmal subarachnoid hemorrhage, traumatic brain injury, cerebral ischemia, diabetes-induced learning and memory impairment, and cytokine storm.

According to another aspect of the present invention, the compounds of formula (I) may be prepared by reacting the amine of formula (II), preferably in the form of a salt such as the hydrochloride with isocyanate of formula (III), in an inert solvent such as dichloromethane (DCM), and in the presence of a base such as triethylamine.

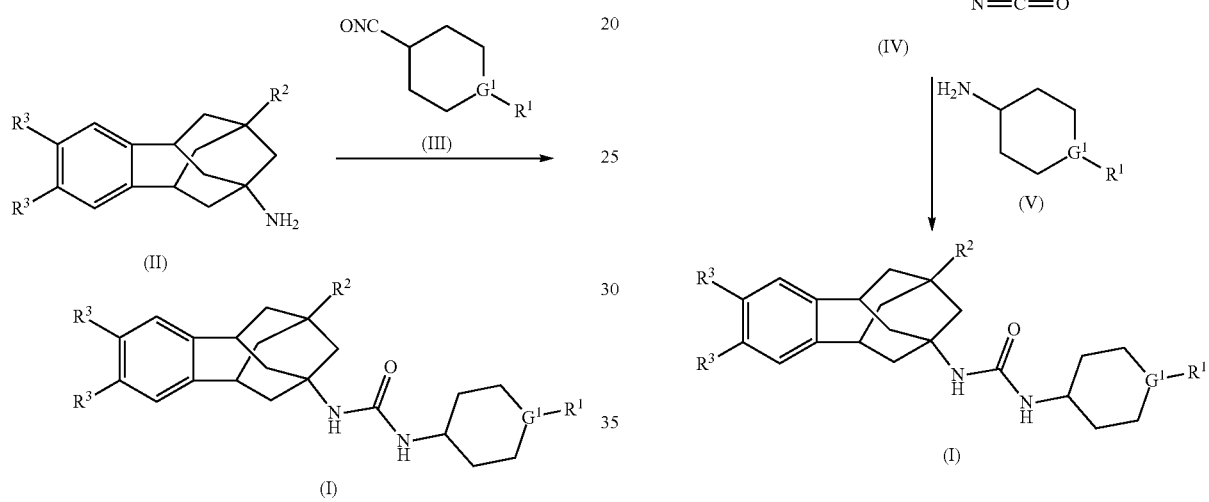

According to another aspect of the present invention, the compounds of formula (I), may also be prepared by converting in a first step the amine of formula (II), preferably in the form of a salt, into isocyanate of formula (IV) by reaction with an (NH$_2$→NCO)-converting reagent, such as triphosgene, in an inert solvent, such as DCM. In a second step, the amine of formula (V) is reacted with the isocyanate of formula (IV) to yield compound of formula (I). The coupling reaction may be carried out without catalyst and the reaction conveniently takes place at room temperature in the presence of an organic solvent, typically DCM, tetrahydrofuran (THF) or N,N-dimethylformamide (DMF). When R$^1$ is H in the structure depicted below for the compounds formula (I), which is a compound of formula (XII), in the reaction of the amine of formula (V) with the isocyanate of formula (IV) the R$^1$ group is preferably an amine protecting group, such as a tert-butoxycarbonyl group (Boc), which is deprotected after the coupling reaction by conventional means, such as treatment with an acid (e.g. HCl) in an organic solvent (e.g. DCM) to provide amine (I) wherein R$^1$ is H, i.e. a compound of formula (XII). This compound (XII), having an unsubstituted piperidinyl rest, is subsequently converted into a piperidinyl rest carrying substituent R$^1$ as defined in the claims using procedures described below for compounds (Ic), i.e. either using RCO$_2$H, EDCl, DMAP or HOBt, EtOAc; or using RCOCl and Et$_3$N in DCM.

The amines of formula (II) may be obtained using a range of different reactions depending on the nature of the substituents R$^2$ and R$^3$ and some amines of formula (II) are disclosed in the art (see for example *Bioorg Med Chem.* 2014, 22, 2678; *Bioorg Med Chem.* 2015, 23, 290 and WO 2019/243414 A1).

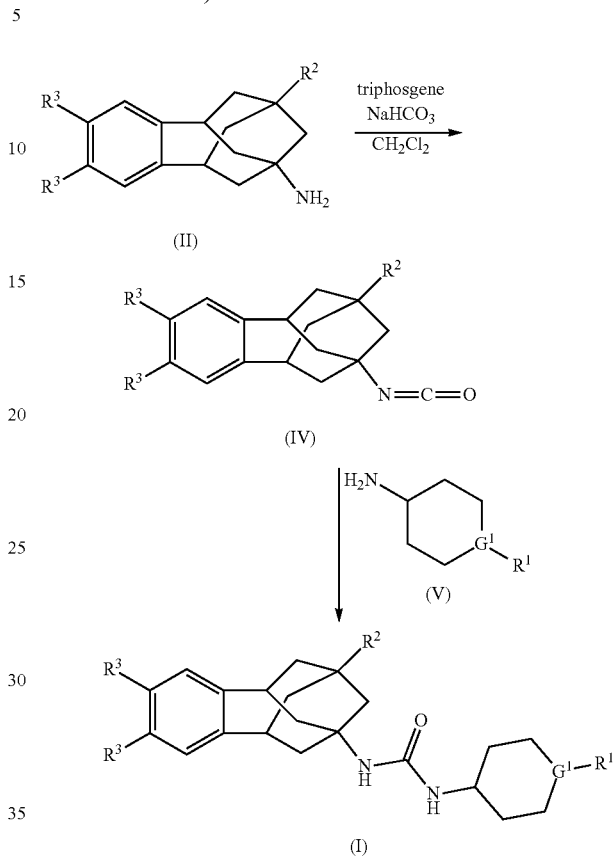

When R$^2$ is bromine or fluorine the amines of formula (IIb) and (IIc) may be prepared according to the reaction scheme shown below:

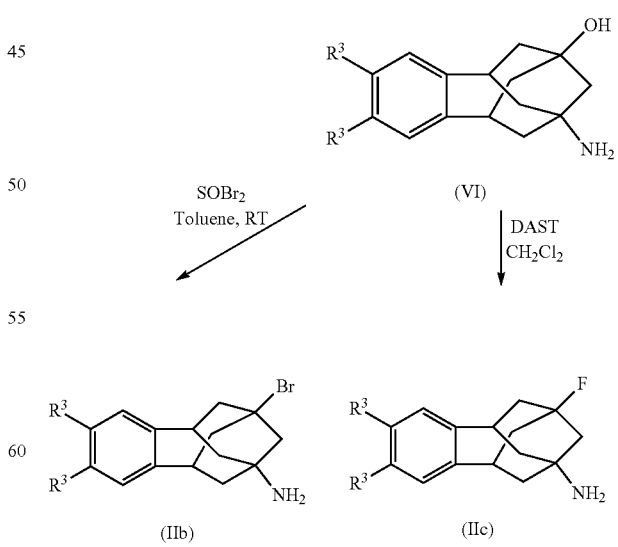

Alternatively, the amine (IIc) may be obtained starting from compound (VII) according to the scheme below:

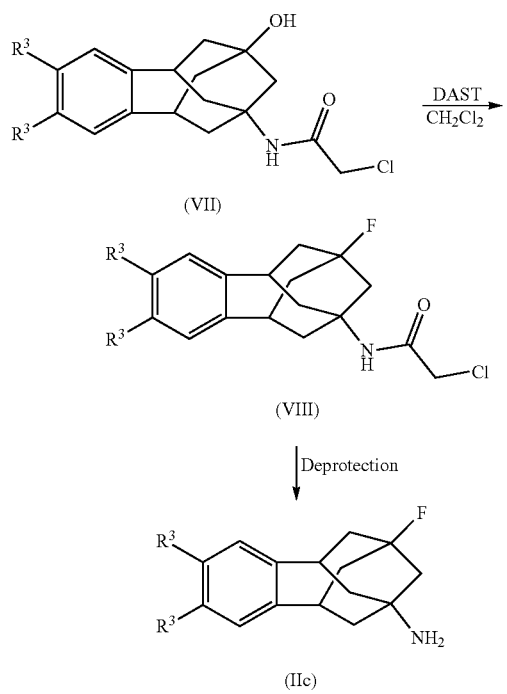

(VII)

(VIII)

(IIc)

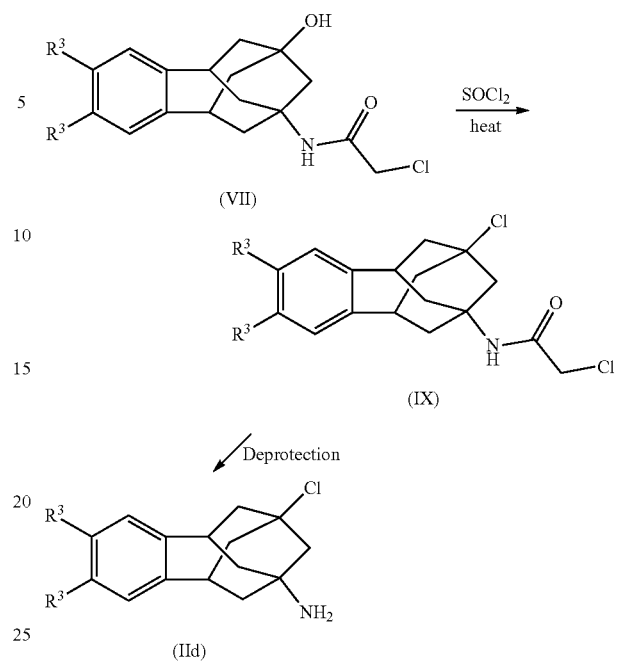

(VII)

(IX)

(IId)

The deprotection step of the chloroacetamide to yield the final amine (IIc) may be carried out by refluxing overnight the compound (VIII) in the presence of thiourea and acetic acid in ethanol.

When $R^2$ is chlorine the amines of formula (IId) may be prepared according to the reaction scheme shown below:

The deprotection step of the chloroacetamide to yield the final amine (IId) may be carried out by refluxing overnight the compound (IX) in the presence of thiourea and acetic acid in ethanol.

The intermediate compounds of formulae (VI) and (VII) may be prepared according to the reaction scheme shown below:

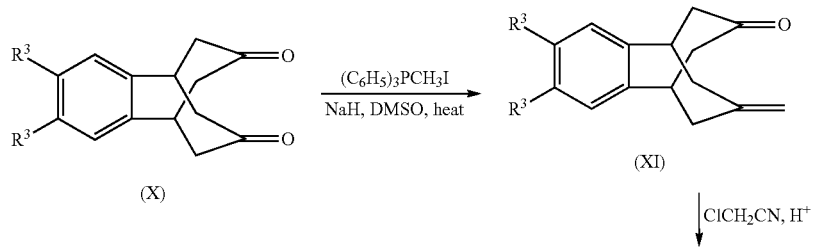

(X)

(XI)

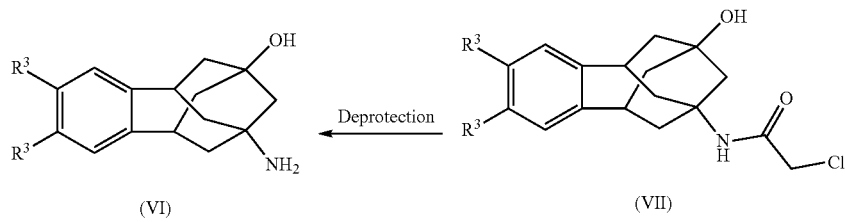

(VI)

(VII)

The deprotection step of the chloroacetamide to yield the compound of formula (VI) may be carried out by refluxing overnight the compound (VII) in the presence of thiourea and acetic acid in ethanol.

Diketone (X) is a known compound when $R^3$=H (*Liebigs Ann Chem.* 1973; 1839-1850) and when $R^3$=OCH$_3$ (WO 2019/243414 A1).

Finally, it is worth mentioning that, when $G^1$ is a nitrogen group, the compounds of the invention may also be prepared following the methods explained above from precursors of formula (XII) as shown below wherein an unsubstituted piperidinyl rest is converted into a piperidinyl rest carrying substituent $R^1$ as defined in the claims:

The reaction of compound (XII) to yield compound (Id) is carried out using K$_2$CO$_3$ and anhydrous DMSO applying heat. The reaction of compound (XII) to yield compound (Ic) is carried out either as shown (RCO$_2$H, EDCl, DMAP or HOBt, EtOAc) or using RCOCl and Et$_3$N in DCM. The reaction of compound (XII) to yield compound (Ib) is carried out using RSO$_2$Cl and Et$_3$N in DCM.

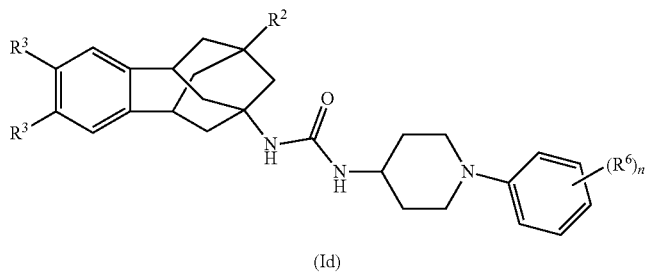

(Id)

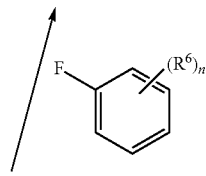

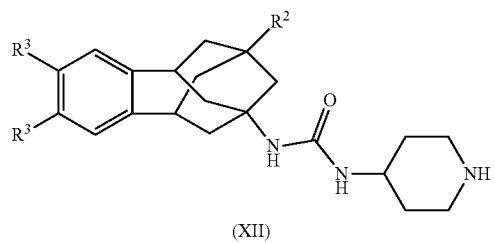

(XII)

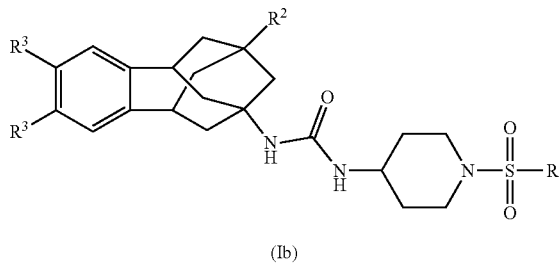

(Ib)

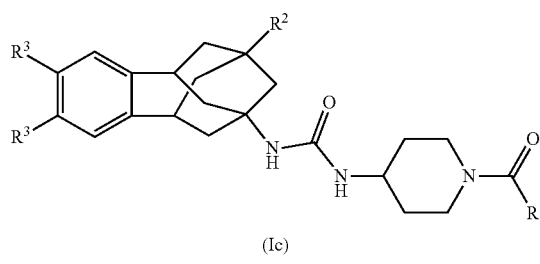

(Ic)

wherein $R^6$ is selected from the group consisting of halogen atoms, C1-$C_6$ acyl, cyano (C≡N), trifluoromethyl ($CF_3$), trifluoromethoxy ($OCF_3$), pentafluorosulfanyl ($SF_5$), sulfonyl ($SO_3H$), fluorosulfonyl ($SO_2F$), carboxylic group (COOH), ester group ($COOR^4$), amino ($NH_2$), mono-C1-$C_6$ alkylamino, di-$C_1$-$C_6$ alkylamino, hydroxyl, C1-$C_6$ alkoxy, $C_1$-$C_6$ alkyl, $C_3$-$C_6$ cycloalkyl and C1-$C_6$ alkoxycarbonylmethyl and n has a value of 0 to 4.

As used herein the term halogen atoms designates atoms selected from the group consisting of chlorine, fluorine, bromine and iodine atoms, preferably fluorine, chlorine or bromine atoms. The term halo when used as a prefix has the same meaning.

As used herein the term alkyl is meant to designate linear or branched hydrocarbon radicals ($C_nH_{2n+1}$) having 1 to 6 carbon atoms. Examples include methyl, ethyl, n-propyl, i-propyl, n-butyl, sec-butyl, tert-butyl, n-pentyl, 1-methylbutyl, 2-methyl-butyl, isopentyl, 1-ethylpropyl, 1,1-dimethylpropyl, 1,2-dimethylpropyl, n-hexyl, 1-ethylbutyl, 2-ethylbutyl, 1,1-dimethylbutyl, 1,2-dimethylbutyl, 1,3-dimethylbutyl, 2,2-dimethylbutyl, 2,3-dimethylbutyl, 2-methylpentyl and 3-methylpentyl radicals. In a preferred embodiment said alkyl groups have 1 to 3 carbon atoms (C1-$C_3$ alkyl).

As used herein, the term aryl designates typically a $C_6$-$C_{14}$ monocyclic or polycyclic aryl radical such as phenyl, naphthyl and anthranyl. Said aryl group may be unsubstituted or substituted with 1 to 4 substituents.

As used herein, the term heteroaryl designates typically a 5- to 14-membered ring system, comprising at least one heteroaromatic ring and containing at least one heteroatom selected from O, S and N, typically 1, 2 or 3 heteroatoms. A heteroaryl group can comprise a single ring or two or more fused rings wherein at least one ring contains a heteroatom. Said heteroaryl group may be unsubstituted or substituted with 1 to 4 substituents.

As used herein, the term cycloalkyl embraces hydrocarbon cyclic groups having 3 to 6 carbon atoms. Such cycloalkyl groups include, by way of example, cyclopropyl, cyclobutyl, cyclopentyl and cyclohexyl.

As used herein, the term alkoxy is used to designate radicals which contain a linear or branched alkyl group linked to an oxygen atom ($C_nH_{2n+1}$—O—). Preferred alkoxy radicals include methoxy, ethoxy, n-propoxy, i-propoxy, n-butoxy, sec-butoxy and t-butoxy.

As used herein the term cycloalkoxy is used to designate radicals containing a cycloalkyl group linked to an oxygen atom.

As used herein the term acyl is used to designate groups which are formed by a linear or branched alkyl bound to a carbonyl group. When the number of carbons of an acyl is specified it is to be understood as indicating the total number of carbons including the carbonyl group (i.e. $C_3$-acyl is propanoyl). Preferred acyl radicals include propanoyl, butanoyl, 2-methylbutanoyl, pentanoyl and hexanoyl.

As used herein the term sulfonyl is used to designate a group —$SO_2$—.

As used herein the term aryl is used to designate aromatic hydrocarbon groups such as phenyl or anthranyl.

As used herein the term pharmaceutically acceptable salt designates any salt which, upon administration to the patient is capable of providing (directly or indirectly) a compound as described herein. For instance, pharmaceutically acceptable salts of compounds provided herein are synthesized from the parent compound, which contains a basic or acidic moiety, by conventional chemical methods. Generally, such salts are, for example, prepared by reacting the free acid or base forms of these compounds with a stoichiometric amount of the appropriate base or acid in water or in an organic solvent or in a mixture of both. Generally, non-aqueous media like ether, ethyl acetate, ethanol, 2-propanol or acetonitrile are preferred. Examples of the acid addition salts include mineral acid addition salts such as, for example, hydrochloride, hydrobromide, hydroiodide, sulfate, nitrate, phosphate, and organic acid addition salts such as, for example, acetate, trifluoroacetate, maleate, fumarate, citrate, oxalate, succinate, tartrate, malate, mandelate, methanesulfonate and p-toluenesulfonate. Examples of the alkali addition salts include inorganic salts such as, for example, sodium, potassium, calcium and ammonium salts, and organic alkali salts such as, for example, ethylenediamine, ethanolamine, N,N-dialkylenethanolamine, triethanolamine and basic aminoacids salts.

As used herein the term stereoisomers designates molecules that have the same molecular formula and sequence of bonded atoms (constitution) but differ in the three-dimensional orientations of their atoms in space.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

Abbreviations:

The following abbreviations have been used along the present application:
 anh.: anhydrous
 AcOH: acetic acid
 AcCl: acetyl chloride
 AD: Alzheimer's disease
 AIBN: azobisisobutyronitrile
 ANOVA: analysis of variance
 ATR: attenuated total reflectance
 Bis/Tris: 2-Bis(2-hydroxyethyl)amino-2-(hydroxymethyl)-1,3-propanediol
 BSA: bovine serum albumin
 $Bu_3SnD$: tributyl(deuterio)stannane
 Calcd: calculated
 CMNPC: cyano(6-methoxynaphthalen-2-yl)methyl 2-(3-phenyloxiran-2-yl)methyl-carbonate
 CYP: Cytochromes P450
 d: doublet
 DAST: diethylaminosulfur trifluoride
 Dec: decomposes
 DCM: dichloromethane
 DMAP: 4-dimethylaminopyridine
 DMF: N,N-dimethylformamide
 DMSO: dimethylsulfoxide
 dq: doublet of quartets
 dt: doublet of triplets
 EDCl: 1-ethyl-3-(3-dimethylaminopropyl)carbodiimide
 ESI: electrospray ionization
 $Et_2O$: diethylether
 $Et_3N$: triethylamine
 EtOAc: ethyl acetate
 EtOH: ethanol
 FAD: familial Alzheimer's disease
 FT-IR: Fourier-transform infrared spectroscopy GAPDH: glyceraldehyde 3-phosphate dehydrogenase
GFAP: glial fibrillary acidic protein
HOBt: hydroxybenzotriazole
h: hours
H&E stain: haematoxylin and eosin stain
Hz: Hertz
HRMS: high resolution mass spectroscopy
IR: infrared
LC-MSD-TOF: liquid chromatography/electrospray ionization mass spectrometry
m: multiplet
MeOH: methanol
mp: melting point
n-Bu: n-butyl
NADP: nicotinamide adenine dinucleotide phosphate
NMR: nuclear magnetic resonance
NSAID: non steroidal anti-inflammatory drug
p-TSA: p-toluenesulfonic acid
PBS: phosphate-buffered saline,
PHOME: cyano(6-methoxynaphthalen-2-yl)methyl 2-(3-phenyloxiran-2-yl)acetate
PS1: presenilin-1
PVDF: polyvinylidene difluoride
s: singlet
sEH: soluble epoxide hydrolase
t: triplet
TBS: Tris-buffered saline
THF: tetrahydrofuran
TPPU: N-[1-(1-Oxopropyl)-4-piperidinyl]-N'-[4-(trifluoromethoxy)phenyl]urea
TREM2: Triggering Receptor Expressed On Myeloid Cells 2
t-TUCB: 4-[[trans-4-[[[[4-(Trifluoromethoxy)phenyl]amino]carbonyl]amino]cyclohexyl]oxy]benzoic acid
SDS-PAGE: sodium dodecyl sulphate-polyacrylamide gel electrophoresis
UPLC/MS: ultra performance liquid chromatography-mass spectrometry
UV: ultraviolet
WT: wild type

EXAMPLES

Analytical Methods
Melting points were determined in open capillary tubes with a MFB 595010 M Gallenkamp melting point apparatus.
Infrared (IR) spectra were run either on a Perkin-Elmer Spectrum RX I spectrophotometer (using the attenuated total reflectance technique) or on a spectrophotometer Nicolet Avatar 320 FT-IR. Absorption values are expressed as wavenumbers ($cm^{-1}$); only significant absorption bands are given.
Elemental analyses were carried out at the Microanalysis Service of the IIQAB (CSIC, Barcelona, Spain) with a Carlo Erba model 1106 analyzer.
Preparative normal phase chromatography was performed on a CombiFlash Rf 150 (Teledyne Isco) with pre-packed RediSep Rf silica gel cartridges. Thin-layer chromatography was performed with aluminum-backed sheets with silica gel 60 F254 (Merck, ref 1.05554 or Sigma-Aldrich, ref 60805), and spots were visualized with UV light, 1% aqueous solution of $KMnO_4$ and/or iodine.
High-resolution mass spectrometry (HRMS) analyses were performed with an LC/MSD TOF Agilent Technologies spectrometer.
Analytical grade solvents were used for crystallization, while pure for synthesis solvents were used in the reactions, extractions and column chromatography.

Reference Example 1: 2,3-dimethoxy-7-methylene-6,7,8,9-tetrahydro-5H-5,9-propanobenzo[7]annulen-11-one A suspension of NaH (1.31 g, 60% in hexanes, 32.7 mmol) in anhydrous DMSO (67 mL) was heated to 75° C. for 1.5 hours. The reaction was cooled down to room temperature and then a solution of methyltriphenylphosphonium iodide (8.24 g, 20.4 mmol) in anhydrous DMSO (47 mL) was added dropwise. After 15 minutes stirring at room temperature, a solution of 2,3-dimethoxy-5,6,8,9-tetrahydro-7H-5,9-propanobenzo[7]annulene-7,11-dione (4.47 g, 16.3 mmol) in anhydrous DMSO (52 mL) was added dropwise. The mixture was heated at 75° C. overnight, cooled down to room temperature and poured into water (340 mL). The aqueous layer was extracted with hexane (4×350 mL). The combined organic fractions were washed with brine, dried with anhydrous $Na_2SO_4$, filtered and concentrated under reduced pressure. Column chromatography ($SiO_2$, hexane/ethyl acetate mixtures) provided 2,3-dimethoxy-7-methylene-6,7,8,9-tetrahydro-5H-5,9-propanobenzo[7]annulen-11-one as a pale yellow solid (1.05 g, 24% yield), mp 162-165° C. IR (ATR): 3076, 2927, 2827, 1685, 1600, 1513, 1463, 1413, 1349, 1258, 1167, 1097, 1027, 1006, 877, 810 $cm^{-1}$. HRMS: Calcd for $[C_{17}H_{20}O_3+H]^+$: 273.1485, found: 273.1486.

Reference Example 2: 2-chloro-N-(9-hydroxy-2,3-dimethoxy-5,6,8,9,10,11-hexahydro-7H-5,9:7,11-dimethanobenzo[9]annulen-7-yl)acetamide To a solution of 2,3-dimethoxy-7-methylene-6,7,8,9-tetrahydro-5H-5,9-propanobenzo[7]annulen-11-one (1.05 g, 3.83 mmol) in DCM (7.5 mL), was added chloroacetonitrile (0.291 g, 3.83 mmol). The mixture was cooled to 0° C. and concentrated $H_2SO_4$ (0.57 g, 5.74 mmol) was added dropwise (T<10° C.). The mixture was stirred and room temperature overnight. To the sticky residue was added water (10 mL) and DCM (12 mL). The mixture was stirred vigorously, and the aqueous layer was extracted with DCM (3×15 mL). The organic fractions were joined, dried over anhydrous $Na_2SO_4$, filtered and concentrated in vacuo. Column chromatography ($SiO_2$, DCM/methanol mixtures) gave 2-chloro-N-(9-hydroxy-2,3-dimethoxy-5,6,8,9,10,11-hexahydro-7H-5,9:7,11-dimethanobenzo[9]annulen-7-yl)acetamide as a beige solid (0.46 g, 39% yield), mp 182-185° C. IR (ATR): 3060, 2923, 1660, 1603, 1562, 1505, 1445, 1410, 1359, 1248, 1150, 1081, 1033, 1014, 865, 729 $cm^{-1}$. HRMS: Calcd for $[C_{19}H_{24}ClNO_4+H]^+$: 364.1321, found: 364.1326.

Reference Example 3: 2-chloro-N-(9-chloro-2,3-dimethoxy-5,6,8,9,10,11-hexahydro-7H-5,9:7,11-dimethanobenzo[9]annulen-7-yl)acetamide A mixture of 2-chloro-N-(9-hydroxy-2,3-dimethoxy-5,6,8,9,10,11-hexahydro-7H-5,9:7,11-dimethanobenzo[9]annulen-7-yl)acetamide (0.46 g, 1.26 mmol) and thionyl chloride (16 mL) was stirred under reflux conditions for 1 hour. The reaction was stirred overnight at room temperature. The crude reaction was co evaporated in vacuo with toluene. Column chromatography gave 2-chloro-N-(9-chloro-2,3-dimethoxy-5,6,8,9,10,11-hexahydro-7H-5,9:7,11-dimethanobenzo[9]annulen-7-yl)acetamide as a white off solid (200 mg, 42% yield), mp 201-205° C. IR (ATR): 3306, 3071, 2933, 2855, 1667, 1606, 1518, 1468, 1445, 1416, 1377, 1359, 1335, 1251, 1229, 1189, 1163, 1088, 1023, 976, 944, 864, 814, 733 cm$^{-1}$. HRMS: Calcd for $[C_{19}H_{23}C_{12}NO_3-H]^-$: 382.0982, found: 382.0993.

Reference Example 4: 2-chloro-N-(9-fluoro-2,3-dimethoxy-5,6,8,9,10,11-hexahydro-7H-5,9:7,11-dimethanobenzo[9]annulen-7-yl)acetamide A solution of DAST (1.11 mL, 1 M, 1.11 mmol) was added dropwise to a mixture of 2-chloro-N-(9-hydroxy-2,3-dimethoxy-5,6,8,9,10,11-hexahydro-7H-5,9:7,11-dimethanobenzo[9]annulen-7-yl)acetamide (270 mg, 0.74 mmol) in anhydrous DCM (8 mL) at −30° C. The reaction was stirred overnight at room temperature. Water (10 mL) was added and basified with 5N NaOH to pH 11. The aqueous layer was extracted with DCM (4×10 mL) and the organic fractions were joined, dried with anhydrous $Na_2SO_4$, filtered and concentrated in vacuo affording 2-chloro-N-(9-fluoro-2,3-dimethoxy-5,6,8,9,10,11-hexahydro-7H-5,9:7,11-dimethanobenzo[9]annulen-7-yl)acetamide as a pale yellow solid (220 mg, 81% yield), mp 197-200° C. IR (ATR): 3287, 3081, 2935, 2857, 1668, 1606, 1557, 1519, 1466, 1417, 1359, 1346, 1314, 1291, 1255, 1238, 1193, 1166, 1089, 1025, 1000, 932, 875, 790, 736, 657 cm$^{-1}$. HRMS: Calcd for $[C_{19}H_{23}ClFNO_3+H]^+$: 368.1423, found: 368.1423.

Reference Example 5: 9-chloro-2,3-dimethoxy-5,6,8,9,10,11-hexahydro-7H-5,9:7,11-dimethanobenzo[9]annulen-7-amine hydrochloride Thiourea (45 mg, 0.59 mmol) and glacial acetic acid (0.41 mL) were added to a suspension of 2-chloro-N-(9-chloro-2,3-dimethoxy-5,6,8,9,10,11-hexahydro-7H-5,9:7,11-dimethanobenzo[9]annulen-7-yl)acetamide (0.19 g, 0.49 mmol) in absolute ethanol (11 mL). The mixture was stirred at reflux overnight. The resulting suspension was allowed to reach room temperature and ethanol was removed under reduced pressure. To the resulting residue was added water (7 mL) and the pH was adjusted to 11-12 with 5N NaOH. The aqueous layer was extracted with DCM (4×7 mL) and the combined organic fractions were dried over anhydrous $Na_2SO_4$, filtered and concentrated in vacuo to give 9-chloro-2,3-dimethoxy-5,6,8,9,10,11-hexahydro-7H-5,9:7,11-dimethanobenzo[9]annulen-7-amine. Its hydrochloride was obtaining by adding an excess of dioxane/HCl to a solution of the amine in DCM, followed by filtration of the precipitate (136 mg, 80% yield), mp>250° C. IR (ATR): 2903, 2844, 1603, 1514, 1356, 1308, 1252, 1171, 1107, 1064, 1013, 938, 866, 812 cm$^{-1}$. HRMS: Calcd for $[C_{17}H_{22}ClNO_2+H]^+$: 308.1412, found: 308.1415.

Reference Example 6: 9-fluoro-2,3-dimethoxy-5,6,8,9,10,11-hexahydro-7H-5,9:7,11-dimethanobenzo[9]annulen-7-amine hydrochloride From 2-chloro-N-(9-fluoro-2,3-dimethoxy-5,6,8,9,10,11-hexahydro-7H-5,9:7,11-dimethanobenzo[9]annulen-7-yl) acetamide (0.22 g, 0.60 mmol) and following the procedure described in reference example 5, 9-fluoro-2,3-dimethoxy-5,6,8,9,10,11-hexahydro-7H-5,9:7,11-dimethanobenzo[9] annulen-7-amine hydrochloride was obtained (108 mg, 55% yield), mp>250° C. IR (ATR): 2934, 2853, 2555, 2055, 1605, 1518, 1459, 1366, 1318, 1254, 1172, 1150, 1088, 1004, 863, 801, 734 cm$^{-1}$. HRMS: Calcd for $[C_{17}H_{22}FNO_2+H]^+$: 292.1707, found: 292.1714.

Reference Example 7: tert-butyl 4-(3-(9-chloro-5,6,8,9,10,11-hexahydro-7H-5,9:7,11-dimethanobenzo[9]annulen-7-yl)ureido)piperidine-1-carboxylate To a solution of 9-chloro-5,6,8,9,10,11-hexahydro-7H-5,9:7,11-dimethanobenzo[9]annulen-7-amine hydrochloride (800 mg, 2.81 mmol) in DCM (17 mL) and saturated aqueous $NaHCO_3$ solution (10 mL), triphosgene (309 mg, 1.04 mmol) was added. The biphasic mixture was stirred at room temperature for 30 minutes and then the two phases were separated and the organic one was washed with brine (10 mL), dried over anhydrous $Na_2SO_4$, filtered and evaporated under vacuum to obtain 1-2 mL of a solution of isocyanate in DCM. To this solution was added tert-butyl 4-aminopiperidine-1-carboxylate (564 mg, 2.81 mmol). The mixture was stirred overnight at room temperature and the solvent was then evaporated. Column chromatography ($SiO_2$, DCM/methanol mixtures) provided tert-butyl 4-(3-(9-chloro-5,6,8,9,10,11-hexahydro-7H-5,9:7,11-dimethanobenzo[9]annulen-7-yl)ureido)piperidine-1-carboxylate as a yellowish solid (768 mg, 58% yield). HRMS-ESI-m/z[M−H]$^-$ calcd for $[C_{26}H_{36}ClN_3O_3-H]^-$: 472.2372, found: 472.2365.

Reference Example 8: 1-(9-chloro-5,6,8,9,10,11-hexahydro-7H-5,9:7,11-dimethanobenzo[9]annulen-7-yl)-3-(piperidin-4-yl)urea To a solution of 1-(9-chloro-5,6,8,9,10,11-hexahydro-7H-5,9:7,11-dimethanobenzo[9]annulen-7-yl)-3-(1-isobutyrylpiperidin-4-yl)urea (530 mg, 1.12 mmol) in DCM (4 mL) was added HCl 4N in dioxane (3 mL). The mixture was stirred at room temperature overnight. The solvent was then evaporated and the residue was dissolved in DCM (10 mL) and washed with 2N NaOH (2×5 mL). The organics were dried over anhydrous $Na_2SO_4$, filtered and evaporated under vacuum to afford 1-(9-chloro-5,6,8,9,10,11-hexahydro-7H-5,9:7,11-dimethanobenzo[9]annulen-7-yl)-3-(piperidin-4-yl)urea as a yellowish solid (390 mg, 99% yield). HRMS-ESI$^+$ m/z[M+H]$^+$ calcd for $[C_{21}H_{28}ClN_3O+H]^+$: 374.19, found: 374.05.

Comparative Example 1: 1-(1-acetylpiperidin-4-yl)-3-(9-methyl-5,6,8,9,10,11-hexahydro-7H-5,9:7,11-dimethanobenzo[9]annulen-7-yl)urea The compound was prepared as described in Example 38 of WO 2019/243414 A1.

Comparative Example 2: 1-((1R,3s,5S)-8-benzyl-8-azabicyclo[3.2.1]octan-3-yl)-3-(9-methyl-5,6,8,9,10,11-hexahydro-7H-5,9:7,11-dimethanobenzo[9]annulen-7-yl)urea The compound was prepared as described in Example 67 of WO 2019/243414 A1.

Comparative Example 3: 1-(9-methyl-5,6,8,9,10,11-hexahydro-7H-5,9:7,11-dimethanobenzo[9]annulen-7-yl)-3-(1-(cyclopropanecarbonyl)piperidin-4-yl)urea To a solution of 9-methyl-5,6,8,9,10,11-hexahydro-7H-5,9:7,11-dimethanobenzo[9]annulen-7-amine hydrochloride (112.5 mg, 0.43 mmol) in DCM (6 mL) saturated aqueous NaHCO$_3$ solution (5 mL) and triphosgene (93.8 mg, 0.16 mmol) were added. The biphasic mixture was stirred at room temperature for 30 minutes and then the two phases were separated, and the organic layer was washed with brine (5 mL), dried over anh. Na$_2$SO$_4$, filtered and evaporated under vacuum to obtain 2-3 mL of a solution of the isocyanate in DCM. To this solution was added (4-aminopiperidin-1-yl)(cyclopropyl)methanone (72 mg, 0.43 mmol). The mixture was stirred overnight at room temperature and the solvent was then evaporated. Column chromatography (SiO$_2$, DCM/Methanol mixtures) provided 1-(9-methyl-5,6,8,9,10,11-hexahydro-7H-5,9:7,11-dimethanobenzo[9]annulen-7-yl)-3-(1-(cyclopropanecarbonyl)piperidin-4-yl)urea as a white solid (60 mg, 33% yield), mp 115-120° C. IR (ATR): 3341, 2899, 1633, 1607, 1549, 1448, 1311, 1222, 1128, 1064, 1027, 979, 756 cm$^{-1}$. HRMS: Calcd for [C$_{26}$H$_{35}$N$_3$O$_2$+H]$^+$: 422.2802, found: 422.2808. Anal. Calcd for C$_{26}$H$_{35}$N$_3$O$_2$·0.4 H$_2$O: C 72.83 H 8.42, N 9.80. Found: C 73.08, H 8.23, N 9.53.

Comparative Example 4: 1-(9-methyl-6,7,8,9,10,11-hexahydro-5H-5,9:7,11-dimethanobenzo[9]annulen-7-yl)-3-(2,3,4-trifluorophenyl)urea The compound was prepared as described in Example 58 of WO 2019/243414 A1 but using 9-methyl-5,6,8,9,10,11-hexahydro-7H-5,9:7,11-dimethanobenzo[9]annulen-7-amine hydrochloride as starting material.

Comparative Example 5: 1-(1-benzylpiperidin-4-yl)-3-(9-methyl-5,6,8,9,10,11-hexahydro-7H-5,9:7,11-dimethanobenzo[9]annulen-7-yl)urea The compound was prepared as described in Example 48 of WO 2019/243414 A1 but using 9-methyl-5,6,8,9,10,11-hexahydro-7H-5,9:7,11-dimethanobenzo[9]annulen-7-amine hydrochloride as starting material.

Comparative Example 6: 1-(9-methyl-5,6,8,9,10,11-hexahydro-7H-5,9:7,11-dimethanobenzo[9]annulen-7-yl)-3-(1-propionylpiperidin-4-yl)urea The compound was prepared as described in Example 63 of WO 2019/243414 A1.

Comparative Example 7: 1-(9-methyl-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea The compound was prepared as described in Example 65 of WO 2019/243414 A1.

Comparative Example 8: 1-(1-acetylpiperidin-4-yl)-3-(2-fluoro-9-methyl-5,6,8,9,10,11-hexahydro-7H-5,9:7,11-dimethanobenzo[9]annulen-7-yl)urea The compound was prepared as described in Example 68 of WO 2019/243414 A1.

Comparative Example 9: 1-(1-acetylpiperidin-4-yl)-3-(1-fluoro-9-methyl-5,6,8,9,10,11-hexahydro-7H-5,9:7,11-dimethanobenzo[9]annulen-7-yl)urea The compound was prepared as described in Example 70 of WO 2019/243414 A1.

Comparative Example 10: 1-(1-acetylpiperidin-4-yl)-3-(2-methoxy-9-methyl-5,6,8,9,10,11-hexahydro-7H-5,9:7,11-dimethanobenzo[9]annulen-7-yl)urea The compound was prepared as described in Example 69 of WO 2019/243414 A1.

Comparative Example 11: 1-[1-(isopropylsulfonyl)piperidin-4-yl]-3-(9-methyl-5,6,8,9,10,11-hexahydro-7H-5,9:7,11-dimethanobenzo[9]annulen-7-yl)urea The compound was prepared as described in Example 47 of WO 2019/243414 A1 but using 9-methyl-5,6,8,9,10,11-hexahydro-7H-5,9:7,11-dimethanobenzo[9]annulen-7-amine hydrochloride as starting material.

Comparative Example 12: 1-(1-(4-acetylphenyl)piperidin-4-yl)-3-(9-methyl-5,6,8,9,10,11-hexahydro-7H-5,9:7,11-dimethanobenzo[9]annulen-7-yl)urea The compound was prepared as described in Example 64 of WO 2019/243414 A1.

Example 1: 4-[((1r,4r)-4-(3-(9-fluoro-5,6,8,9,10,11-hexahydro-7H-5,9:7,11-dimethanobenzo[9]annulen-7-yl)ureido)cyclohexyl)oxy]Benzoic Acid To a solution of 9-fluoro-5,6,8,9,10,11-hexahydro-7H-5,9:7,11-dimethanobenzo[9]annulen-7-amine hydrochloride (180 mg, 0.67 mmol) in DCM (3 mL) and saturated aqueous NaHCO$_3$ solution (2 mL), triphosgene (74 mg, 0.25 mmol) was added. The biphasic mixture was stirred at room temperature for 30 minutes and then the two phases were separated and the organic one was washed with brine (3 mL), dried over anh. Na$_2$SO$_4$, filtered and evaporated under vacuum to obtain 1-2 mL of a solution of isocyanate in DCM. To this solution were added DMF (4 mL), 4-[((1r,4r)-4-aminocyclohexyl)oxy]benzoic acid hydrochloride (182 mg, 0.67 mmol) and Et$_3$N (136 mg, 1.34 mmol). The mixture was stirred overnight at room temperature and the solvent was then evaporated. The residue was dissolved in DCM (5 mL) and washed with 2N HCl (3 mL). The organic phase was dried over anh. Na$_2$SO$_4$, filtered and evaporated under vacuum to obtain 4-[((1r,4r)-4-(3-(9-fluoro-5,6,8,9,10,11-hexahydro-7H-5,9:7,11-dimethanobenzo[9]annulen-7-yl)ureido)cyclohexyl)oxy]benzoic acid (240 mg, 72% yield) as a yellow residue. The analytical sample was obtained by a crystallization from hot Ethyl Acetate/Pentane mixtures, mp 253-254° C. IR (ATR): 3325, 2929, 2859, 1682, 1629, 1606, 1558, 1511, 1424, 1359, 1317, 1282, 1251, 1221, 1165, 1104, 1090, 1003, 938, 851, 772, 697, 642 cm$^{-1}$. HRMS: Calcd for [C$_{29}$H$_{33}$FN$_2$O$_4$—H]$^-$: 491.2352, found: 491.2334.

Example 2: 4-[((1r,4r)-4-(3-(9-chloro-5,6,8,9,10,11-hexahydro-7H-5,9:7,11-dimethanobenzo[9]annulen-7-yl)ureido)cyclohexyl)oxy]Benzoic Acid To a solution of 9-chloro-5,6,8,9,10,11-hexahydro-7H-5,9:7,11-dimethanobenzo[9]annulen-7-amine hydrochloride (180 mg, 0.63 mmol) in DCM (3 mL) and saturated aqueous NaHCO$_3$ solution (2 mL), triphosgene (69 mg, 0.23 mmol) was added. The biphasic mixture was stirred at room temperature for 30 minutes and then the two phases were separated and the organic one was washed with brine (3 mL), dried over anh. $Na_2SO_4$, filtered and evaporated under vacuum to obtain 1-2 mL of a solution of isocyanate in DCM. To this solution were added DMF (4 mL), 4-(((1r,4r)-4-aminocyclohexyl)oxy)benzoic acid hydrochloride (171 mg, 0.63 mmol) and $Et_3N$ (127 mg, 1.26 mmol). The mixture was stirred overnight at room temperature and the solvent was then evaporated. The residue was dissolved in DCM (5 mL) and washed with 2N HCl (3 mL). The organic phase was dried over anh. $Na_2SO_4$, filtered and evaporated under vacuum to obtain benzoic acid 4-[((1r,4r)-4-(3-(9-chloro-5,6,8,9,10,11-hexahydro-7H-5,9:7,11-dimethanobenzo[9]annulen-7-yl)ureido)cyclohexyl)oxy]benzoic acid (217 mg, 67% yield) as a yellow residue. The analytical sample was obtained by a crystallization from hot Ethyl Acetate/Pentane mixtures, mp 201-202° C. IR (ATR): 3355, 3299, 2932, 2856, 1697, 1682, 1631, 1605, 1555, 1498, 1469, 1452, 1428, 1406, 1373, 1357, 1322, 1301, 1253, 1163, 1100, 1077, 1041, 1027, 1013, 977, 946, 905, 844, 804, 772, 753, 695, 643, 634, 608 $cm^{-1}$. HRMS: Calcd for $[C_{29}H_{33}ClN_2O_4—H]^-$: 507.2056, found: 507.2057.

Example 3: 1-(9-chloro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea To a solution of 9-chloro-5,6,8,9,10,11-hexahydro-7H-5,9:7,11-dimethanobenzo[9]annulen-7-amine hydrochloride (130 mg, 0.46 mmol) in DCM (4 mL) and saturated aqueous $NaHCO_3$ solution (3 mL), triphosgene (50 mg, 0.17 mmol) was added. The biphasic mixture was stirred at room temperature for 30 minutes and then the two phases were separated and the organic one was washed with brine (3 mL), dried over anh. $Na_2SO_4$, filtered and evaporated under vacuum to obtain 1-2 mL of a solution of isocyanate in DCM. To this solution was added (4-aminopiperidin-1-yl)(tetrahydro-2H-pyran-4-yl)methanone (97 mg, 0.46 mmol). The mixture was stirred overnight at room temperature and the solvent was then evaporated. Column chromatography ($SiO_2$, DCM/Methanol mixtures) provided 1-(9-chloro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea as a yellowish solid (90 mg, 41% yield). The analytical sample was obtained by washing the product with ethyl acetate to obtain a white solid, mp 214-215° C. IR (ATR): 2924, 2851, 1675, 1610, 1546, 1493, 1451, 1361, 1319, 1296, 1282, 1246, 1225, 1208, 1120, 1084, 1017, 991, 946, 908, 874, 810, 755, 730, 696, 644, 619, 564 $cm^{-1}$. HRMS: Calcd for $[C_{27}H_{36}ClN_3O_3+H]^+$: 486.2518, found: 486.2522. Anal. Calcd for $C_{27}H_{36}ClN_3O_3$: C 66.72, H 7.47, N 8.65. Found: C 66.92, H 7.40, N 8.43.

Example 4: 1-(9-fluoro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea To a solution of 9-fluoro-5,6,8,9,10,11-hexahydro-7H-5,9:7,11-dimethanobenzo[9]annulen-7-amine hydrochloride (150 mg, 0.56 mmol) in DCM (4.5 mL) saturated aqueous $NaHCO_3$ solution (3.5 mL) and triphosgene (61.5 mg, 0.21 mmol) were added. The biphasic mixture was stirred at room temperature for 30 minutes and then the two phases were separated and the organic layer was washed with brine (3.5 mL), dried over anh. $Na_2SO_4$, filtered and evaporated under vacuum to obtain 1-2 mL of a solution of the isocyanate in DCM. To this solution was added (4-aminopiperidin-1-yl)(tetrahydro-2H-pyran-4-yl)methanone (119 mg, 0.56 mmol). The mixture was stirred overnight at room temperature and the solvent was then evaporated. Column chromatography ($SiO_2$, DCM/Methanol mixtures) provided 1-(9-fluoro-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea as a yellowish solid (75 mg, 28% yield), mp 210-213° C. IR (ATR): 3351, 2926, 2850, 1609, 1549, 1444, 1358, 1306, 1210, 1124, 1089, 1005, 983, 867, 759 $cm^{-1}$. HRMS: Calcd for $[C_{27}H_{36}FN_3O_3+H]$: 470.2813, found: 470.2815. Anal. Calcd for $C_{27}H_{36}FN_3O_3$. 0.2 $CH_2Cl_2$: C 67.14, H 7.54, N 8.64. Found: C 67.47, H 7.57, N 8.29.

Example 5: 1-(9-fluoro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea To a solution of 9-fluoro-2,3-dimethoxy-5,6,8,9,10,11-hexahydro-7H-5,9:7,11-dimethanobenzo[9]annulen-7-amine hydrochloride (100 mg, 0.31 mmol) in DCM (3 mL) saturated aqueous $NaHCO_3$ solution (2.5 mL) and triphosgene (33.5 mg, 0.11 mmol) were added. The biphasic mixture was stirred at room temperature for 30 minutes and then the two phases were separated and the organic layer was washed with brine (3 mL), dried over anh. $Na_2SO_4$, filtered and evaporated under vacuum to obtain 1-2 mL of a solution of the isocyanate in DCM. To this solution was added (4-aminopiperidin-1-yl)(tetrahydro-2H-pyran-4-yl)methanone (64.8 mg, 0.31 mmol). The mixture was stirred overnight at room temperature and the solvent was then evaporated. Column chromatography ($SiO_2$, DCM/Methanol mixtures) provided 1-(9-fluoro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea as a yellowish solid (35 mg, 22% yield), mp 230-233° C. IR (ATR): 3351, 2938, 2853, 1679, 1596, 1546, 1515, 1468, 1445, 1264, 1214, 1161, 1126, 1091, 1020, 1010, 988, 874, 801, 585 $cm^{-1}$. HRMS: Calcd for $[C_{29}H_{40}FN_3O_5+H]^+$: 530.3025, found: 530.3017. Anal. Calcd for $C_{29}H_{40}FN_3O_5·0.5 H_2O$: C 64.66, H 7.67, N 7.80. Found: C 64.57, H 7.52, N 7.51.

Example 6: 1-(9-chloro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea To a solution of 9-chloro-2,3-dimethoxy-5,6,8,9,10,11-hexahydro-7H-5,9:7,11-dimethanobenzo[9]annulen-7-amine hydrochloride (92 mg, 0.27 mmol) in DCM (4 mL) saturated aqueous $NaHCO_3$ solution (3 mL) and triphosgene (29 mg, 0.10 mmol) were added. The biphasic mixture was stirred at room temperature for 30 minutes and then the two phases were separated and the organic layer was washed with brine (3 mL), dried over anh. $Na_2SO_4$, filtered and evaporated under vacuum to obtain 2-3 mL of a solution of the isocyanate in DCM. To this solution was added (4-aminopiperidin-1-yl)(tetrahydro-2H-pyran-4-yl)methanone (57 mg, 0.27 mmol). The mixture was stirred overnight at room temperature and the solvent was then evaporated. Column chromatography ($SiO_2$, DCM/Methanol mixtures) provided 1-(9-chloro-2,3-dimethoxy-5,6,8,9,10,11-hexahydro-7H-5,9:7,11-dimethanobenzo[9]annulen-7-yl)-3-(1-(tetrahydro-2H-pyran-4-carbonyl)piperidin-4-yl)urea as a white solid (39 mg, 27% yield), mp 147-150° C. IR (ATR): 3358, 2928, 2847, 1612, 1546, 1516, 1443, 1285, 1250, 1214, 1161, 1087, 1123, 1019, 983, 942, 869, 816 cm$^{-1}$. HRMS Calcd for [$C_{29}H_{40}ClN_3O_5$+H]$^+$: 546.2729, found: 546.2727.

Example 7: 1-(9-fluoro-5,6,8,9,10,11-hexahydro-7H-5,9:7,11-dimethanobenzo[9]annulen-7-yl)-3-(1-(cyclopropanecarbonyl)piperidin-4-yl)urea To a solution of 9-fluoro-5,6,8,9,10,11-hexahydro-7H-5,9:7,11-dimethanobenzo[9]annulen-7-amine hydrochloride (150 mg, 0.56 mmol) in DCM (4.5 mL) saturated aqueous NaHCO$_3$ solution (3.5 mL) and triphosgene (61.5 mg, 0.21 mmol) were added. The biphasic mixture was stirred at room temperature for 30 minutes and then the two phases were separated and the organic layer was washed with brine (3.5 mL), dried over anh. Na$_2$SO$_4$, filtered and evaporated under vacuum to obtain 1-2 mL of a solution of the isocyanate in DCM. To this solution was added (4-aminopiperidin-1-yl)(cyclopropyl)methanone (94.2 mg, 0.56 mmol). The mixture was stirred overnight at room temperature and the solvent was then evaporated. Column chromatography (SiO$_2$, DCM/Methanol mixtures) provided 1-(9-fluoro-5,6,8,9,10,11-hexahydro-7H-5,9:7,11-dimethanobenzo[9]annulen-7-yl)-3-(1-(cyclopropanecarbonyl)piperidin-4-yl)urea as a white solid (60 mg, 25% yield), mp 187-191° C. IR (ATR): 3320, 2934, 1630, 1568, 1450, 1358, 1317, 1221, 1125, 865, 767, 734, 569 cm$^{-1}$. HRMS Calcd for [$C_{25}H_{32}FN_3O_2$+H]$^+$: 426.2551, found: 426.2556. Anal. Calcd for $C_{25}H_{32}FN_3O_2 \cdot 0.1$ CH$_2$Cl$_2$: C 69.46 H 7.48, N 9.68. Found: C 69.64, H 7.52, N 9.45.

Example 8: 1-(9-chloro-5,6,8,9,10,11-hexahydro-7H-5,9:7,11-dimethanobenzo[9]annulen-7-yl)-3-(1-(cyclopropanecarbonyl)piperidin-4-yl)urea To a solution of 9-chloro-5,6,8,9,10,11-hexahydro-7H-5,9:7,11-dimethanobenzo[9]annulen-7-amine hydrochloride (130 mg, 0.46 mmol) in DCM (4 mL) and saturated aqueous NaHCO$_3$ solution (3 mL), triphosgene (50 mg, 0.17 mmol) was added. The biphasic mixture was stirred at room temperature for 30 minutes and then the two phases were separated and the organic one was washed with brine (3 mL), dried over anh. Na$_2$SO$_4$, filtered and evaporated under vacuum to obtain 1-2 mL of a solution of isocyanate in DCM. To this solution was added (4-aminopiperidin-1-yl)(cyclopropyl)methanone (77 mg, 0.46 mmol). The mixture was stirred overnight at room temperature and the solvent was then evaporated. Column chromatography (SiO$_2$, DCM/Methanol mixtures) provided 1-(9-chloro-5,6,8,9,10,11-hexahydro-7H-5,9:7,11-dimethanobenzo[9]annulen-7-yl)-3-(1-(cyclopropanecarbonyl)piperidin-4-yl)urea as a white solid (70 mg, 35% yield), mp 119-120° C. IR (ATR): 3367, 3330, 2926, 2853, 1682, 1654, 1605, 1565, 1550, 1481, 1452, 1374, 1357, 1319, 1299, 1264, 1224, 1128, 1088, 1036, 1013, 993, 967, 948, 925, 911, 870, 799, 755, 735, 700, 632, 604, 564 cm$^{-1}$. HRMS: Calcd for [$C_{25}H_{32}ClN_3O_2$+H]$^+$: 442.2256, found: 442.2262. Anal. Calcd for $C_{25}H_{32}ClN_3O_2 \cdot 0.75$ H$_2$O: C 66.05, H 7.41, N 9.24. Found: C 66.21, H 7.31, N 9.00.

Example 9: 1-(9-chloro-5,6,8,9,10,11-hexahydro-7H-5,9:7,11-dimethanobenzo[9]annulen-7-yl)-3-(1-(1-fluorocyclopropane-1-carbonyl)piperidin-4-yl)urea To a solution of 9-chloro-5,6,8,9,10,11-hexahydro-7H-5,9:7,11-dimethanobenzo[9]annulen-7-amine hydrochloride (130 mg, 0.46 mmol) in DCM (4 mL) and saturated aqueous NaHCO$_3$ solution (3 mL), triphosgene (50 mg, 0.17 mmol) was added. The biphasic mixture was stirred at room temperature for 30 minutes and then the two phases were separated and the organic one was washed with brine (3 mL), dried over anh. Na$_2$SO$_4$, filtered and evaporated under vacuum to obtain 1-2 mL of a solution of isocyanate in DCM. To this solution were added (4-aminopiperidin-1-yl)(1-fluorocyclopropyl)methanone hydrochloride (101 mg, 0.46 mmol) and Et$_3$N (92 mg, 0.91 mmol). The mixture was stirred overnight at room temperature and the mixture was washed with water (10 mL). The organic phase was dried over anh. Na$_2$SO$_4$, filtered and evaporated under vacuum to obtain an orange gum (140 mg). Column chromatography (SiO$_2$, DCM/Methanol mixtures) provided 1-(9-chloro-5,6,8,9,10,11-hexahydro-7H-5,9:7,11-dimethanobenzo[9]annulen-7-yl)-3-(1-(1-fluorocyclopropane-1-carbonyl)piperidin-4-yl)urea as a yellowish solid (20 mg, 10% yield). The analytical sample was obtained by a crystallization from hot Ethyl Acetate/Pentane mixtures, mp 120-121° C. IR (ATR): 3340, 2921, 2856, 1730, 1632, 1553, 1493, 1453, 1439, 1356, 1327, 1299, 1274, 1244, 1204, 1122, 1088, 1047, 1025, 993, 970, 947, 907, 801, 760, 729, 697, 680, 643 cm$^{-1}$. HRMS: Calcd for [$C_{25}H_{31}ClFN_3O_2$+H]$^+$: 460.2162, found: 460.2165.

Example 10: 1-(9-chloro-5,6,8,9,10,11-hexahydro-7H-5,9:7,11-dimethanobenzo[9]annulen-7-yl)-3-(1-(2,2,2-trifluoroacetyl)piperidin-4-yl)urea To a solution of 9-chloro-5,6,8,9,10,11-hexahydro-7H-5,9:7,11-dimethanobenzo[9]annulen-7-amine hydrochloride (130 mg, 0.46 mmol) in DCM (4 mL) and saturated aqueous NaHCO$_3$ solution (3 mL), triphosgene (50 mg, 0.17 mmol) was added. The biphasic mixture was stirred at room temperature for 30 minutes and then the two phases were separated and the organic one was washed with brine (3 mL), dried over anh. Na$_2$SO$_4$, filtered and evaporated under vacuum to obtain 1-2 mL of a solution of isocyanate in DCM. To this solution was added 1-(4-aminopiperidin-1-yl)-2,2,2-trifluoroethan-1-one hydrochloride (106 mg, 0.46 mmol) and Et$_3$N (92 mg, 0.91 mmol). The mixture was stirred overnight at room temperature and the mixture was washed with water (15 mL). The organic phase was dried over anh. Na$_2$SO$_4$, filtered and evaporated under vacuum to obtain. an orange gum (196 mg). Column chromatography (SiO$_2$, DCM/Methanol mixtures) provided 1-(9-chloro-5,6,8,9,10,11-hexahydro-7H-5,9:7,11-dimethanobenzo[9]annulen-7-yl)-3-(1-(2,2,2-trifluoroacetyl)piperidin-4-yl)urea as a yellowish solid (55 mg, 26% yield). The analytical sample was obtained by a crystallization from hot Ethyl Acetate/Pentane mixtures, mp 188-189° C. IR (ATR): 3348, 2926, 2859, 1689, 1634, 1556, 1495, 1466, 1454, 1357, 1298, 1266, 1203, 1179, 1137, 1091, 1044, 1009, 992, 971, 946, 897, 802, 757, 698, 660, 623, 599, 556 cm$^{-1}$. HRMS: Calcd for [$C_{23}H_{27}ClF_3N_3O_2$—H]$^-$: 468.1671, found: 468.1671. Anal. Calcd for $C_{23}H_{27}ClF_3N_3O_2 \cdot 0.75$ CH$_3$OH: C 57.75, H 6.12, N 8.51. Found: C 58.04, H 5.82, N 8.20.

Example 11: 1-(9-chloro-5,6,8,9,10,11-hexahydro-7H-5,9:7,11-dimethanobenzo[9]annulen-7-yl)-3-(1-(isopropylsulfonyl)piperidin-4-yl)urea To a solution of 9-chloro-5,6,8,9,10,11-hexahydro-7H-5,9:7,11-dimethanobenzo[9]annulen-7-amine hydrochloride (268 mg, 0.94 mmol) in DCM (8 mL) and saturated aqueous NaHCO$_3$ solution (5 mL) was added triphosgene (103 mg, 0.35 mmol). The biphasic mixture was stirred at room temperature for 30 minutes and then the two phases were separated and the organic layer was washed with brine (5 mL), dried over anh. $Na_2SO_4$, filtered and evaporated under vacuum to obtain 1-2 mL of a solution of the isocyanate in DCM. To a solution of 1-(isopropylsulfonyl)piperidin-4-amine (194 mg, 0.94 mmol) in anh. THF (8 mL) under argon atmosphere at −78° C., was added dropwise a solution of n-butyllithium (2.5 M in hexanes, 0.49 mL, 1.22 mmol) during 20 minutes. After the addition, the mixture was tempered to 0° C. using an ice bath. This solution was added carefully to the solution of the isocyanate from the previous step cooled to 0° C., under argon atmosphere. The reaction mixture was stirred at room temperature overnight. Methanol (2 mL) was then added to quench any unreacted n-butyllithium. The solvents were evaporated under vacuum to give a yellow residue (690 mg). Column chromatography ($SiO_2$, DCM/Methanol mixtures) gave a white solid. Crystallization from hot DCM:pentane provided 1-(9-chloro-5,6,8,9, 10,11-hexahydro-7H-5,9:7,11-dimethanobenzo[9]annulen-7-yl)-3-(1-(isopropylsulfonyl)piperidin-4-yl)urea as a yellowish solid (75 mg, 17% yield). The analytical sample was obtained by crystallization from hot Ethyl Acetate/Pentane mixtures, mp 223-224° C. IR (NaCl disk): 3407, 3370, 2926, 2856, 1672, 1538, 1494, 1451, 1353, 1304, 1296, 1223, 1209, 1177, 1130, 1090, 1045, 972, 949, 903, 885, 841, 805, 767, 735, 668, 623 $cm^{-1}$. HRMS: Calcd for $[C_{24}H_{34}ClN_3O_3S+H]^+$: 480.2082, found: 480.2084. Anal. Calcd for $C_{24}H_{34}ClN_3O_3S·0.05$ Ethyl Acetate: C 60.00, H 7.16, N 8.67. Found: C 60.38, H 7.08, N 8.27.

Example 12: 1-(9-chloro-5,6,8,9,10,11-hexahydro-7H-5,9:7,11-dimethanobenzo[9]annulen-7-yl)-3-(1-propionylpiperidin-4-yl)urea To a solution of 9-chloro-5,6,8,9,10,11-hexahydro-7H-5,9:7,11-dimethanobenzo[9]annulen-7-amine hydrochloride (150 mg, 0.53 mmol) in DCM (4 mL) and saturated aqueous $NaHCO_3$ solution (3 mL), triphosgene (56 mg, 0.19 mmol) was added. The biphasic mixture was stirred at room temperature for 30 minutes and then the two phases were separated and the organic one was washed with brine (3 mL), dried over anh. $Na_2SO_4$, filtered and evaporated under vacuum to obtain 1-2 mL of a solution of isocyanate in DCM. To this solution was added 1-(4-aminopiperidin-1-yl)propan-1-one (83 mg, 0.53 mmol). The mixture was stirred overnight at room temperature and the solvent was then evaporated. Column chromatography ($SiO_2$, DCM/Methanol mixtures) provided 1-(9-chloro-5,6,8,9,10,11-hexahydro-7H-5,9:7,11-dimethanobenzo[9]annulen-7-yl)-3-(1-propionylpiperidin-4-yl)urea as an orange solid. The analytical sample was obtained by a crystallization from hot Ethyl Acetate/Pentane mixtures to obtain a yellowish solid (79 mg, 35% yield), mp 155-156° C. IR (ATR): 3359, 2924, 2852, 1681, 1652, 1637, 1612, 1565, 1447, 1373, 1356, 1322, 1297, 1263, 1221, 1134, 1075, 1045, 1022, 967, 946, 908, 804, 755, 618, 559 $cm^{-1}$. HRMS: Calcd for $[C_{24}H_{32}ClN_3O_2+H]^+$: 430.2256, found: 430.2253. Anal. Calcd for $C_{24}H_{32}ClN_3O_2·0.75 H_2O$: C 65.00, H 7.61, N 9.47. Found: C 65.27, H 7.51, N 9.15.

Example 13: 4-(4-(3-(9-fluoro-5,6,8,9,10,11-hexahydro-7H-5,9:7,11-dimethanobenzo[9]annulen-7-yl)ureido)piperidin-1-yl)Benzoic Acid A suspension of 9-fluoro-5,6,8,9,10,11-hexahydro-7H-5,9:7,11-dimethanobenzo[9]annulen-7-amine (150 mg, 0.65 mmol) in DCM (1 mL) was added to a stirring biphasic mixture of DCM (5 mL), $NaHCO_3$ sat. (5 mL) and triphosgene (70 mg, 0.24 mmol). The mixture was then stirred at room temperature for 30 min. Phases were separated and the organic layer was dried over $Na_2SO_4$ anh., filtered and concentrated in vacuo. A suspension of 4-(4-aminopiperidin-1-yl)benzoic acid dihydrochloride (229 mg, 0.78 mmol) in DCM (3 mL) was added followed by triethylamine (216 μL, 157 mg, 1.56 mmol) and the mixture was stirred at RT overnight. Water (10 mL) was added and layers were separated. The aqueous layer was extracted again with EtOAc/MeOH 9/1 (15 mL×2). All the organic layers were joined, dried over $Na_2SO_4$ anh., filtered and solvents were concentrated in vacuo. The resulting crude was purified by column chromatography in silica gel (using as eluent mixtures of MeOH in DCM from 0% to 6%). Fractions containing the desired product were collected and concentrated in vacuo to afford 4-(4-(3-(9-fluoro-5,6,8,9,10,11-hexahydro-7H-5,9:7,11-dimethanobenzo[9]annulen-7-yl)ureido)piperidin-1-yl)benzoic acid as a beige solid (13 mg, 4% yield), mp 267-268° C. IR (ATR): 3334, 2928, 2851, 1675, 1602, 1555, 1520, 1306, 1224, 1183, 1120, 1098, 1045, 1010, 867, 771, 752, 719, 618, 570 $cm^{-1}$. HRMS: Calcd for $[C_{28}H_{32}FN_3O_3+H]^+$: 478.2500, found: 478.2523.

Example 14: 4-(4-(3-(9-chloro-5,6,8,9,10,11-hexahydro-7H-5,9:7,11-dimethanobenzo[9]annulen-7-yl)ureido)piperidin-1-yl)Benzoic Acid 9-chloro-5,6,8,9,10,11-hexahydro-7H-5,9:7,11-dimethanobenzo[9]annulen-7-amine (110 mg, 0.39 mmol) was added to a stirring biphasic mixture of DCM (2.5 mL), $NaHCO_3$ sat. (2.5 mL) and triphosgene (80 mg, 0.27 mmol). The mixture was then stirred at room temperature for 30 min. DCM (10 mL) and water (10 mL) were added and phases were separated. The organic layer was dried over anhydrous $Na_2SO_4$, filtered and concentrated in vacuo. A suspension of this crude in DCM (3 mL) was added onto a suspension of 4-(4-aminopiperidin-1-yl)benzoic acid dihydrochloride (148 mg, 0.50 mmol) and triethylamine (210 μL, 153 mg, 1.51 mmol) in DMSO (3 mL), and the mixture was stirred at RT overnight. Water (10 mL) and ethyl acetate (10 mL) were added followed by HCl 2M until pH=3. Layers were separated. The aqueous layer was extracted again with EtOAc (15 mL×2). All organic layers were joined, dried over anhydrous $Na_2SO_4$, filtered and solvents were concentrated in vacuo. The resulting crude was purified by column chromatography in silica gel (using as eluent mixtures of MeOH in DCM from 0% to 2%). Fractions containing the desired product were collected and concentrated in vacuo to afford 4-(4-(3-(9-chloro-5,6,8,9,10,11-hexahydro-7H-5,9:7, 11-dimethanobenzo[9]annulen-7-yl)ureido)piperidin-1-yl) benzoic acid as a brown solid (77 mg, 40% yield), mp 226-227° C. IR (ATR): 2922, 2851, 1672, 1601, 1553, 1518, 1385, 1357, 1221, 1184, 1120, 1089, 1039, 802, 759, 698, 607, 553 $cm^{-1}$. HRMS: Calcd for $[C_{28}H_{32}ClN_3O_3—H]^-$: 492.2059, found: 492.2057.

Example 15: methyl 4-(4-(3-(9-chloro-5,6,8,9,10,11-hexahydro-7H-5,9:7,11-dimethanobenzo[9]annulen-7-yl)ureido)piperidine-1-carbonyl)benzoate 1-(9-chloro-5,6,8,9,10,11-hexahydro-7H-5,9:7,11-dimethanobenzo[9]annulen-7-yl)-3-(piperidin-4-yl)urea (260 mg, 0.73 mmol) was dissolved in DCM (25 mL) and EDCl·HCl (211 mg, 1.1 mmol), DMAP (134 mg, 1.1 mmol) and 4-(methoxycarbonyl)benzoic acid (198 mg, 1.1 mmol) were added. The mixture was stirred at room temperature overnight. The reaction was quenched by the addition of 1N HCl (3 mL). Phases were separated and the aqueous layer was extracted with DCM (4×10 mL). The organics were then washed with 2N NaOH (2×10 mL) and dried over anhydrous $Na_2SO_4$, filtered and evaporated under vacuum to give a white solid. Column chromatography ($SiO_2$, DCM/methanol mixtures) provided 4-(4-(3-(9-chloro-5,6,8,9,10,11-hexahydro-7H-5,9:7,11-dimethanobenzo[9]annulen-7-yl)ureido)piperidine-1-carbonyl)benzoate as a white solid (190 mg, 48% yield), mp 128-129° C. IR (ATR): 3354, 2927, 1722, 1606, 1547, 1434, 1357, 1273, 1226, 1147, 1108, 1019, 990, 967, 938, 891, 861, 823, 802, 758, 725, 699 $cm^{-1}$. HRMS-$ESI^+$ m/z$[M+H]^+$ calcd for $[C_{30}H_{34}ClN_3O_4+H]^+$:536.2311, found: 536.2313.

Example 16: 4-(4-(3-(9-chloro-5,6,8,9,10,11-hexahydro-7H-5,9:7,11-dimethanobenzo[9]annulen-7-yl)ureido)piperidine-1-carbonyl)Benzoic Acid 4-(4-(3-(9-chloro-5,6,8,9,10,11-hexahydro-7H-5,9:7,11-dimethanobenzo[9]annulen-7-yl)ureido)piperidine-1-carbonyl)benzoate (70 mg, 0.13 mmol) was dissolved in ACN (1.75 mL) and LiOH (9.3 mg, 0.39 mmol) was added, followed by water (0.7 mL). The mixture was stirred at room temperature overnight. Then, Amberlite-$H^+$ was added until acidic pH, filtered and the solvent was evaporated under vacuum to give 4-(4-(3-(9-chloro-5,6,8,9,10,11-hexahydro-7H-5,9:7,11-dimethanobenzo[9]annulen-7-yl)ureido)piperidine-1-carbonyl)benzoic acid as a white solid (60 mg, 88% yield), mp 200° C.-dec. IR (ATR): 3361, 2927, 1722, 1607, 1551, 1440, 1357, 1274, 1229, 1108, 1047, 1019, 990, 967, 938, 862, 802, 758, 697 $cm^{-1}$. HRMS-$ESI^-$ m/z$[M-H]^-$ calcd for $[C_{29}H_{32}ClN_3O_4—H]^-$: 520.2009, found: 520.1999.

Example 17 a) In Vitro Determination of sEH Inhibition Activity

The following fluorescent assay was used for determination of the sEH inhibition activity ($IC_{50}$), with the substrate and comparative control compound (t-TUCB) indicated below.

Substrate:
Cyano(6-methoxynaphthalen-2-yl)methyl 2-(3-phenyloxiran-2-yl)methylcarbonate (CMNPC); cf. Morisseau, C.; Hammock, B. D. Measurement of soluble epoxide hydrolase (sEH) activity. *Curr. Protoc. Toxicol.* 2007, Chapter 4, Unit 4.23.

t-TUCB:
4-[[trans-4-[[[[4-(Trifluoromethoxy)phenyl]amino]carbonyl]amino]cyclohexyl]oxy]benzoic acid.

Protocol:
The fluorescent assay was used with purified recombinant human or mouse sEH proteins. The enzymes were incubated at 30° C. with the inhibitors ($[I]_{final}$=0.4-100,000 nM) for 5 min in 100 mM sodium phosphate buffer (200 µL, pH 7.4) containing 0.1 mg/mL of BSA and 1% of DMSO. The substrate (CMNPC) was then added ($[S]_{final}$=5 µM). Activity was assessed by measuring the appearance of the fluorescent 6-methoxynaphthaldehyde product ($\lambda_{ex}$=330 nm, $\lambda_{em}$=465 nm) every 30 seconds for 10 min at 30° C. on a SpectraMax M2 (Molecular Devices). Results were obtained by regression analysis from a linear region of the curve. All measurements were performed in triplicate and the mean is reported. t-TUCB, a classic sEH inhibitor, was run in parallel and the obtained $IC_{50s}$ were corroborated with reported literature values, to validate the experimental results.

b) In Vitro Determination of Microsomal Stability

The human recombinant microsomes employed were purchased from Tebu-Xenotech. The compound was incubated at 37° C. with the microsomes in a 50 mM phosphate buffer (pH=7.4) containing 3 mM $MgCl_2$, 1 mM NADP, 10 mM glucose-6-phosphate and 1 U/mL glucose-6-phosphate-dehydrogenase. Samples (75 µL) were taken from each well at 0, 10, 20, 40 and 60 min and transferred to a plate containing 4° C. 75 µL acetonitrile and 30 µL of 0.5% formic acid in water were added for improving the chromatographic conditions. The plate was centrifuged (46000 g, 30 min) and supernatants were taken and analyzed in a UPLC-MS/MS (Xevo-TQD, Waters) by employing a BEH $C_{18}$ column and an isocratic gradient of 0.1% formic acid in water: 0.1% formic acid acetonitrile (60:40). The metabolic stability of the compounds was calculated from the logarithm of the remaining compounds at each of the time points studied.

TABLE 1

| | Example 18: Activity on mouse model of Alzheimer disease | |
|---|---|---|
| Ex | Human sEH $IC_{50}$ (nM) | Microsomal stability (% remanent) |
| 1 | 0.5 | 77 |
| 2 | 0.4 | 89 |
| 3 | 0.4 | 47 |
| 4 | 0.4 | 66 |
| 5 | 0.6 | 100 |
| 6 | 0.4 | 42 |
| 7 | 0.4 | 58 |
| 8 | 0.4 | 63 |
| 9 | 0.6 | 99 |
| 10 | 0.4 | 98 |
| 11 | 0.6 | 97 |
| 12 | 0.6 | 78 |
| 13 | 0.5 | 100 |
| 14 | 0.4 | 99 |
| 16 | 0.4 | 88 |
| C1 | 4.0 | 1 |
| C2 | 4.7 | 0.1 |
| C3 | 0.4 | 30 |
| C4 | 1.1 | 7 |
| C5 | 1.5 | 0.1 |
| C6 | 1.1 | 0.8 |
| C7 | 1 | 0.1 |
| C8 | 0.9 | 22 |
| C9 | 0.9 | 16 |
| C10 | 1.2 | 33 |
| C11 | 0.4 | 0.7 |
| C12 | 2.9 | 0.7 |

Statistics Analysis

Data are expressed as the mean±Standard Error of the Mean (SEM) from at least samples for each group for behavioural test and 4-6 samples for molecular analysis. Data analysis was conducted using GraphPad Prism ver. 8. Statistical software. For statistical analysis of treated group and 5XFAD-Ct, one-way ANOVA was applied followed by Dunnett's two-tailed test and between control groups Student's t-test. Statistical significance was considered when p values were <0.05.

Mice Model

5XFAD (tg6799) is an early-onset mouse transgenic model which overexpress mutant human APP(695) with the Swedish (K670N, M671L), Florida (I716V) and London (V7171) Familial Alzheimer's Disease (FAD) mutations along with human PS1 harbouring two FAD mutations (M146L and L286V). The Tg6799 line used is the original hybrid B6SJL background, and this hybrid B6SJL strain is used as a control of healthy animals. The mouse Thy1 promoter regulates both transgenes to drive overexpression in the brain. 5XFAD mice recapitulate major features of AD amyloid pathology and is a useful model of intraneuronal Abeta-42 induced neurodegeneration with amyloid increase brain content and amyloid plaque formation and tau hyperphosphorylation (J Neurosci. 2006, 26(40), 10129-10140).

Treatment

Animals were treated for 4 weeks with vehicle (control) or the compound of example 2 added to the drinking water. The test compound was dissolved in 1.8% hydroxypropyl-beta-cyclodextrin and concentration in water was calculated according to the weekly animal consumption to reach the precise daily dose. A freshly made weekly replaces the drinking solution. The amount of water that the animals drink was monitored weekly, by the cage, and drug concentration was adjusted every week to reach the precise dose. After 4 weeks of maintained treatment, mice were studied in the behavioural tests.

Behavioral Test

In vivo model for assessing the efficacy of a test compound in learning and memory Impairment (Novel Object Recognition Test; NORT).

Mice were placed in a 90°, two-arm, 25-cm-long, 20-cm-high, 5-cm-wide black maze. The walls could be lifted off for easy cleaning. Light intensity in the middle of the field was 30 lux. The objects to be discriminated were made of plastic and were chosen in order not to frighten the mice, and objects with parts that could be bitten were avoided. Before performing the test, the mice were individually habituated to the apparatus for 10 min for 3 days. On day 4, the animals were submitted to a 10-min acquisition trial (first trial), during which they were placed in the maze in the presence of two identical, novel objects (A+A or B+B) at the end of each arm. A 10-min retention trial (second trial) was carried out 2 h later. During this second trial, objects A and B were placed in the maze and the behaviour of the mice was recorded with a camera. The time that the mice explored the New object (TN) and Time that the mice explored the Old object 15 (TO) were measured. A Discrimination Index (DI) was defined as (TN−TO)/(TN+TO). To avoid object preference biases, objects A and B were counterbalanced so that one half of the animals in each experimental group were exposed first to object A and then to object B, whereas the remaining half saw object B first and then object A. The maze and the objects were cleaned with 70° ethanol after each test to eliminate olfactory cues. The learning and memory paradigm is based on the spontaneous exploratory activity of rodents and does not involve rule learning or reinforcement. The object recognition paradigm has been shown to be sensitive to the effects of aging and cholinergic dysfunction, among others (Neurosci. Lett. 1994, vol. 170, pp 117-120; *Pharmacol. Biochem. Behav.* 1996, vol. 35 53, pp. 277-283). This model has been adapted to mice and validated using pharmacological agents (*Front. Biosci. (Schol. Ed.)* 2015, vol. 7, pp 10-29).

Evaluation of the compound of example 2 (5 mg/kg) neuroprotective properties in 5XFAD model by NORT showed reduced memory deficits in treated groups compared to the control groups, and 5XFAD treated group recovered DI levels of the Wild Type (Wt) control group. Therefore, the compound of example 2 (5 mg/kg) can improve cognitive capabilities in a murine model of Alzheimer's disease. The results are shown in Tables 2 and 3.

Table 2 shows the values of DI of NORT 2 h in male mice at 6-month-old controls Wild Type (Wt-Ct) and 5XFAD (5XFAD-Ct), and 5XFAD treated with the compound of example 2 (5 mg/kg). The duration of the treatment was 4 weeks. Data are observed mean±Standard Error of the Mean (SEM) ###p<0.01 compared to Wt-Ct group. ***p<0.001 compared to the 5XFAD-Ct group.

| Group | Discrimination index Mean ± SEM | n | P-value |
|---|---|---|---|
| Wt-Ct | 0.41 ± 0.076 | 10 | |
| 5XFAD-Ct | −0.09 ± 0.04 | 12 | ### |
| 5XFAD + Cpd Ex. 2 (5 mg/kg) | 0.239 ± 0.039 | 13 | *** |

Table 3 shows the values of DI of NORT 24 h in male mice at 6-month-old controls 10 Wild Type (Wt-Ct) and 5XFAD (5FAD-Ct), and 5XFAD treated with the compound of example 2 (5 mg/kg). The duration of the treatment was 4 weeks. Data are observed mean±Standard Error of the Mean (SEM) (n=10-12 for each group). ####p<0.0001 compared to Wt-Ct group. *<0.05 compared to the 5XFAD-Ct group.

| Group | Discrimination index Mean ± SEM | n | P-value |
|---|---|---|---|
| Wt-Ct | 0.42 ± 0.064 | 10 | |
| 5XFAD-Ct | −0.032 ± 0.047 | 12 | #### |
| 5XFAD + Cpd Ex. 2 (5 mg/kg) | 0.216 ± 0.069 | 13 | * |

Brain Tissue Dissection

After NORT, animals were sacrificed and the whole hippocampus dissected or brain slices from control and treated mice obtained by using a cryostat. Tissues were stored to −80° C. up to be used in Western blot analysis or thioflavin staining experiments.

Western Blot: Tau Pathology and Neuroinflammation

For Western Blotting (WB), aliquots of 15 µg of hippocampal protein were used. Protein samples were separated by SDS-PAGE (8-12%) and transferred onto PVDF membranes (Millipore). Afterwards, membranes were blocked in 5% non-fat milk in 0.1% Tween20 TBS (TBS-T) for 1 h at room temperature, followed by overnight incubation at 4° C. with the primary antibodies [p-Tau (Ser404) (Invitrogen; 1:1,000); Total Tau (Invitrogen; 1,000), GFAP (Millipore; 1:2500) and TREM2 (Invitrogen; 1:1,000) and GAPDH (Abcam; 1:5,000)].

Afterwards, membranes were washed and incubated with secondary antibodies for 1 h at room temperature. Immunoreactive proteins were viewed with a chemiluminescence based detection kit, following the manufacturer's protocol (ECL Kit; Millipore), and digital images were acquired using a ChemiDoc XRS+ System (BioRad). Semiquantitative analyses were carried out using ImageLab software (BioRad), and results were expressed in Arbitrary Units (AU), considering control protein levels as 100%. Immunodetection of GADPH routinely monitored protein loading. The results are shown below in Tables 4 and 6.

5XFAD mice treatment with the compound of example 2 reduced the ratio of hyperphosphorylation of tau protein, which was significantly increased in 5XFAD mice compared to WT animals.

Table 4 shows the values of protein levels of hyperphosphorylated tau in serine 404 of the hippocampus tissue in male mice at 6-month-old controls Wild Type (Wt-Ct) and 5XFAD (5XFAD-Ct), and 5XFAD treated with the compound of example 2 (5 mg/kg). The duration of the treatment was 4 weeks. Protein levels for p-Tau (Ser404) and total Tau were determined by Western blotting and ratio p-Tau/total Tau was calculated. ##$p<0.01$ compared to the 5 Wt-Ct. **$p<0.01$ compared to 5XFAD-Ct.

| Group | Ratio Mean ± SEM | n | P value |
|---|---|---|---|
| Wt-Ct | 100 ± 62.8 | 4 | |
| 5XFAD-Ct | 599.21 ± 78.44 | 3 | ## |
| 5XFAD + Cpd. Ex. 2 (5 mg/kg) | 183.08 ± 71.8 | 4 | ** |

Because the implication in neuroinflammation in AD pathology and the reduction of inflammatory mediators after sEH inhibition some markers gliosis were evaluated (GFAP and TREM2). For both markers, a significant diminution in the protein levels were demonstrated after treatment with the compound of example 2.

Table 5 shows the values of protein levels of GFAP and TREM2 evaluated by WB in the hippocampus tissue in male mice at 6 months-old controls Wild Type (Wt-Ct) and 5XFAD (5XFAD-Ct), and 5XFAD treated with the compound of example 2 (5 mg/kg). The duration of the treatment was 4 weeks. ##$p<0.01$ compared to Wt-Ct. *$p<0.05$ compared to the 5XFAD-Ct.

| Group | GFAP | TREM2 | n |
|---|---|---|---|
| Wt-Ct | 100 ± 8.86 | 100 ± 9.25 | 4 |
| 5XFAD-Ct | 178.21 ± 17.07## | 160.31 ± 15.54## | 4 |
| 5XFAD + Cpd. Ex. 2 (5 mg/kg) | 125.85 ± 9.21* | 118.42 ± 6.53* | 4 |

Thioflavin S Staining

Brain slices were unfrozen at room temperature and then were rehydrated with PBS solution for 5 min. Later, the brain sections were incubated with 0.3% thioflavin S (Sigma-Aldrich) for 20 min at room temperature in the dark. Subsequently, these were submitted to washes in 3-min series, specifically 80% ethanol (two 15 washes), 90% ethanol (one wash), and three washes with PBS. Finally, the slides were mounted using Fluoromount-G™ mounting medium (EMS), allowed to dry overnight at room temperature in the dark and stored at 4° C. Image acquisition was performed with an epifluorescence microscope (BX51; Olympus, Germany). For plaque quantification, similar and comparable histological areas were selected, focusing on adjacent positioning of the hippocampus and the whole cortical area (Table 6 and FIG. 1).

Table 6 shows the values of histological images of amyloid plaques stained with thioflavin-S in male mice at 6-month-old controls Wild Type (Wt-Ct) and 5XFAD (5XFAD-Ct), and 5XFAD treated with the compound of example 2 (5 mg/kg). The duration of the treatment was 4 weeks. Data are observed mean±Standard Error of the Mean (SEM) (n=4 for each group). ####$p<0.001$ compared to Wt-Ct. ***$p<0.001$ compared to the 5XFAD-Ct.

| Group | Number of Aβ plaques | n | P value |
|---|---|---|---|
| Wt-Ct | 93.88 ± 8.13 | 2 | |
| 5XFAD-Ct | 572 ± 56.11 | 3 | #### |
| 5XFAD + Cp. Ex. 2 (5 mg/kg) | 292 ± 83 | 3 | *** |

Example 19: Activity on Mouse Model of Acute Pancreatitis

Acute pancreatitis (AP) is a potentially life-threatening gastrointestinal disease, and its incidence has been increasing over the last few decades. The onset of the disease is thought to be triggered by intra-acinar cell activation of digestive enzymes that results in interstitial edema, inflammation and acinar cell death that often leads to a systemic inflammation response. The efficacy of the new compound of example 2 at 0.1 and 0.3 mg/kg was assessed in the cerulein-induced AP murine model. The experimental procedure for the in vivo efficacy study followed already published protocols (*Mol Pharmacol*. 2015 August; 88(2): 281-90)

Figure 2:
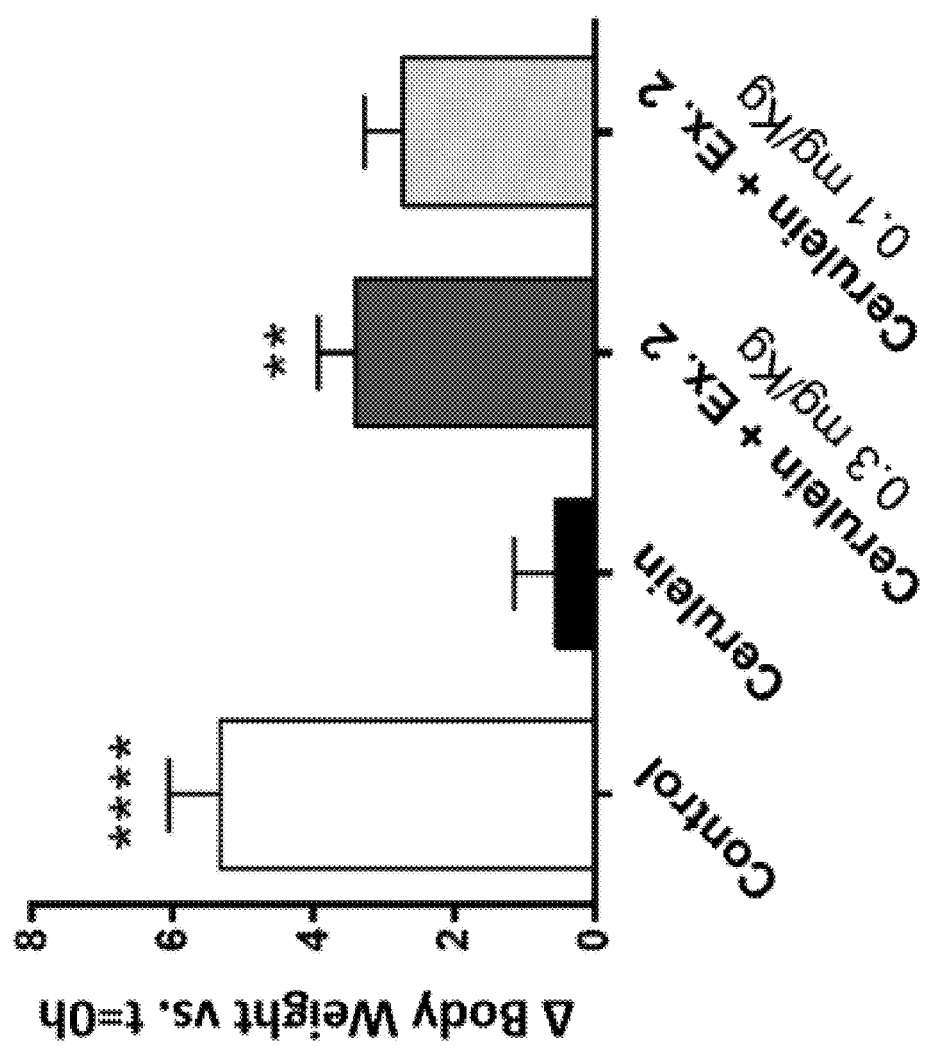
FIG. 2. Percentage of body weight change at the end of the study described in example 16 vs t=0 h. Effect of 12 consecutive administrations of cerulein (50 µg/kg, IP) and treatment with the compound of example 2 (single dose, 0.3 mg/kg or 0.1 mg/kg, IP) on C57BL/6 male mice body weight. Results are expressed as mean±SEM (n=3-9). *$p<0.05$, $p<0.01$, **$p<0.0001$ vs Cerulein group (ANOVA-one way).

First, the health status of the animals was analyzed by monitoring their change in body weight along the experimental procedure. After food replacement (with the last cerulein injection), control animals gained some weight, and, as expected, it was not observed in animal receiving cerulein only. In contrast, animals treated with both doses (0.3 and 0.1 mg/kg) of compound of example 2 showed an increased body weight, although only the group treated at 0.3 mg/kg reached statistical significance (p<0.01 vs Cerulein group) (FIG. 2).

Figure 3:
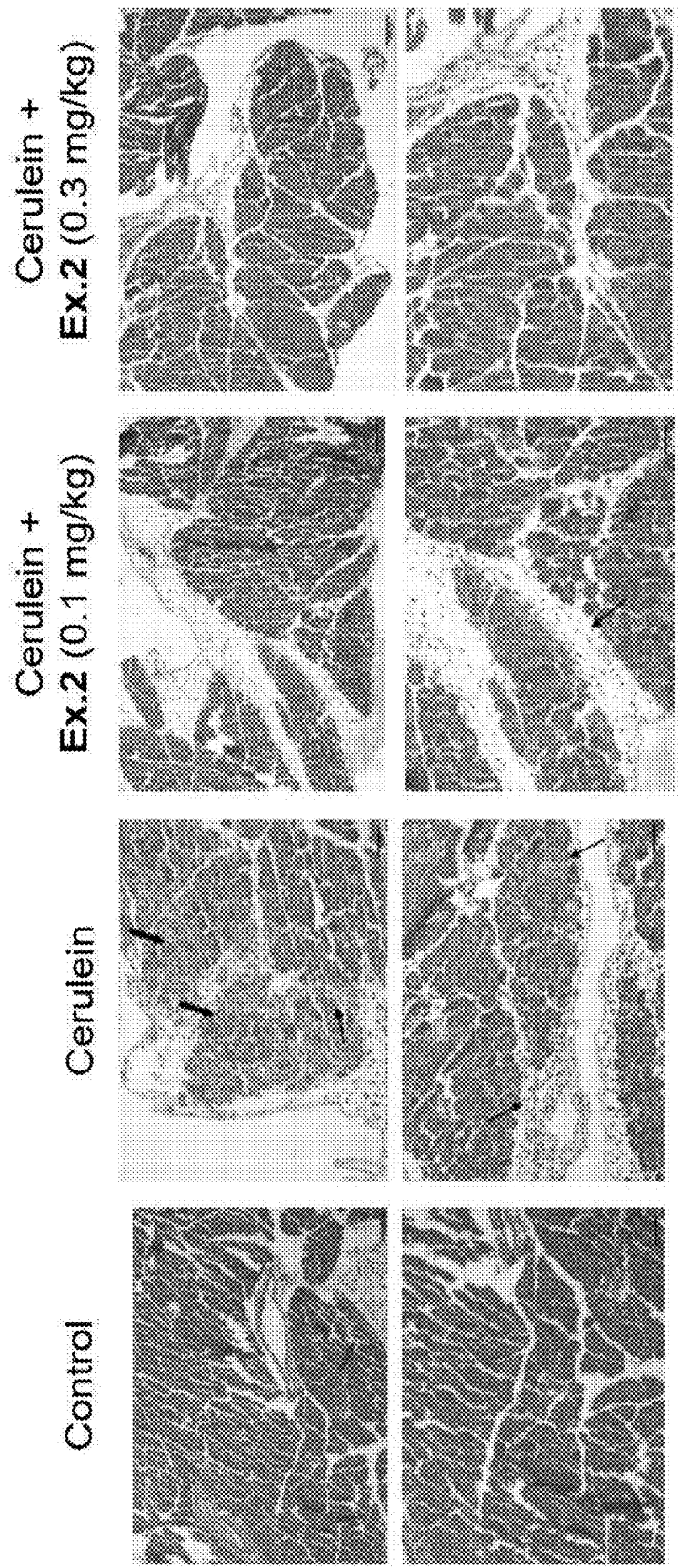
FIG. 3. Representative H&E-stained sections of the pancreas from the in vivo efficacy study described in example 16. Arrow indicates inflammatory cells and edema. Bold arrow indicates intracellular vacuole.
Figure 4:
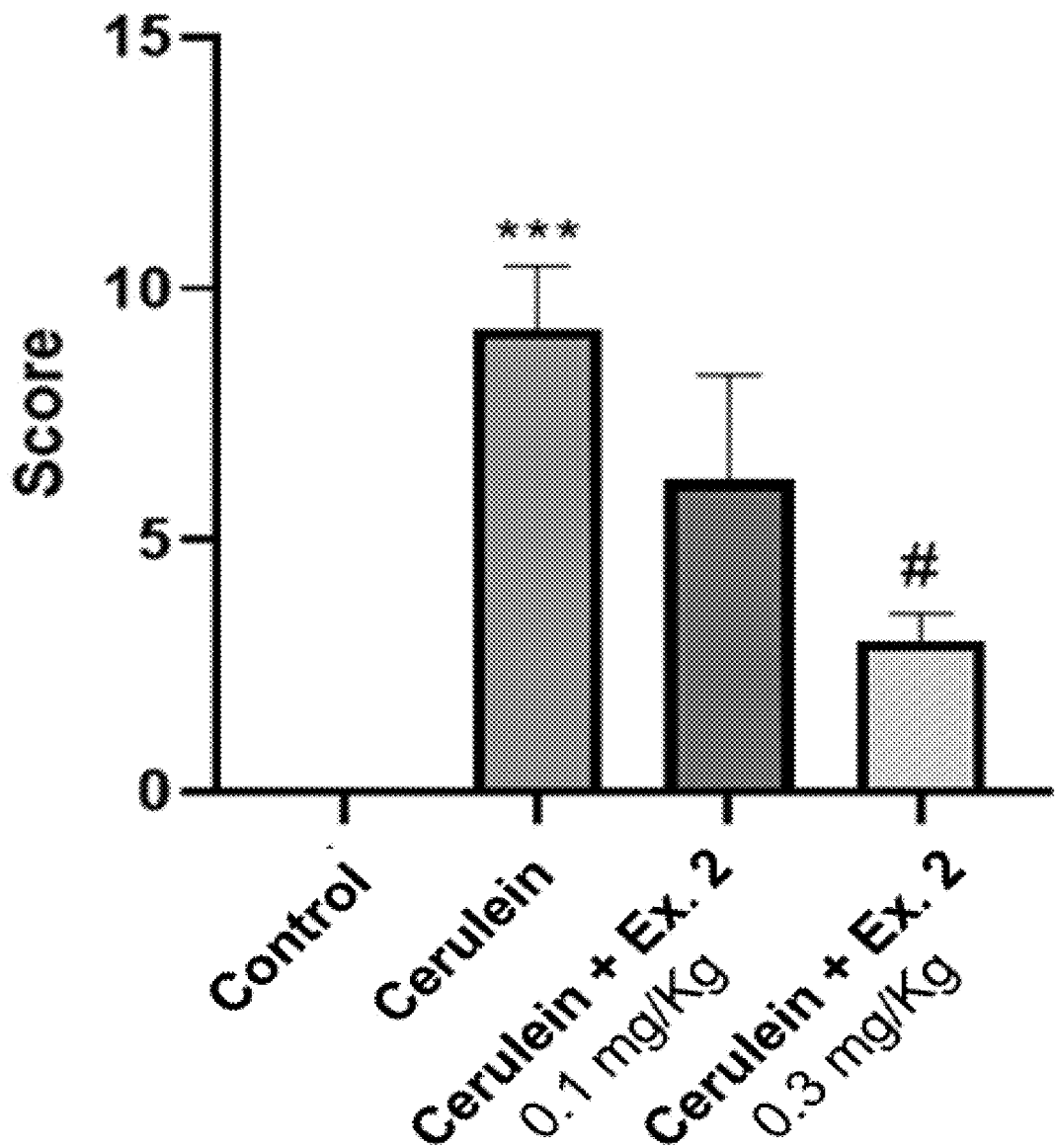
FIG. 4. Histologic scoring of pancreatic tissues of mice treated with vehicle (control), cerulein, and cerulein plus either 0.1 mg/kg or 0.3 mg/kg of the compound of example 2. *** $p<0.001$ vs. control. #$p<0.05$ vs. cerulein. ###$p<0.001$ vs. cerulein. & $p<0.05$ as described in example 16.
Figure 5B:
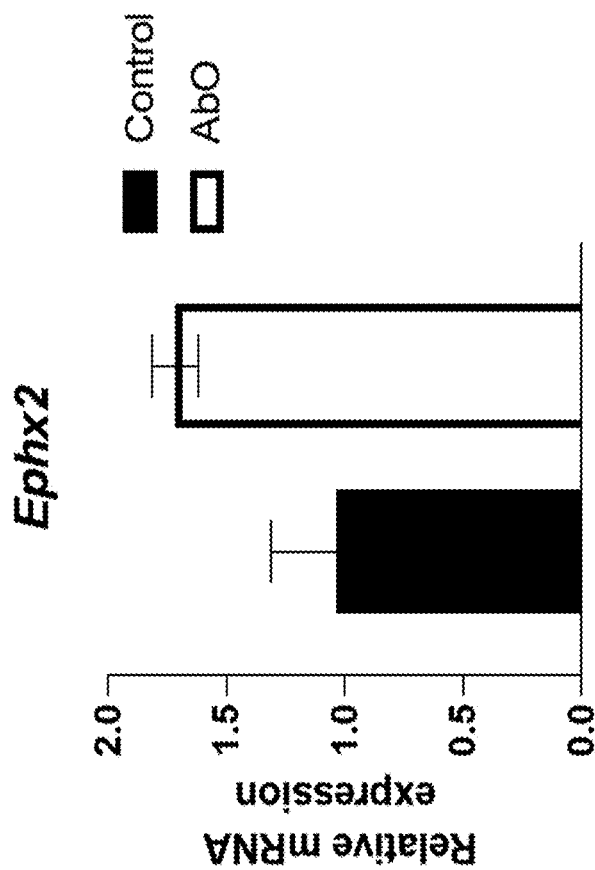
FIG. 5B. Shows Ephx2 mRNA AβO treated primary microglia compared to non-activated microglia.
Figure 5A:
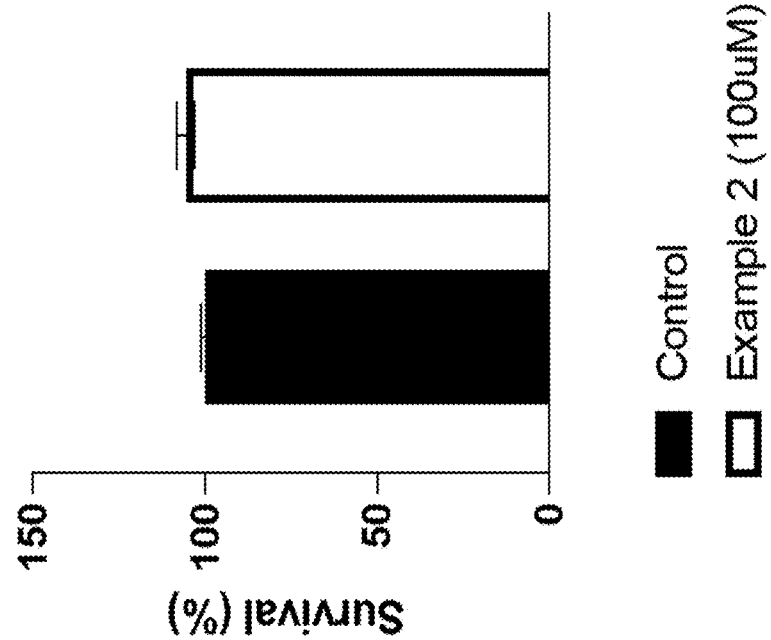
FIG. 5A. Presents viability of SH-SY5Y cells after 24 h exposure to the compound of example 2 (100 µM).
Figures 5C, 5D:
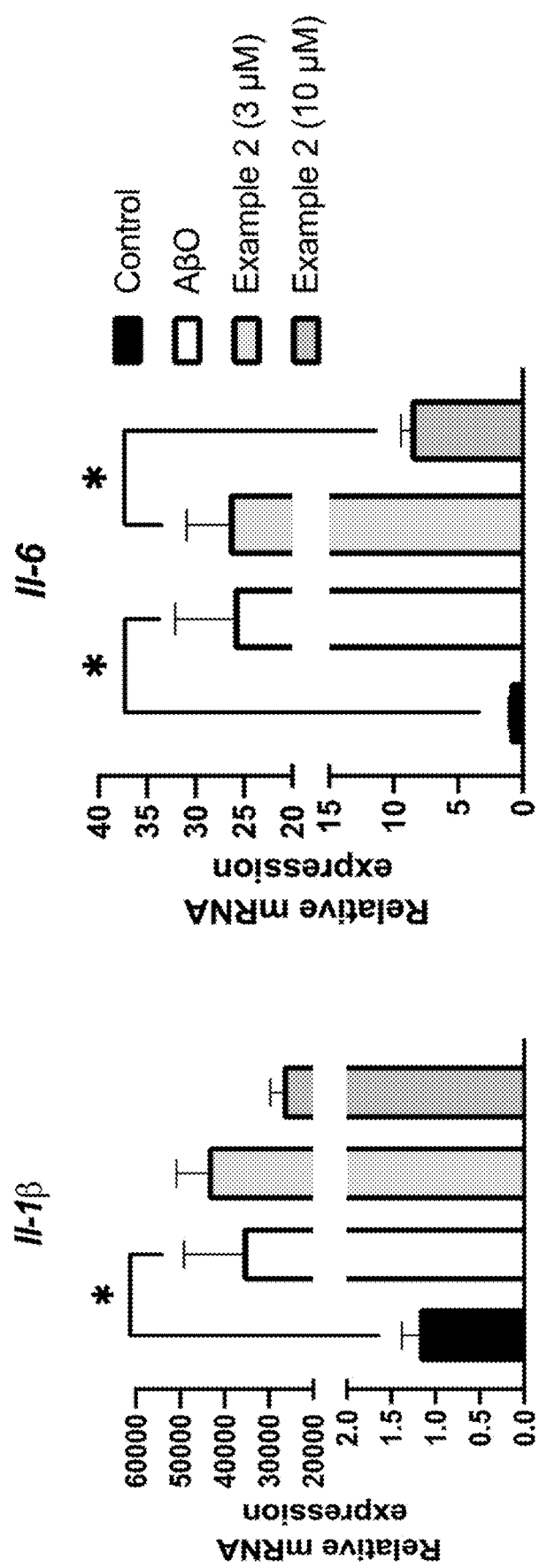
FIGS. 5C and 5D. The compound of example 2 reduced the proinflammation in primary microglia. mRNA levels of representative proinflammatory markers from mouse primary microglia treated AβO followed by DMSO or the compound of example 2 using qPCR.
Figures 5E, 5F:
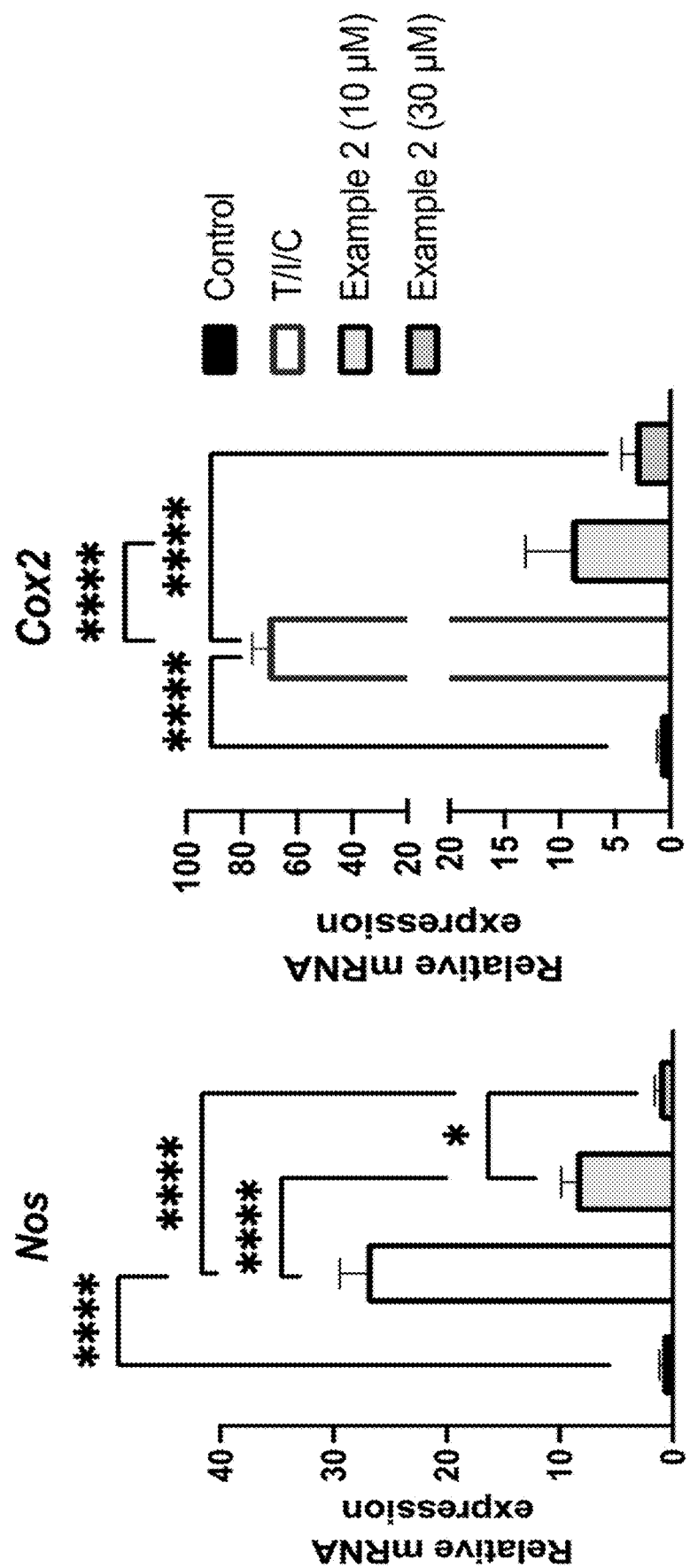
Figure 5I:
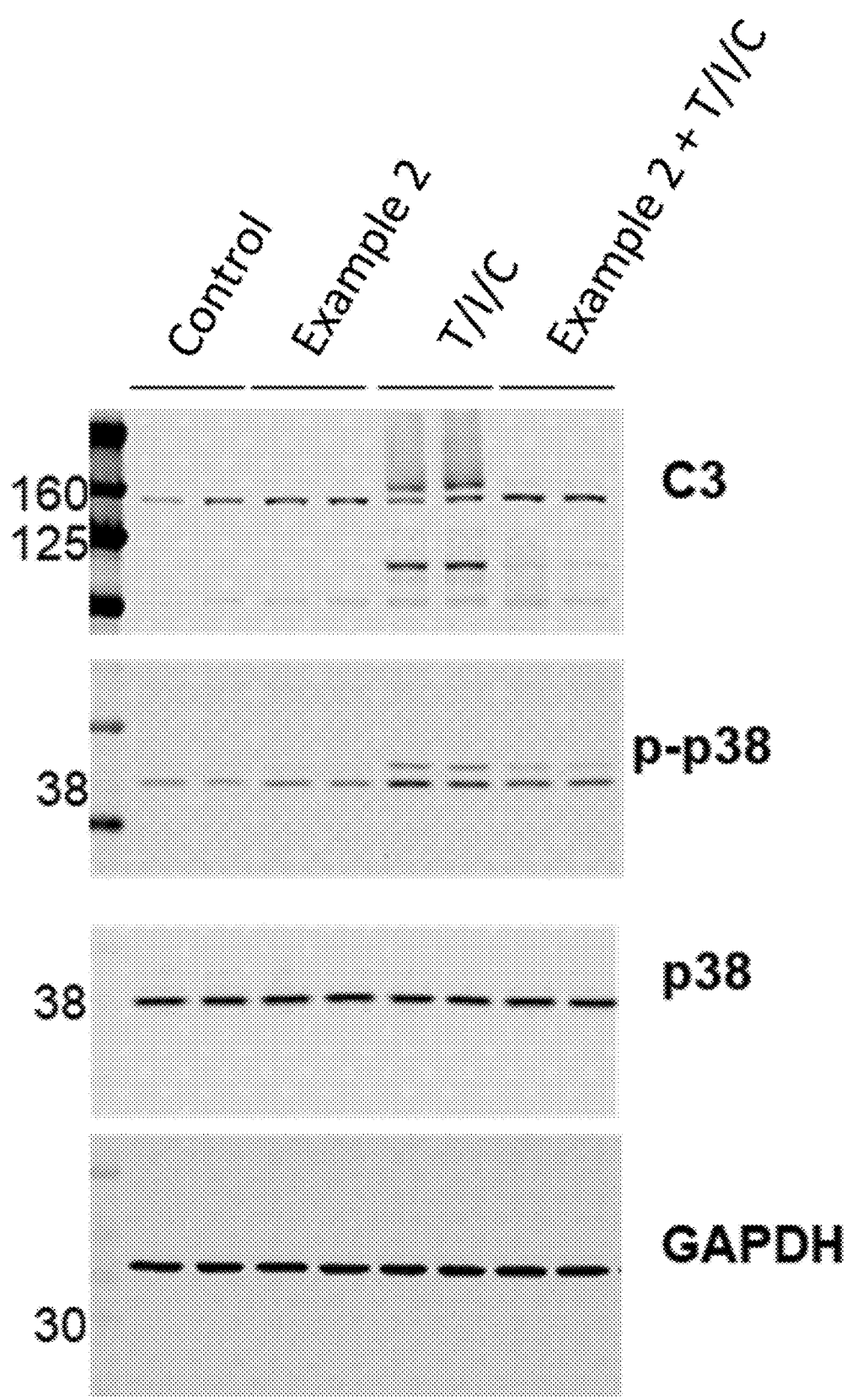
FIG. 5I. Presents C3 and p-p38 levels in reactive astrocyte treated with DMSO or 30 µM of the compound of example 2.

Finally, histologic analysis of pancreas was assessed in order to determine if treatment with the compound of example 2 reduced the severity of the cerulein-induced pancreatitis. Pathologic changes were studied on H&E-stained pancreas sections (FIG. 3). As expected, cerulein control group presents strong pancreatic damage representative of AP, including edema, necrosis and infiltration of inflammatory cells. By contrast, treatment with both doses of the compound of example 2 ameliorated cerulein-induced effects. The higher dose (0.3 mg/kg) more efficiently reversed the pancreatic damage, edema and neutrophils infiltration (FIGS. 3 and 4).

Experimental Section:

In vivo efficacy study. Forty-one male $C_{57}BL/6$ mice (eight week-old; approximately 24 g) were supplied by Envigo (Barcelona, Spain) (Ref. 16512). During the experimental procedure, animals were identified with permanent marker (tail code numbers). Upon arrival, animals were housed in groups of 8-9 animals/cage in polysulfone maintenance cages (480×265×210 mm, with a surface area of 940 cm²), with wire tops and wood chip bedding. Animals were kept in an environmentally controlled room (ventilation, temperature 22±2° C. and humidity 35-65%) on a 12-h light/dark cycle. A period of 7 days of acclimatization underwent between the date of arrival and the start of the procedure. During this period, the animals were observed to check their general health state. The maintenance diet was supplied by Harlan Interfauna *Ibérica* S. L. (2018 Harlan Teklad Global Diets). Diet will be provided to the animals ad libitum, but they were fasted overnight before first cerulein injection, and food was replaced after last cerulein injection. Tap water was supplied by CASSA (Servei d'AigüQes de Sabadell) ad libitum. The animals were maintained in accordance with European Directive for the Protection of Vertebrate Animals Used for Experimental and other Scientific Purposes (86/609/EU). Decree 214/1997 of 30th July. Ministry of agriculture, livestock and fishing of the Autonomous Government of Catalonia, Spain. Royal Decree 53/2013 of 1st February (Spain). All the experimental procedures were approved by the Ethical Committee on human and animal experimentation (CEEAH) of Universitat Autónoma de Barcelona (UAB) (procedure number: 4107) and by the Animal Experimentation Commission of the Generalitat de Catalunya (Catalan Government) (DAAM: 10146). The test item was dissolved in vehicle 10% 2-hydroxypropyl-β-cyclodextrin (CAS 128446-35-5) Sigma-Aldrich (Ref. 332607). Vehicle was prepared the day before and kept at 4° C. Pancreatitis induction: Mice (n=41) were weighed, identified by a distinct number at the base of the tail and fasted overnight. Cerulein (cerulein and cerulein+the compound of example 2 groups) (50 µg/kg, prepared in 0.9% NaCl) or vehicle (0.9% NaCl) (Control group) were intraperitoneally injected (V=5 mL/kg) 12 consecutive times, at 1-hour intervals (h=0-11). Food was replaced after last injection. A satellite experiment was designed where animals (n=3) were distributed in control, cerulein and cerulein+the compound of example 2-treated groups. Pancreatitis was induced by 7 injections of cerulein (or vehicle in control group) at 1-hour intervals (h=0-6). Treatments: Test item was administered intraperitoneally in one injection to the compound of example 2 (0.3 mg/kg) and the compound of example 2 (0.1 mg/kg) groups at 14-hour after the first cerulein injection. Animals from control and cerulein group received vehicle administration (10% 2-hydroxypropyl-β-cyclodextrin) (V=10 mL/kg). Extra groups were treated 2-hour after the first cerulein injection: the compound of example 2 (0.3 mg/kg), control and cerulein group (10% 2-hydroxypropyl-β-cyclodextrin). Study end: 24 h after the first cerulein injection, animals were weighed and anesthetized with isoflurane. Blood was collected from vena cava in an eppendorf containing K2-EDTA and centrifuged at 10000 rpm for 5 minutes for plasma collection. Plasma was stored at −80° C. until analysis. Mice were sacrificed by cervical dislocation and pancreas were dissected and weighed. Pancreas from 3 animals were frozen in liquid $N_2$ and stored at −80° C. until analysis. Pancreas from 5 mice were sectioned and one part was placed in 10% formalin and sent to Anapath (Granada, Spain) for histology analysis and the other was immediately placed in RNAse-free eppendorfs, frozen in $N_2$ and stored at −80° C. for gene expression assays.

Histologic analysis. Pancreatic samples were treated with increasing grade alcohols, two xylol baths and embedded in paraffin. They were subsequently cut using a microtome and processed for staining. For the deparaffinization of the samples, 2 xylene baths (10 minutes) and 3 alcohols were used in decreasing solutions (100%, 90% and 70%) (5 minutes) and subsequently stained with hematoxylin (5 minutes) and eosin (5 minutes). During the dehydration process after staining with eosin, alcohols in increasing solution (70%, 96% and 100%) and xylene were used again. Finally, the samples were mounted with DPX.

Histologic scoring of pancreatic sections was performed to grade the extent of pancreatic parenchymal atrophy, vacuolar degeneration of cells, edema, hemorrage, mononuclear inflammatory cells, mononuclear inflammatory cells, polimorfonuclear inflammatory cells and necrosis. The assigned scores were the following: 0 (no changes): when no lesions were observed or the observed changes were within normality; 1 (minimal): when changes were few but exceeded those considered normal; 2 (light): lesions were identifiable but with moderate severity; 3 (moderate): important injuries but they can still increase in severity; 4 (very serious): the lesions are very serious and occupy most of the analyzed tissue. The lesions were evaluated in the most affected lobes of all the pancreas. In the case of assessment of atrophy, it was determined based on the percentage of atrophied tissue as: 0 without atrophy; 1: 0-25% of atrophic parenchyma; 2: between 25-50%; 3: between 50-75% and 4: between 75 and 100%.

Example 20: Seizure Assay

Animals and Treatments

Age matched male CD1 mice weighing 35-40 g were treated with vehicle (control or test compounds TPPU, Cpd. Example 2) by gavage at a dose of 5 mg/Kg. Test compounds were dissolved in 20% hydroxypropyl-beta-cyclodextrin and concentration was calculated according to the animal weigh to reach the precise dose. Animals were housed in standard care facilities with a 12 hours light-dark cycle with free access to water and food.

Behavioral Test

To investigate the ability of compounds to cross the blood-brain barrier (BBB), a standard acute test involving the administration of pro-convulsant pentylenetetrazole (PTZ) was employed [Inceoglu et al, PLoS ONE, 2013, 8(12), e80922; WO 2015/148954 A1]. In the test, PTZ was administered at 85 mg/Kg by subcutaneous route, time to onset of first clonic seizure, average of clonic seizures, tonic seizure latency and lethality were monitored for 30 min. Vehicles or compounds were administered by gavage at 5 mg/kg 1 h prior to pro-convulsant.

Results

Table 7 shows the effects on different seizure behavioral parameters of compounds in PTZ test.

TABLE 7

| Compound | Mean time to clonic seizure latency in seconds (SEM) | Average clonic seizure (SEM) | Mean time to tonic seizure in seconds (SEM) | Protected from tonic/total (Mortality) |
|---|---|---|---|---|
| Vehicle | 253 (13.46) | 6.75 (0.75) | 851.50 (74.09) | 0/6 |
| TPPU | 605.33 (144.78) | 3.67 (0.56)** | 3063 (0.00)**** | 5/6**** |
| Cpd. Example 2 | 1006.5 (110.6)** | 1.25 (0.25)***, $ | 0.00 (0.00)****, $$$ | 6/6**** |

Unpaired t-test or One Way ANOVA followed by Tukey post hoc analysis,
vs Vehicle
*$p < 0.05$;
**$p < 0.01$;
***$p < 0.001$;
****$p < 0.001$;
vs TPPU
$$p < 0.05$;
$$$$p < 0.001$).

The compound of Example 2 was found to protect mice from convulsions and associated lethality demonstrating that compounds claimed herein can cross the BBB. The PTZ assay is considered highly translatable from mice to humans. In this seizure assay, which is completely dependent on the ability of compounds to cross BBB, the compound of Example 2 displayed significant efficacy suggesting that this compound readily penetrates the CNS and protect the mice from seizure (Table 7).

TPPU, and the compound of Example 2 treatment at 5 mg/Kg delay onset of tonic seizures induced by PTZ in comparison with the control group (Vehicle). Note that animals that did not display tonic seizure within 30 min were excluded from this table. The compound of Example 2 gave better results than TPPU.

Example 21: Inflammation and Reactive Conversion in Primary Glial Cells

Methods
Treatment of Microglia with AβO

To validate the inhibition efficacy of sEH, $3 \times 10^5$ microglia isolated from CD1 mouse brain were seeded onto 12 well culture plates in microglia medium. The cells were incubated in serum-free condition for 24 h and were pretreated with sEH inhibitor (the compound of Example 2) pretreated for 30 min followed by AβO (1 µM, β-Amyloid (1-42), Ultra Pure, HFIP A-1163-1, rPeptide) or PBS for 4 h.
Treatment of Astrocyte with T/I/C To validate the inhibition efficacy of sEH, $10^6$ astrocytes isolated from CD1 mouse brain (Sciencell #M1800) or primary human astrocyte (Sciencell #1800) were seeded onto 6 well culture plates in astrocyte medium (Sciencell #1831 or #1801). The cells were incubated in serum-free condition for 24 h and were pretreated with sEH inhibitor (the compound of Example 2, 10 or 30 µM) pretreated for 30 min followed by recombinant T/I/C: Il-1a (3 ng/ml, Peprotech), TNFα (30 ng/ml, R&D), C1q (400 ng/ml, R&D), or PBS for 24 h.
Quantitative Real Time-PCR (qPCR)

Total RNAs were isolated from microglia or astrocyte using a Quick-RNA kit (Zymo Research, Inc., Irvine, CA, USA). The concentration of total RNAs was measured using a UV-Vis spectrophotometer (NanoDrop8000, Thermo Fisher Scientific Inc., Wilmington, DE, USA) and reverse-transcribed with a high-capacity cDNA reverse transcription kit (Applied Biosystems, Carlsbad, CA, USA). Gene expression was quantified by Fast SYBR green real-time PCR on a Quantstudio 5 system (Applied Biosystems). The primer sequences are listed below (Table 8). Data were analyzed according to the comparative Ct method. Glyceraldehyde 3-phosphate dehydrogenase (Gapdh) was used to normalize the amounts of cDNA within each sample.

TABLE 8

The primer sequences of real-time PCR (mouse)

| Gene | Forward | Reverse |
| --- | --- | --- |
| Il-1b | TGGACCTTCCAGGATGAGG ACA (SEQ ID NO: 1) | GTTCATCTCGGAGCCTGTAGTG (SEQ ID NO: 2) |
| Il-6 | TACCACTTCACAAGTCGGA GGC (SEQ ID NO: 3) | CTGCAAGTGCATCATCGTTGTTC (SEQ ID NO: 4) |
| Gapdh | CATCACTGCCACCCAGAAG ACTG (SEQ ID NO: 5) | ATGCCAGTGAGCTTCCCGTTCAG (SEQ ID NO: 6) |
| C3 | CCAGCTCCCCATTAGCTCT G (SEQ ID NO: 7) | GCACTTGCCTCTTTAGGAAGTC (SEQ ID NO: 8) |
| Nos2 | GAGACAGGGAAGTCTGAAG CAC (SEQ ID NO: 9) | CCAGCAGTAGTTGCTCCTCTTC (SEQ ID NO: 10) |
| Cox2 | GCGACATACTCAAGCAGGA GCA (SEQ ID NO: 11) | AGTGGTAACCGCTCAGGTGTTG (SEQ ID NO: 12) |
| Cxcl10 | GGTGAGAAGAGATGTCTGA ATCC (SEQ ID NO: 13) | GTCCATCCTTGGAAGCACTGCA (SEQ ID NO: 14) |

Western Blotting

Proteins were extracted from microglia or astrocyte by RIPA buffer (Thermo Fisher Scientific Inc.). Extracted proteins were separated by SDS/PAGE and subsequently transferred to nitrocellulose membranes (Bio-Rad, Hercules, CA, USA). Membranes were blocked in 3% BSA for 1 h at RT and incubated with primary antibodies against EPHX2 (Abcam ab155280), C3 (Abcam, ab200999), and GAPDH (Santa Cruz Biotechnology, Inc sc-32233) overnight at 4° C., followed by incubation with Highly Cross-Adsorbed Secondary Antibody, Alexa Fluor Plus 800 or 680 (Life Technologies) for 1 h at RT. Membranes visualized on Odyssey (LI-COR Biosciences, NE, USA).
Cell Viability Assay SHSY5Y cells were cultured on 96 well plates ($5 \times 10^4$) for 24 h followed by sEH inhibitors (the compound of Example 2) or PBS for 24 h, and they were equilibrated to room temperature for 30 min. 50 ul of Cell titer Glo reagent was added to each well and incubated for 10 min. The luminescence of each sample was measured on a plate reader (Bio-Tek) with parameters of 1 min lag time and 0.5 sec/well-read time (n=3).
Results The compound of example 2 (100 µM) did not show any neuronal cell toxicity in SH-SY5Y cells for 24 h. To validate the inhibition efficacy of the compound of example 2 in AβO (Aβ1-42)-induced microglial activation, mouse primary microglia isolated from CD1 brain tissue were pretreated with the compound of example 2 followed by Aβ1-42 (2 µM) and were assessed by qPCR. AβO significantly induced mRNA for pro-inflammatory cytokines, including Il-6, and Il-1b, which were prevented by the compound of example 2.

Next, we investigated whether inhibition of reactive astrocyte conversion by the compound of example 2 is neuroprotective. Recently, it was shown that activation of microglia leads to the conversion of normal astrocytes to reactive astrocytes via secretion of TNF-α, IL-1α, and C1q (T/I/C) in a variety of neurodegenerative diseases, including Alzheimer's disease and Parkinson's disease. As shown in FIGS. 5A-5I, treatment of T/I/C in the presence or absence of the compound of example 2 was applied to human primary astrocytes for 24 h. The compound of example 2 prevented the induction of potent inflammatory mediators Nos and Cox2 mRNA. More importantly, mRNA levels of reactive astrocyte representative markers, Cxc/10, and $C_3$ were significantly reduced by the treatment with the compound of example 2. Consistent with the inhibition effect of the compound of example 2 in mRNA, protein levels of $C_3$ and phosphor-p38 were decreased in T/I/C-induced reactive astrocyte treated with the compound of example 2. Thus, it can be concluded that the compound of example 2 inhibited the inflammation and reactive conversion in primary glial cells.

LIST OF REFERENCES

Non-Patent Literature Cited in the Description
1. Abstracts of Papers, 241st ACS National Meeting & Exposition, Anaheim, CA, United States, Mar. 27-31, 2011 (2011), MEDI-92
2. ACS Chem Biol. 2018 Jan. 19; 13:45-52
3. Alcoholism. 2018, 42, 1970
4. Am J Physiol Renal Physiol. 2013 Jan. 15; 304(2):F168-76
5. Am J Physiol Renal Physiol. 2014 Oct. 15; 307(8):F971-80
6. Am J Physiol Gastrointest Liver Physiol. 2019, 316, G527-G538
7. Am J Respir Cell Mol Biol. 2012 May; 46(5):614-22
8. Am J Respir Crit Care Med. 2014 Oct. 15; 190(8):848-50
9. Anticancer Res. 2013 December; 33(12):5261-5271
10. Aust J Chem. 1983; 36:2465-2472
11. Bioorg Med Chem. 2014, 22, 2678
12. Bioorg Med Chem. 2015, 23, 290
13. Bioorg Med Chem Lett. 2014 Jan. 15; 24(2):565-70
14. BioRxiv. 2019 March 8, doi: 10.1101/571984
15. Cancer Metastasis Rev 2020, 39:337
16. Cardiovasc Ther. 2011 April; 29(2):99-111
17. Clinics Res Hepatol Gastroenterol. 2018, 42, 118-125
18. Curr. Protoc. Toxicol. 2007, Chapter 4, Unit 4.23
19. Diabetes. 2018 June; 67(6):1162-1172
20. Dig Dis Sci. 2012 October; 57(10):2580-91
21. Drug Discov Today. 2015 November; 20(11):1382-90
22. Drug Metab Dispos. 2015 May; 43(5):788-802
23. Equine Vet J. 2017 May; 49(3):345-351
24. Exp Diabetes Res. 2012:758614
25. Exp Mol Med., 2021, 53(5):864-874
26. Expert Opin Ther Patents. 2010, vol. 20, pp. 941-956
27. Experimental Molecular Medicine. 2018, 50:149
28. FASEB J. 2015 March; 29(3):1092-101
29. FASEB J. March 2008 22 (Meeting Abstract Supplement) 479.17
30. Free Rad Biol Med. 2012, 53, 160
31. Frontiers Pharmacol. 2019, 9:1551
32. Frontiers Pharmacol. 2019, 10:95
33. Biomed. & Pharmacother. 2019, 115: 108897
34. Inflamm Allergy Drug Targets. 2012 April; 11(2):143-58
35. Int J Cardiol. 2012 Mar. 8; 155(2):181-7
36. Int J Mol Sci., 2021, 22(9):4650
37. J Agric Food Chem. 2011 Apr. 13; 59(7):2816-24
38. J Biol Chem. 2014 Dec. 26; 289(52):35826-38
39. J Cardiovasc Pharmacol. 2008 October; 52(4):314-23
40. J Neurosci Res. 2017 December; 95(12):2483-2492
41. J Pharmacol Exp Ther. 2016 June; 357(3):529-36
42. J Pharmacol Exp Ther. 2017 June; 361(3):408-416
43. J Surg Res. 2013 Jun. 15; 182(2):362-7
44. J Vet Pharmacol Ther. 2018 April; 41(2):230-238
45. J Med Chem. 2012, vol. 55, pp. 1789-1808
46. J Med Chem. 2021, vol 64, pp. 184-215
47. J Neurosurg Anesthesiol. 2015 July; 27(3):222-240
48. Liebigs Ann Chem. 1973; 1839-1850
49. Life Sci. 2013 Jun. 21; 92(23):1145-50
50. Med Hypotheses, 2017 October; 108:81-5
51. Mol Neurobiol. 2015 August; 52(1):187-95
52. Mol Pharmacol. 2015 August; 88(2):281-90
53. Nature. 2017 Dec. 14; 552(7684):248-252
54. Neurotherapeutics June; 2020, 17:1825-1835
55. Nutr Metab Cardiovasc Dis. 2012 July; 22(7):598-604
56. Oncotarget. 2017 Sep. 21; 8(61):103236-60
57. Pharmacol Ther. 2017 December; 180:62-76
58. Phytother Res. 2016 July; 30(7):1119-27
59. PLoS One. 2013 Dec. 11; 8(12):e80922
60. PLoS One. 2014 May 13; 9(5):e97529
61. PLoS One. 2014 Oct. 13, 9(10):e110162
62. PLoS One. 2019 Apr. 19, 14(4):e0215033
63. Proc Natl Acad Sci USA. 2005 Jul. 12; 102(28):9772-7
64. Proc Natl Acad Sci USA. 2011 May 31; 108(22):9038-43
65. Proc Natl Acad Sci USA. 2015 Jul. 21; 112(29):9082-7
66. Proc Natl Acad Sci USA. 2016 Mar. 29; 113(13):E1944-52
67. Proc Natl Acad Sci USA. 2018 May 15; 115(20):5283-5288
68. Proc Natl Acad Sci USA. 2018, 115:E5815-E5823
69. Proc Natl Acad Sci USA. 2019, 116:5154-5159
70. Proc Natl Acad Sci USA. 2019, 116:7083-7088
71. Prog Lipid Res. 2014 January; 53:108-23
72. Prostaglandins Other Lipid Mediat. 2014 October; 113-115:30-7
73. Prostaglandins Other Lipid Mediat. 2017 July; 131:67-74
74. Prostaglandins Other Lipid Mediat. 2018 May; 136:84-89
75. Recent Pat Cardiovasc Drug Discov. 2006 January; 1(1):67-72.
76. Resp Res. 2018, 19:236
77. Scientific Reports. 2018, 8:5279
78. Stroke. 2015 July; 46(7):1916-22
79. Tetrahedron Lett. 1987, 28, 1585-1588.
80. Toxicol Appl Pharmacol. 2015 Jul. 15; 286(2):102-11
81. Toxicology. 2017 Aug. 15; 389:31-41
82. J Neurosci. 2006, 26(40), 10129-10140
83. Neurosci. Lett. 1994, vol. 170, pp 117-120
84. Pharmacol. Biochem. Behav., 1996, vol. 35 53, pp. 277-283
85. Front. Biosci. (Schol. Ed.) 2015, vol. 7, pp 10-29

Patent Documents Cited in the Description
86. WO 00/23060 A2
87. WO 2007/009001 A1
88. WO 2003/002555 A1
89. WO 2015/148954 A1
90. WO 2017/120012 A1
91. WO 2016/133788 A1
92. WO 2019/243414 A1
93. WO 2020/146770 A1

The invention claimed is:
1. A compound having the following structure:
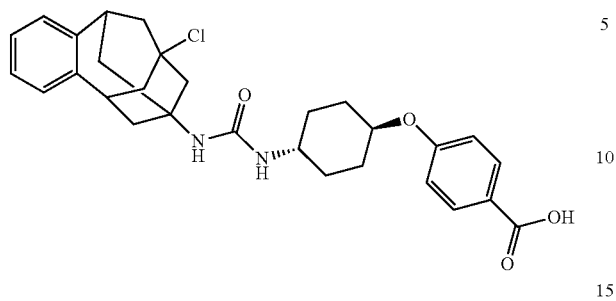
or a pharmaceutically acceptable salt thereof.
2. A pharmaceutical or veterinary composition comprising a therapeutically effective amount of the compound of claim 1.
* * * * *

SEQUENCE LISTING

Sequence total quantity: 14
SEQ ID NO: 1        moltype = DNA   length = 22

```
FEATURE                   Location/Qualifiers
misc_feature              1..22
                          note = Forward primer Il-1b
source                    1..22
                          mol_type = other DNA
                          organism = synthetic construct
SEQUENCE: 1
tggaccttcc aggatgagga ca                                              22

SEQ ID NO: 2              moltype = DNA  length = 22
FEATURE                   Location/Qualifiers
misc_feature              1..22
                          note = Reverse primer Il-1b
source                    1..22
                          mol_type = other DNA
                          organism = synthetic construct
SEQUENCE: 2
gttcatctcg gagcctgtag tg                                              22

SEQ ID NO: 3              moltype = DNA  length = 22
FEATURE                   Location/Qualifiers
misc_feature              1..22
                          note = Forward primer Il-6
source                    1..22
                          mol_type = other DNA
                          organism = synthetic construct
SEQUENCE: 3
taccacttca caagtcggag gc                                              22

SEQ ID NO: 4              moltype = DNA  length = 23
FEATURE                   Location/Qualifiers
misc_feature              1..23
                          note = Reverse primer Il-6
source                    1..23
                          mol_type = other DNA
                          organism = synthetic construct
SEQUENCE: 4
ctgcaagtgc atcatcgttg ttc                                             23

SEQ ID NO: 5              moltype = DNA  length = 23
FEATURE                   Location/Qualifiers
misc_feature              1..23
                          note = Forward primer Gapdh
source                    1..23
                          mol_type = other DNA
                          organism = synthetic construct
SEQUENCE: 5
catcactgcc acccagaaga ctg                                             23

SEQ ID NO: 6              moltype = DNA  length = 23
FEATURE                   Location/Qualifiers
misc_feature              1..23
                          note = Reverse prime Gapdh
source                    1..23
                          mol_type = other DNA
                          organism = synthetic construct
SEQUENCE: 6
atgccagtga gcttcccgtt cag                                             23

SEQ ID NO: 7              moltype = DNA  length = 20
FEATURE                   Location/Qualifiers
misc_feature              1..20
                          note = Forward primer C3
source                    1..20
                          mol_type = other DNA
                          organism = synthetic construct
SEQUENCE: 7
ccagctcccc attagctctg                                                 20

SEQ ID NO: 8              moltype = DNA  length = 22
FEATURE                   Location/Qualifiers
misc_feature              1..22
                          note = Reverse primer C3
source                    1..22
                          mol_type = other DNA
                          organism = synthetic construct
SEQUENCE: 8
gcacttgcct ctttaggaag tc                                              22
```

| | | |
|---|---|---|
| SEQ ID NO: 9 | moltype = DNA  length = 22 | |
| FEATURE | Location/Qualifiers | |
| misc_feature | 1..22 | |
| | note = Forward primer Nos2 | |
| source | 1..22 | |
| | mol_type = other DNA | |
| | organism = synthetic construct | |
| SEQUENCE: 9 | | |
| gagacaggga agtctgaagc ac | | 22 |
| | | |
| SEQ ID NO: 10 | moltype = DNA  length = 22 | |
| FEATURE | Location/Qualifiers | |
| misc_feature | 1..22 | |
| | note = Reverse primer Nos2 | |
| source | 1..22 | |
| | mol_type = other DNA | |
| | organism = synthetic construct | |
| SEQUENCE: 10 | | |
| ccagcagtag ttgctcctct tc | | 22 |
| | | |
| SEQ ID NO: 11 | moltype = DNA  length = 22 | |
| FEATURE | Location/Qualifiers | |
| misc_feature | 1..22 | |
| | note = Forward primer Cox2 | |
| source | 1..22 | |
| | mol_type = other DNA | |
| | organism = synthetic construct | |
| SEQUENCE: 11 | | |
| gcgacatact caagcaggag ca | | 22 |
| | | |
| SEQ ID NO: 12 | moltype = DNA  length = 22 | |
| FEATURE | Location/Qualifiers | |
| misc_feature | 1..22 | |
| | note = Reverse primer Cox2 | |
| source | 1..22 | |
| | mol_type = other DNA | |
| | organism = synthetic construct | |
| SEQUENCE: 12 | | |
| agtggtaacc gctcaggtgt tg | | 22 |
| | | |
| SEQ ID NO: 13 | moltype = DNA  length = 23 | |
| FEATURE | Location/Qualifiers | |
| misc_feature | 1..23 | |
| | note = Forward primer Cxcl10 | |
| source | 1..23 | |
| | mol_type = other DNA | |
| | organism = synthetic construct | |
| SEQUENCE: 13 | | |
| ggtgagaaga gatgtctgaa tcc | | 23 |
| | | |
| SEQ ID NO: 14 | moltype = DNA  length = 22 | |
| FEATURE | Location/Qualifiers | |
| misc_feature | 1..22 | |
| | note = Reverse primer Cxcl10 | |
| source | 1..22 | |
| | mol_type = other DNA | |
| | organism = synthetic construct | |
| SEQUENCE: 14 | | |
| gtccatcctt ggaagcactg ca | | 22 |